United States Patent
Iwamura et al.

(10) Patent No.: US 12,015,313 B2
(45) Date of Patent: Jun. 18, 2024

(54) STACKED CORE MANUFACTURING METHOD AND STACKED CORE MANUFACTURING APPARATUS

(71) Applicant: Mitsubishi Electric Corporation, Tokyo (JP)

(72) Inventors: Yuki Iwamura, Tokyo (JP); Kazutoshi Yamazoe, Tokyo (JP); Yohei Tsujita, Tokyo (JP); Mariko Aoyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/039,717

(22) PCT Filed: Mar. 2, 2021

(86) PCT No.: PCT/JP2021/007979
§ 371 (c)(1),
(2) Date: Jun. 1, 2023

(87) PCT Pub. No.: WO2022/185413
PCT Pub. Date: Sep. 9, 2022

(65) Prior Publication Data
US 2023/0396137 A1 Dec. 7, 2023

(51) Int. Cl.
*H01F 7/06* (2006.01)
*H02K 1/14* (2006.01)
*H02K 15/02* (2006.01)

(52) U.S. Cl.
CPC .......... *H02K 15/022* (2013.01); *H02K 1/148* (2013.01)

(58) Field of Classification Search
CPC .......................... H05K 15/022; H05K 1/148
See application file for complete search history.

(56) References Cited

U.S. PATENT DOCUMENTS 10,672,552 B2    6/2020  Chung et al.
10,796,845 B2 *  10/2020 Zannol ................ H01F 41/0233
11,043,883 B2    6/2021  Blocher et al.
(Continued)

FOREIGN PATENT DOCUMENTS

JP    2-79405 A      3/1990
JP    H11-150895 A   6/1999
(Continued)

OTHER PUBLICATIONS

International Search Report and Written Opinion dated Apr. 27, 2021, received for PCT Application PCT/JP2021/007979, filed on Mar. 2, 2021, 10 pages including English Translation.
(Continued)

*Primary Examiner* — Paul D Kim
(74) *Attorney, Agent, or Firm* — XSENSUS LLP

(57) ABSTRACT

A stacked core includes a plurality of single plates which are a plurality of steel plates stacked on one another to constitute a stacked body, a first bonding layer that is sandwiched between the single plates in the stacked body and fixes the single plates to each other, and a second bonding layer that is spread in a stacking direction of the plurality of single plates on a side surface of the stacked body including each end surface of the plurality of single plates, and fixes the plurality of single plates to one another.

6 Claims, 36 Drawing Sheets

(56) References Cited

U.S. PATENT DOCUMENTS

| | | | |
|---|---|---|---|
| 11,476,739 | B2 | 10/2022 | Blocher et al. |
| 11,496,005 | B2 * | 11/2022 | Hirosawa ................. H02K 1/02 |
| 2012/0156441 | A1 | 6/2012 | Gerster et al. |

FOREIGN PATENT DOCUMENTS

| | | | |
|---|---|---|---|
| JP | 2001-078399 | A | 3/2001 |
| JP | 2002-151339 | A | 5/2002 |
| JP | 2002-307636 | A | 10/2002 |
| JP | 2005-072199 | A | 3/2005 |
| JP | 2010-274625 | A | 12/2010 |
| JP | 2012-521649 | A | 9/2012 |
| JP | 2015-519721 | A | 7/2015 |
| JP | 2016-136828 | A | 7/2016 |
| JP | 2017-216873 | A | 12/2017 |
| JP | 2019-504610 | A | 2/2019 |
| JP | 2019-161928 | A | 9/2019 |
| WO | 2018/043429 | A1 | 3/2018 |

OTHER PUBLICATIONS

Notice of Reasons for Refusal dated Sep. 14, 2021, received for JP Application 2021-537917, 7 pages including English Translation.
Decision to Grant dated Jan. 4, 2022, received for JP Application 2021-537917, 5 pages including English Translation.
Office Action dated Jan. 10, 2024 for Chinese patent application No. 202180087316.7. 9 pages (English translation attached).

* cited by examiner

STACKED CORE MANUFACTURING METHOD AND STACKED CORE MANUFACTURING APPARATUS

CROSS-REFERENCE TO RELATED APPLICATION

The present application is based on PCT filing PCT/JP2021/007979, filed Mar. 2, 2021, the entire contents of which are incorporated herein by reference.

FIELD

The present disclosure relates to a stacked core including a plurality of steel plates stacked on one another, a manufacturing method for the stacked core, and a manufacturing apparatus for the stacked core.

BACKGROUND

A stacked core used for a stator or a rotor of a rotary electrical machine is manufactured by stacking a plurality of steel plates punched out into a desired shape. In manufacturing of the stacked core, various manufacturing methods or manufacturing apparatuses for fixing steel plates to each other are applied. As a general method for fixing the steel plates to each other, a method by caulking or welding is widely adopted. However, in a case of the method by caulking, there has been a problem that an eddy current loss occurs in a fitted part where a half-punched recess and protrusion are fitted, which increases an iron loss of the stacked core and reduces efficiency of the rotary electrical machine. In addition, in a case of the method by welding, there has been a problem that an eddy current loss occurs in a welded part, which increases an iron loss of the stacked core and reduces efficiency of the rotary electrical machine. As a method for solving the problem of efficiency reduction due to occurrence of the eddy current loss, there is a method for manufacturing a stacked core by stacking a plurality of steel plates while bonding the steel plates to each other.

Regarding the manufacturing method for manufacturing a stacked core by bonding steel plates to each other, Patent Literature 1 discloses using a side pressure structure that applies pressure in a stacking direction to the stacked core in a step of stacking steel plates in a mold. In the side pressure structure, a metal ring is disposed. The metal ring is machined with high accuracy equal to a die used for punching the steel plate. In a manufacturing apparatus of Patent Literature 1, by bringing an inner surface of the metal ring into contact with a side surface of the stacked core, and applying pressure from the side surface to the stacked core, the stacked core is held against a punching force of a punch. The manufacturing apparatus of Patent Literature 1 generates a force to pressurize the stacked core in the stacking direction by applying pressure from the side surface, and stabilizes a thickness of a bonding layer between the steel plates. Patent Literature 2 discloses arranging a ceramic block machined with high accuracy on a side surface of a stacked core, and using a pinch mechanism for preventing a rapid fall of the stacked core.

CITATION LIST

Patent Literature

Patent Literature 1: Japanese Translation of PCT International Application Laid-open No. 2015-519721

Patent Literature 2: Japanese Translation of PCT International Application Laid-open No. 2019-504610

SUMMARY

Technical Problem

In order to increase efficiency of a rotary electrical machine, a method for manufacturing a stacked core by bonding steel plates with each other is effective in order to reduce an iron loss of the stacked core, but the conventional techniques have the following problems.

In the conventional technique disclosed in Patent Literature 1, the stacked core is held by the highly accurately machined metal ring having a dimension slightly smaller than an outer diameter of the stacked core. Every time the number of times of punching by the punch and the die is increased, wear of the punch and the die progresses each time, which increases a contour of the punched steel plate increases. Even if the contour of the steel plate becomes large, the stacked core can pass as long as a force applied to the metal ring is a force in an elastic region of the metal ring. If the contour of the steel plate increases to such an extent that the force applied to the metal ring exceeds the elastic region, the stacked core jams in the metal ring. In a case where the metal ring is machined as needed in accordance with a dimension of the contour of the steel plate, and the metal ring is replaced as needed, productivity of the stacked core is significantly deteriorated.

In the conventional technique disclosed in Patent Literature 2, the ceramic block is a component that comes into contact with the side surface of the stacked core. Since ceramic blocks are more easily worn than metal blocks, the ceramic block needs to be replaced more frequently due to the wear. By replacing the ceramic block with a high frequency, productivity of the stacked core is significantly deteriorated. In addition, in the conventional technique disclosed in Patent Literature 2, in order to bring the ceramic block into contact with the side surface of the stacked core, it is necessary to apply an adhesive and to pressurize the stacked core so that the adhesive does not protrude from the side surface of the stacked core. In this case, since there are many restrictions on a position where the adhesive is applied, a bonding area has to be reduced, and bonding strength between the steel plates is deteriorated. Furthermore, when the adhesive protrudes from the side surface of the stacked core due to application of an excessive adhesive, productivity of the rotary electrical machine may be deteriorated when the adhesive scraped off by the ceramic block or by the pinch mechanism becomes impurities and adheres to the stacked core. Therefore, according to the conventional techniques, there has been a problem that it is difficult to obtain a stacked core capable of having steel plates firmly fixed to each other and capable of being manufactured with high productivity.

The present disclosure has been made in view of the above, and an object thereof is to obtain a stacked core capable of having steel plates firmly fixed to each other and capable of being manufactured with high productivity.

Solution to Problem

In order to solve the above-described problems and achieve the object, a stacked core according to the present disclosure includes a plurality of steel plates stacked on one another to constitute a stacked body, a first bonding layer to fix steel plates to each other, the first bonding layer being sandwiched between the steel plates in the stacked body, and a second bonding layer to fix each of the plurality of steel plates to one another, the second bonding layer being spread in a stacking direction of the plurality of steel plates on a side surface of the stacked body including an end surface of each of the plurality of steel plates.

Advantageous Effects of Invention

The stacked core according to the present disclosure has an effect of being able to have the steel plates firmly fixed to each other and to be manufactured with high productivity.

DESCRIPTION OF EMBODIMENTS

Hereinafter, a stacked core, a manufacturing method for the stacked core, and a manufacturing apparatus for the stacked core according to embodiments will be described in detail with reference to the drawings.

First Embodiment

Figure 1:
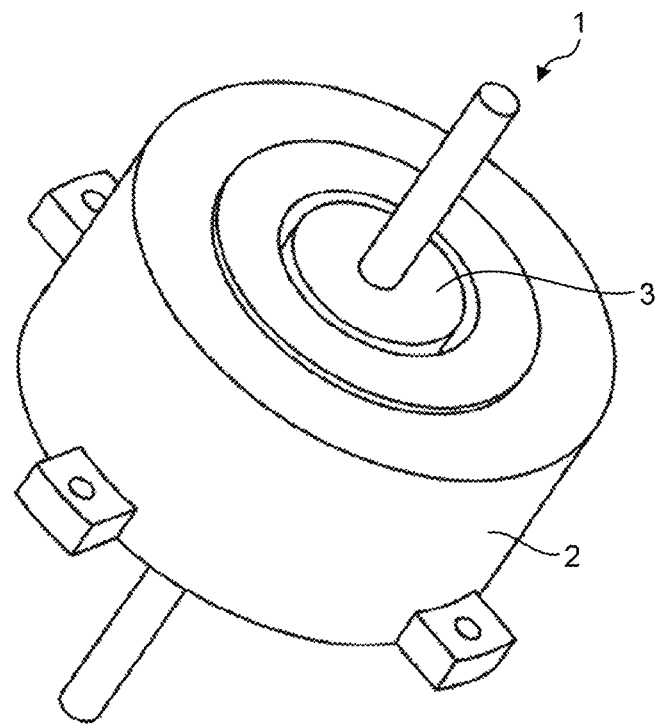
FIG. 1 is a view illustrating a rotary electrical machine including a stacked core according to a first embodiment.

FIG. 1 is a view illustrating a rotary electrical machine 1 including a stacked core according to a first embodiment. The rotary electrical machine 1 includes a stator 2, and a rotor 3 that is surrounded by the stator 2 and rotatably provided. In the following description, an axial direction of the rotary electrical machine 1 refers to a direction of an axis that is a rotation center of the rotor 3.

Figure 2:
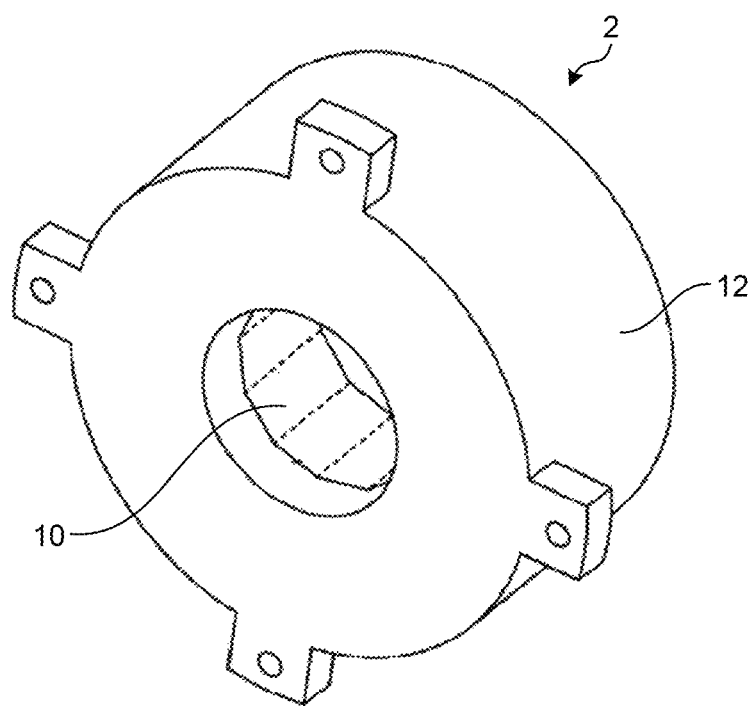
FIG. 2 is a view illustrating a stator constituting the rotary electrical machine illustrated in FIG. 1.

FIG. 2 is a view illustrating the stator 2 constituting the rotary electrical machine 1 illustrated in FIG. 1. The stator 2 includes a plurality of stator cores 10 and a resin 12 that seals the plurality of stator cores 10. The resin 12 seals outer surfaces of the plurality of stator cores 10 assembled in an annular shape. The resin 12 is a thermosetting resin such as an epoxy resin, a urea resin, a phenol resin, or a varnish, or a thermoplastic resin such as liquid crystal polymer (LCP), polyphenylene sulfide (PPS), polybutylene terephthalate (PBT), polyoxymethylene (POM), polyamide (PA), syndiotactic polystyrene (SPS), or acrylonitrile butadiene styrene (ABS).

Figure 3:
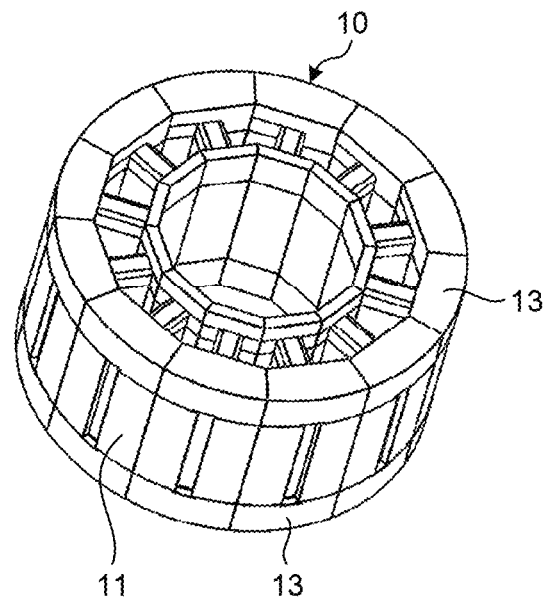
FIG. 3 is a view illustrating a state in which a plurality of stator cores constituting the stator illustrated in FIG. 2 are assembled in an annular shape.

FIG. 3 is a view illustrating a state in which the plurality of stator core 10 constituting the stator 2 illustrated in FIG. 2 are assembled in an annular shape. Each stator core 10 includes a stacked core 11 according to the first embodiment, an insulation component 13 assembled to the stacked core 11, a coil consisting of a winding wire wound around the stacked core 11 and the insulation component 13, and an electric wire connecting ends of the winding wire. The coil and the electric wire are not illustrated. The winding wire is wound after the insulation component 13 is assembled to the stacked core 11. Ends of the winding wire wound around a tooth portion of each stator core 10 are connected to each other to form a connection circuit for supplying a current to the coil. To the connection circuit, a circuit board for shortening an axial length of the rotary electrical machine 1 may be connected. Ends of the winding wire drawn from the coil of each tooth are connected by welding, soldering, fixing to contact terminals, or the like so as to conform to specifications of the rotary electrical machine 1.

In the first embodiment, the stacked core 11 applied to the stator 2, a manufacturing method for the stacked core 11, and a manufacturing apparatus for the stacked core 11 will be described. Note that, a stacked core similar to the stacked core 11 according to the first embodiment may be applied to the rotor 3. An example in which a stacked core similar to the stacked core 11 according to the first embodiment is applied to the rotor 3 will be described in a second embodiment.

Figure 4:
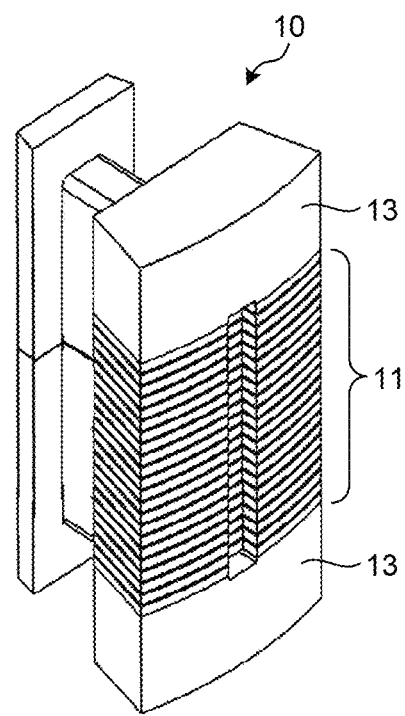
FIG. 4 is a view illustrating the stator core constituting the stator illustrated in FIG. 2.

FIG. 4 is a view illustrating the stator core 10 constituting the stator 2 illustrated in FIG. 2. The insulation component 13 is disposed between the stacked core 11 and the coil. By disposing the insulation component 13, an alignment property of the winding wire can be improved, and an insulation distance between the stacked core 11 and the coil is maintained. By maintaining the insulation distance between the stacked core 11 and the coil, insulation performance of the rotary electrical machine 1 is secured.

The insulation component 13 is molded in advance in a step different from a step of assembling the insulation component 13 to the stacked core 11. In the first embodiment, the insulation component 13 is molded by injection molding using a thermoplastic resin such as LCP, PPS, PBT, POM, PA, SPS, or ABS. The insulation component 13 is assembled from each of both ends of the stacked core 11 in the axial direction. The insulation component 13 forms an electrically insulating structure by covering both ends of the stacked core 11 in the axial direction and both side surfaces of the stacked core 11. In the first embodiment, the insulating structure of the stacked core 11 is configured by combining two insulation components 13.

In the structure in which the insulation component 13 is assembled from each of both ends of the stacked core 11 in the axial direction, the insulation distance between the stacked core 11 and the coil may be insufficient in a gap generated by butting of the insulation components 13. In this case, by mounting an insulating film in the gap, the rotary electrical machine 1 can ensure the insulation performance.

The insulation component 13 may be molded by an insert molding method. In the insert molding method, an insulating structure for sealing the stacked core 11 is directly formed on the stacked core 11, by injecting a thermoplastic resin to the stacked core 11 disposed inside a mold for injection molding. According to the insert molding method, it is possible to form the insulating structure without the gap as described above.

The insulation component 13 may be configured by applying an insulating paint, an insulating film, insulating paper, or the like to a surface of the stacked core 11. Any configuration of the insulation component 13 may be adopted as long as the configuration conforms to a purpose of the rotary electrical machine 1 or specifications of the rotary electrical machine 1.

Figure 5:
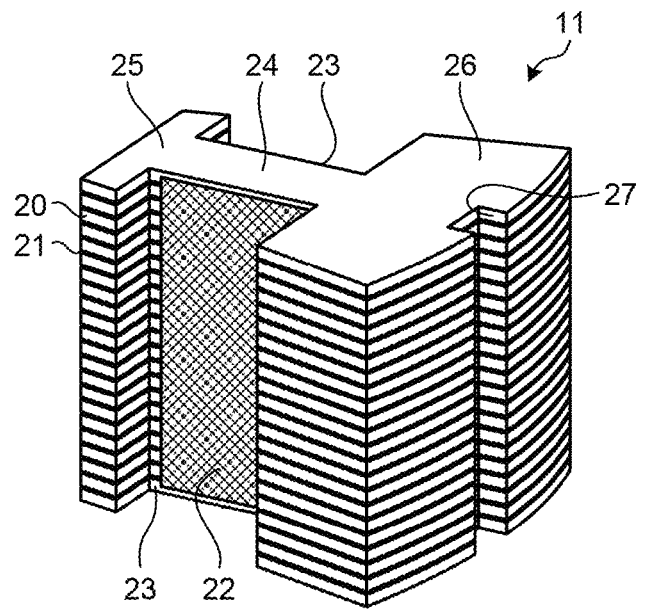
FIG. 5 is a view illustrating the stacked core according to the first embodiment.
Figure 6:
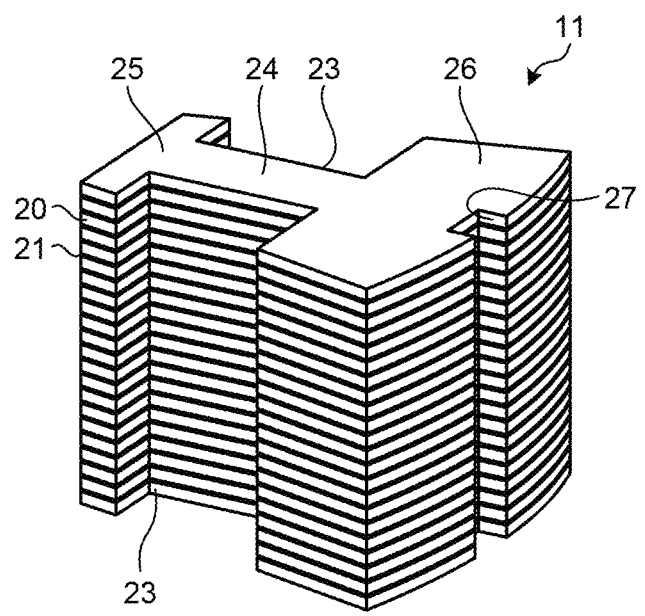
FIG. 6 is a view illustrating a configuration in which a second bonding layer is removed from the stacked core illustrated in FIG. 5.
Figure 7:
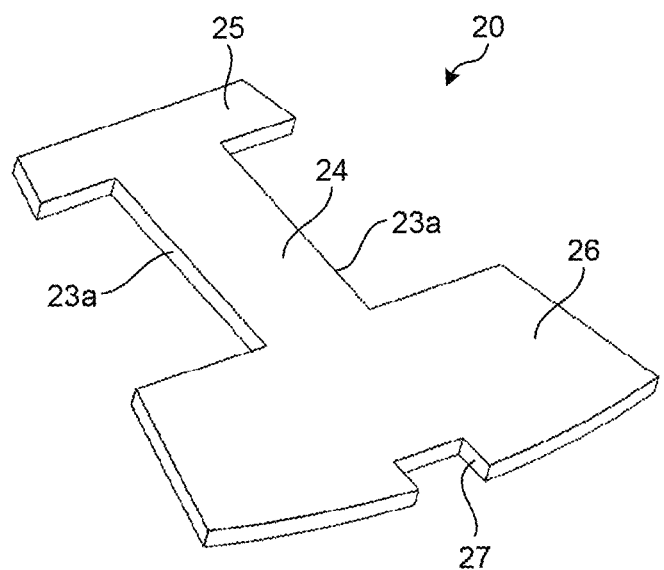
FIG. 7 is a view illustrating a single plate which is a steel plate constituting the stacked core illustrated in FIG. 5.

FIG. 5 is a view illustrating the stacked core 11 according to the first embodiment. FIG. 6 is a view illustrating a configuration in which a second bonding layer 22 is removed from the stacked core 11 illustrated in FIG. 5. FIG. 7 is a view illustrating a single plate 20 which is a steel plate constituting the stacked core 11 illustrated in FIG. 5.

The stacked core 11 illustrated in FIG. 5 includes: a plurality of single plates 20 stacked on one another; a first bonding layer 21 that is sandwiched between the single plates 20 in a stacked body consisting of the plurality of single plates 20 and fixes the single plates 20 to each other; and the second bonding layer 22 provided on a side surface 23 of the stacked body. The side surface 23 on which the second bonding layer 22 is provided is a surface obtained by integrating each end surface 23a of the plurality of single plates 20. FIG. 6 illustrates the stacked body consisting of the plurality of single plates 20 and the plurality of first bonding layers 21 that fix the single plates 20 to each other. The second bonding layer 22 is provided on each of two side surfaces 23 of the stacked body. FIGS. 5 and 6 illustrate one of the two side surfaces 23. Another one of the two side surfaces 23 is provided at a position invisible in FIGS. 5 and 6.

As illustrated in FIG. 7, each of the plurality of single plates 20 is manufactured by punching out a desired shape from a hoop material by press working. The single plate 20 is an electromagnetic steel plate or a silicon steel plate. In the following description, the single plate 20 is an electromagnetic steel plate. The electromagnetic steel plate is a non-oriented electromagnetic steel plate or an oriented electromagnetic steel plate. In order to improve productivity in a step after a step of stacking the single plates 20, it is necessary to stack the single plates 20 while fixing the single plates 20 to each other. A thickness of the single plate 20 is, for example, in a range of 0.1 mm to 2.0 mm. In order to prevent generation of an eddy current in the stacked core 11 due to a current flowing in the coil and deterioration of efficiency of the rotary electrical machine 1, the stacked core 11 is configured by stacking the thin single plates 20 in this manner.

The single plate 20 includes a core back portion 26 and a tooth portion extending from the core back portion 26. The tooth portion consists of a tooth central portion 24 and a tooth distal end portion 25. On the core back portion 26 on a side opposite to the tooth portion, a groove 27 is provided. The end surface 23a is each of both side surfaces of the tooth central portion 24. The end surface 23a is a surface of the single plate 20 other than a plate surface to be bonded by the first bonding layer 21.

If the single plates 20 are bonded to each other only by the first bonding layer 21, bonding strength between the single plates 20 is determined by physical properties of the adhesive, a bonding area, and a degree of progress of curing reaction of the adhesive. As a size of the rotary electrical machine 1 is reduced or a diameter of the rotary electrical machine 1 is reduced, an area to which the adhesive can be applied is reduced. As the area where the adhesive is applied is smaller, the bonding strength becomes smaller. Furthermore, as the stacked core 11 becomes longer in the axial direction, a weight of the stacked core 11 becomes larger, and thus insufficient bonding strength becomes a problem. When the bonding strength is insufficient, breakage of the first bonding layer 21 or peeling between the single plates 20 is likely to occur in a manufacturing process of the stacked core 11.

In the stacked core 11 according to the first embodiment, the single plates 20 are fixed with each other by the first bonding layer 21, and the plurality of single plates 20 are fixed with each other by the second bonding layer 22. The second bonding layer 22 is formed by intentionally causing protrusion of the adhesive applied between the single plates 20 up to the side surface 23, and causing the adhesive to wet and spread in the stacking direction.

Figure 8:
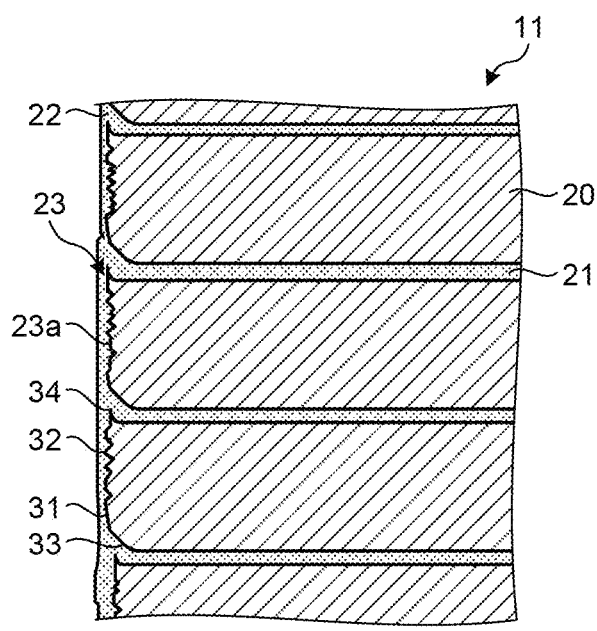
FIG. 8 is a partial cross-sectional view of the stacked core according to the first embodiment.

FIG. 8 is a partial cross-sectional view of the stacked core 11 according to the first embodiment. FIG. 8 illustrates a portion including one second bonding layer 22 in a cross section crossing the tooth central portion 24. By the bonding strength exhibited by the first bonding layer 21 between the single plates 20, the single plates 20 are fixed to each other. Furthermore, on the side surface 23, the plurality of single plates 20 are individually fixed to one another by the second bonding layer 22.

On the end surface 23a which is a cut portion of the press working, a shear surface 31, a fracture surface 32, a shear droop 33, and a burr 34 are distributed in a cutting direction. The shear surface 31 is irregularities having a vertical streak shape on the end surface 23a. The fracture surface 32 is irregularities having a shape as if a material is peeled off at the end surface 23a. The shear droop 33 has a smooth bent shape at a corner of the single plate 20. The burr 34 is a protrusion of the material at a corner of the single plate 20.

A part of the adhesive protruding from between the single plates 20 to the end surface 23a of each single plate 20 enters each of the shear surface 31, the fracture surface 32, the shear droop 33, and the burr 34. Each of the shear surface 31, the fracture surface 32, the shear droop 33, and the burr 34 constitutes irregularities on the end surface 23a. The adhesive entering each of the shear surface 31, the fracture surface 32, the shear droop 33, and the burr 34 and cured constitutes an anchor structure. The second bonding layer 22 has the anchor structure formed on the end surface 23a. That is, the second bonding layer 22 having the anchor structure is formed on the side surface 23.

Since the second bonding layer 22 having the anchor structure is formed on the side surface 23, a bonding force between the second bonding layer 22 and the side surface 23 is increased by an anchor effect. In addition, the formation of the second bonding layer 22 having the anchor structure increases an area of a portion where the second bonding layer 22 and each single plate 20 are in contact with each other. Thus, in the stacked core 11, each of the plurality of single plates 20 can be firmly fixed by the second bonding layer 22.

On a surface of the single plate 20 which is an electromagnetic steel plate, an insulating film is formed. The insulating film is not illustrated. The insulating film is an inorganic substance, an organic substance, or a mixture of an inorganic substance and an organic substance. Insulation between the single plates 20 is maintained by the insulating film. Note that a thickness of the single plate 20 can be freely determined depending on a purpose of the rotary electrical machine 1 or performance of the rotary electrical machine 1. As the single plate 20 is thinner, fixing the steel plates with each other by caulking or welding becomes more difficult.

Therefore, the method of bonding the single plates 20 to each other by the first bonding layer 21 and the second bonding layer 22 is effective when the single plates 20 are thin. In addition, as the single plate 20 becomes thinner, an eddy current in the single plate 20 can be prevented and iron loss can be reduced. Therefore, the manufacturing method for the stacked core 11 in which the single plates 20 are bonded to each other by the first bonding layer 21 and the second bonding layer 22 is an effective method for obtaining the high-efficiency rotary electrical machine 1.

Next, a manufacturing method and a manufacturing apparatus for the stacked core 11 according to the first embodiment will be described. The manufacturing method for the stacked core 11 includes: a step of punching the single plate 20 from a hoop material 50 to which a reaction initiator 41 and an adhesive 42 have been applied; a step of sequentially stacking a plurality of punched single plates 20 and forming the first bonding layer 21 with the adhesive 42; and a step of forming the second bonding layer 22 by causing the adhesive 42 to protrude from between the single plates 20. In the step of forming the second bonding layer 22, a manufacturing apparatus 40 applies a force in the stacking direction to the stacked body including the plurality of single plates 20, to cause the adhesive 42 to protrude from between the single plates 20. The manufacturing apparatus 40 forms the second bonding layer 22 by causing the adhesive 42 to protrude and causing the adhesive 42 to spread in the stacking direction on the side surface 23 of the stacked body.

Figure 9:
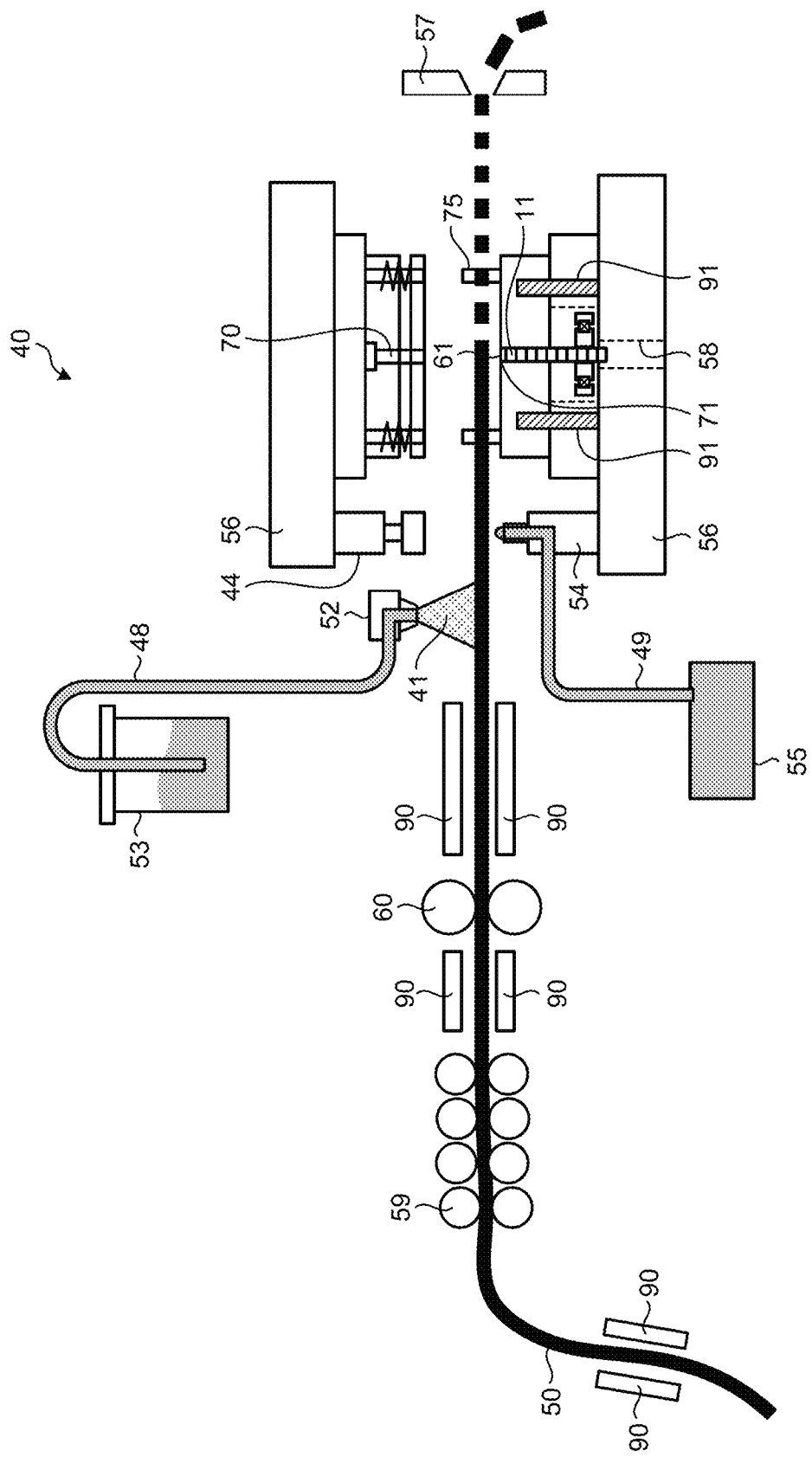
FIG. 9 is a view illustrating a manufacturing apparatus for the stacked core according to the first embodiment.

FIG. 9 is a view illustrating the manufacturing apparatus 40 for the stacked core 11 according to the first embodiment. The manufacturing apparatus 40 includes: a pressing machine that performs press working; a press mold 56; a feeding device 60 that feeds the hoop material 50, which is a material, to the press mold 56 in conjunction with the pressing machine; a leveler 59 that corrects a winding curl of the hoop material 50; a cutter 57 that pulverizes the hoop material 50 after the single plate 20 is punched out; and an application device that applies an adhesive and the reaction initiator 41 to the hoop material 50 before the press working.

The reaction initiator 41 promotes curing reaction of an adhesive as a main agent. In the manufacturing apparatus 40, the adhesive is cured by using the reaction initiator 41. The application device includes: a first nozzle 52 that sprays the reaction initiator 41 to the hoop material 50; a first tank 53 that stores the reaction initiator 41; a first pipe 48 through which the reaction initiator 41 fed from the first tank 53 to the first nozzle 52 passes; a second nozzle 54 that discharges the adhesive to the hoop material 50; a second tank 55 that stores the adhesive; a second pipe 49 through which the adhesive fed from the second tank 55 to the second nozzle 54 passes; and a controller that controls application of the reaction initiator 41 and the adhesive. The controller is not illustrated.

The application device applies the reaction initiator 41 to an upper surface of the hoop material 50. The application device applies the adhesive to a lower surface of the hoop material 50. The upper and the lower refer to upper and lower in the figure. In this manner, the application device applies the adhesive to a surface of the hoop material 50 opposite to a surface to which the reaction initiator 41 is applied.

The feeding device 60 sequentially feeds the hoop material 50 toward the press mold 56 in conjunction with the pressing machine. The application device sprays the reaction initiator 41 with the first nozzle 52, toward a preset position before the press mold 56. The first nozzle 52 sprays the reaction initiator 41 to a preset region on the upper surface of the hoop material 50 without contacting the hoop material 50. The controller of the application device controls a position where the reaction initiator 41 is applied, a size of a region where the reaction initiator 41 is applied, and an amount of the reaction initiator 41 to be applied. The application device can accurately apply the reaction initiator 41 to a portion to be punched out by the press mold 56, by being in conjunction with the pressing machine and the feeding device 60.

The application device discharges the adhesive with the second nozzle 54, toward a preset position before the press mold 56. A viscosity of the adhesive is higher than a viscosity of the reaction initiator 41. The application device discharges a preset amount of the adhesive from the second nozzle 54. A pusher 44 attached to the press mold 56 moves up and down in conjunction with the pressing machine. When the pusher 44 pushes down the hoop material 50, the adhesive discharged from the second nozzle 54 comes into contact with the lower surface of the hoop material 50. As a result, the adhesive is applied to the hoop material 50. The controller of the application device controls a position where the adhesive is applied, a size of a region where the adhesive is applied, and a discharge amount of the adhesive. The application device can accurately apply the adhesive to a portion to be punched out by the press mold 56, by being in conjunction with the pressing machine and the feeding device 60.

The position where the reaction initiator 41 is applied, the amount of the reaction initiator 41, the position where the adhesive is applied, and the amount of the adhesive are set in advance in accordance with a bonding area between the single plates 20. The bonding area is an area of a region where the adhesive is spread. The controller stores information on the set position and amount. The bonding area affects the bonding strength between the single plates 20. The controller can freely switch the position to which the reaction initiator 41 is applied, the position to which the adhesive is applied, and the amounts of the reaction initiator 41 and the adhesive necessary for fixing the single plates 20 to each other, in accordance with a type of the stacked core 11.

The controller counts the number of stacked single plates 20 by counting the number of times of pressing by the pressing machine. When the number of stacked single plates 20 reaches a preset number, the controller retracts the pusher 44 upward from the hoop material 50. By retracting the pusher 44, pressing of the hoop material 50 against the pusher 44 is released. Since the application of the adhesive is interrupted when the preset number of single plates 20 are stacked, the manufacturing apparatus 40 can manufacture the stacked core 11 consisting of a desired number of the single plates 20 by continuous pressing. The manufacturing apparatus 40 can switch the number of single plates 20 to be stacked by controlling a timing of interrupting application of one of the reaction initiator 41 and the adhesive. The manufacturing apparatus 40 may switch the number of single plates 20 to be stacked by controlling a timing of interrupting application of both the reaction initiator 41 and the adhesive.

As the pressing machine moves up and down, the single plate 20 having a preset shape is punched out from the hoop material 50 by a punch 70 and a die 71 incorporated in the press mold 56. The punched single plate 20 is stacked in the press mold 56. By curing of the adhesive in the press mold 56, the single plates 20 are fixed to each other. The stacked core 11 formed by fixing the single plates 20 to each other is discharged from a discharge port 58 of the press mold 56.

Figure 10:
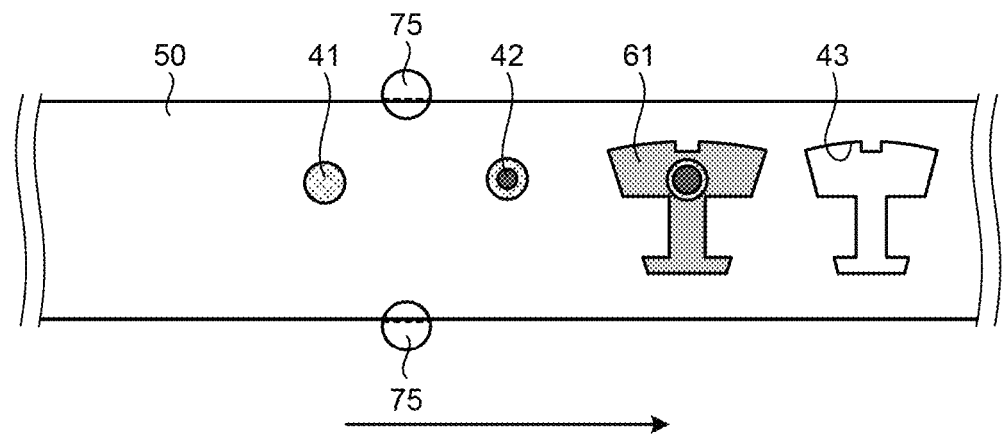
FIG. 10 is a first view illustrating a state in which a hoop material is fed in the manufacturing apparatus illustrated in FIG. 9.
Figure 11:
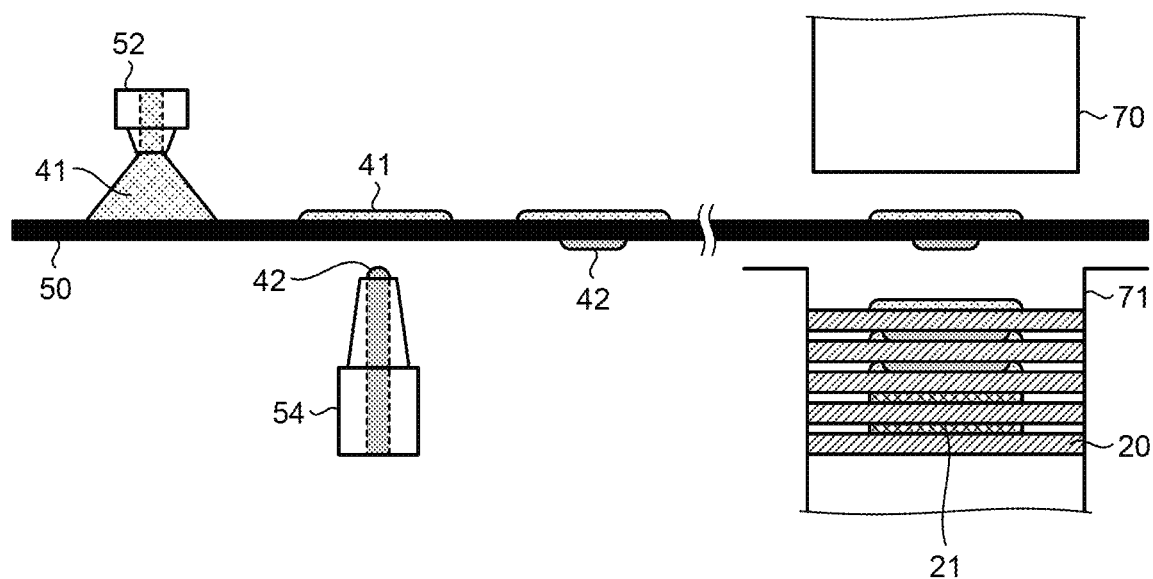
FIG. 11 is a second view illustrating a state in which the hoop material is fed in the manufacturing apparatus illustrated in FIG. 9.

FIG. 10 is a first view illustrating a state in which the hoop material 50 is fed in the manufacturing apparatus 40 illustrated in FIG. 9. FIG. 11 is a second view illustrating a state in which the hoop material 50 is fed in the manufacturing apparatus 40 illustrated in FIG. 9. FIG. 10 illustrates a state of the hoop material 50 to which the reaction initiator 41 and the adhesive 42 have been applied, as viewed from above. Although the adhesive 42 is not visible from above the hoop material 50, FIG. 10 illustrates the adhesive 42 applied to the lower surface of the hoop material 50 for reference. FIG. 11 illustrates a state in which the hoop material 50 is fed and a state in which the punched single plates 20 are stacked, as viewed from a side.

The hoop material 50 to which the reaction initiator 41 and the adhesive 42 have been applied is sequentially fed to the press mold 56 by the feeding device 60. In FIG. 10, a rightward direction is a feeding direction of the hoop material 50. The feeding device 60 accurately matches a portion to be punched out in the hoop material 50 with a punching part 61 where punching is performed in the press mold 56. The punching part 61 is provided with the punch 70 and the die 71.

The feeding device 60 and the press mold 56 are accurately positioned and fixed in advance in the pressing machine. The feeding device 60 repeats feeding of the hoop material 50 and stopping of the hoop material 50 in conjunction with the pressing machine. The feeding device 60 accurately controls the position where the reaction initiator 41 is applied and a position where the adhesive 42 is applied.

In the press mold 56, a guide pin 75 that guides the hoop material 50 is installed. In the guide pin 75, a groove through which the hoop material 50 passes is formed. The hoop material 50 is guided by the guide pin 75 and fed. The guide pin 75 functions as a positioning means for the hoop material 50 in the press mold 56. The guide pin 75 moves up and down by using a spring incorporated in the guide pin 75. When the press mold 56 moves downward from above the hoop material 50 and the hoop material 50 is pressed downward, the guide pin 75 slides downward together with the hoop material 50.

When the movement of the press mold 56 turns to the upward movement, the guide pin 75 moves upward by using a repulsive force of the spring. The guide pin 75 lifts the hoop material 50 upward by the upward movement. In a state where the hoop material 50 is lifted upward, the feeding device 60 feeds the hoop material 50 in the feeding direction. As a result, feeding of the hoop material 50 is not hindered by the punch 70 or the die 71, and the hoop material 50 does not jam in the press mold 56.

A portion to be punched out in the hoop material 50 sequentially passes through the position where the reaction initiator 41 is applied and the position where the adhesive 42 is applied, and reaches the punching part 61. By accurate positioning by the feeding device 60, the single plate 20 in a state where the reaction initiator 41 and the adhesive 42 are applied at accurate positions is punched out from the hoop material 50. The single plate 20 punched out by the punch 70 and the die 71 is stacked in the press mold 56. The hoop material 50 including a hole 43 formed by punching the single plate 20 is fed in the feeding direction. Note that a process in which the single plates 20 are fixed to each other by bonding reaction will be described later.

The positioning means for the hoop material 50 in the press mold 56 is not limited to the guide pin 75. A positioning pin as the positioning means may be disposed in the press mold 56, and the positioning pin may be inserted into a positioning hole formed in advance in the hoop material 50. Instead of the positioning pin, a positioning block that can be fitted into the positioning hole may be disposed in the press mold 56.

The cutter 57 illustrated in FIG. 9 is disposed ahead of the press mold 56 in the feeding direction. The cutter 57 crushes the hoop material 50 after the single plate 20 is punched out. The manufacturing apparatus 40 discharges the crushed hoop material 50. The manufacturing apparatus 40 may cause a winding device to wind the hoop material 50 after the single plate 20 is punched out, without crushing the hoop material 50 after the single plate 20 is punched out.

In FIG. 9, the feeding device 60 is disposed before the press mold 56 in the feeding direction. The feeding device 60 may be disposed ahead of the press mold 56 in the feeding direction, or may be disposed both before the press mold 56 in the feeding direction and ahead of the press mold 56 in the feeding direction. Further, in the first embodiment, the manufacturing apparatus 40 supplies the hoop material 50 to the punching part 61 of the press mold 56, but a steel plate cut into a desired size may be supplied to the punching part 61.

The position of the first nozzle 52 and the position of the second nozzle 54 are not limited to the positions illustrated in FIG. 9, and may be appropriately changed. The first nozzle 52 may be installed below the hoop material 50, or may be installed both above the hoop material 50 and below the hoop material 50. The second nozzle 54 may be installed above the hoop material 50, or may be installed both above the hoop material 50 and below the hoop material 50.

A heater 90 illustrated in FIG. 9 is disposed before the press mold 56 in the feeding direction. The heater 90 heats the hoop material 50. By heating the hoop material 50, temperatures of the reaction initiator 41 and the adhesive 42 can be stabilized, and an effect of stabilizing the bonding reaction can be obtained. In a case of the reaction initiator 41 in which the sprayability is improved by including a catalyst for curing reaction in an organic solvent, volatilization in shorter time becomes possible by increasing the temperature of the reaction initiator 41. In this case, since the manufacturing apparatus 40 can shorten the time required for the curing reaction, productivity of the stacked core 11 can be improved. Even when the heater 90 is disposed between the first nozzle 52 and the press mold 56, the manufacturing apparatus 40 can obtain an effect similar to the case where the heater 90 is disposed before the first nozzle 52 in the feeding direction.

A mold heating device 91 illustrated in FIG. 9 is disposed ahead of the punching part 61 in the feeding direction in the press mold 56. The mold heating device 91 heats the press mold 56. The manufacturing apparatus 40 indirectly heats the stacked core 11 by heating the press mold 56. The mold heating device 91 indirectly heats the stacked core 11 by heating the press mold 56 by using a cartridge heater, a band heater, an induction heating coil, a water flow circuit using hot water as a medium, an air blowing circuit that sends hot air, or the like. Also by heating with the mold heating device 91, the manufacturing apparatus 40 can obtain an effect similar to the case of heating by the heater 90. The manufacturing apparatus 40 may directly heat the stacked core 11 instead of indirectly heating the stacked core 11. The manufacturing apparatus 40 may directly heat the stacked core 11 by using an induction heating coil, or may directly heat the stacked core 11 by directly applying hot air to the stacked core 11.

In FIG. 9, the manufacturing apparatus 40 is provided with one first nozzle 52 and one second nozzle 54. The manufacturing apparatus 40 may be provided with two or more first nozzles 52 and two or more second nozzles 54. In this case, the manufacturing apparatus 40 can apply the reaction initiator 41 and the adhesive 42 simultaneously at a plurality of positions. The number of positions where the reaction initiator 41 and the adhesive 42 are applied can be freely determined in accordance with a shape of the stacked core 11, a size of the stacked core 11, or a weight of the stacked core 11.

Further, the first nozzle 52 is not limited to one that applies the reaction initiator 41 to a dot-shaped region on the hoop material 50, and may be one that applies the reaction initiator 41 to a linear region on the hoop material 50. The second nozzle 54 is not limited to one that applies the adhesive 42 to a dot-shaped region on the hoop material 50, and may be one that applies the adhesive 42 to a linear region on the hoop material 50. A shape of the first nozzle 52 and a shape of the second nozzle 54 can be any shape.

In FIG. 9, the first nozzle 52 and the second nozzle 54 are fixed to the pressing machine together with the press mold 56. The first nozzle 52 and the second nozzle 54 may be movable. In this case, the first nozzle 52 and the second nozzle 54 are fixed to a drive source. The drive source is, for example, a servomotor, a combination of a mechanical stopper and an air cylinder, or the like. The manufacturing apparatus 40 can accurately move the first nozzle 52 and the second nozzle 54 to preset positions by control of the drive source.

In FIG. 9, the first nozzle 52 is disposed before the second nozzle 54 in the feeding direction. The first nozzle 52 may be disposed ahead of the second nozzle 54 in the feeding direction. In this case, the application device can prevent contamination of the second nozzle 54 due to adhesion of the reaction initiator 41 to the second nozzle 54.

The method for applying the reaction initiator 41 and the method for applying the adhesive 42 are not limited to the methods described above. The method for applying the reaction initiator 41 and the method for applying the adhesive 42 may be either a non-contact method such as dropping or inkjet or a contact method such as spatula, brush, stamp, or printing.

The punch 70 and the die 71 punch out the hoop material 50 to which the reaction initiator 41 is applied on the upper surface and the adhesive 42 is applied on the lower surface. Each single plate 20 punched out from the hoop material 50 is stacked in the press mold 56. FIG. 11 illustrates a state in which the single plates 20 are stacked in the press mold 56.

The reaction initiator 41 applied to the upper surface of the punched and stacked single plate 20 comes into contact with the adhesive 42 applied to a lower surface of a next punched single plate 20 after the single plate 20. The adhesive 42 starts curing reaction by the contact with the reaction initiator 41. By the curing of the adhesive 42, the first bonding layer 21 is formed between the single plates 20 adjacent to each other in the stacking direction. The single plates 20 adjacent to each other in the stacking direction are fixed to each other by the first bonding layer 21. When the single plates 20 are sequentially stacked, a stacked body consisting of the single plates 20 is pushed downward in the press mold 56. In this process, the curing reaction of the adhesive 42 proceeds. The stacked body advances downward in the press mold 56, and is discharged from the discharge port 58.

Next, a configuration of the press mold 56 will be described. Here, before describing the configuration of the press mold 56 included in the manufacturing apparatus 40 according to the first embodiment, a comparative example of the press mold 56 will be described.

Figure 12:
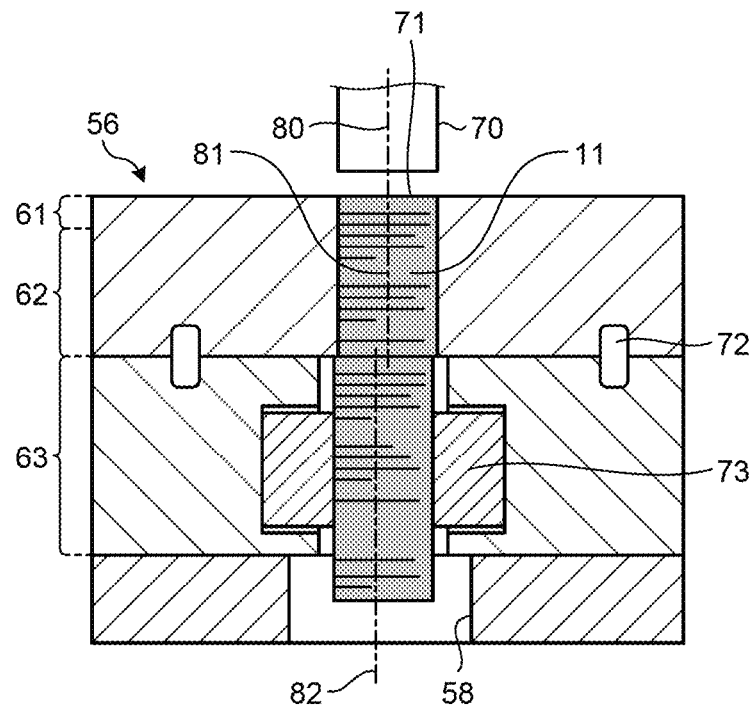
FIG. 12 is a view illustrating a first comparative example of a press mold in the first embodiment.

FIG. 12 is a view illustrating a first comparative example of the press mold 56 according to the first embodiment. The press mold 56 according to the first comparative example includes the punching part 61, a stacking part 62, and a holding part 63. In order to punch the single plate 20 having a desired shape, the punch 70 and the die 71 machined with high accuracy are accurately positioned and assembled to the press mold 56. The individual punched single plates 20 are sequentially stacked in the stacking part 62 below the punching part 61.

A contour of the stacking part 62 in a plane perpendicular to the stacking direction of the single plate 20 is slightly larger than a contour of the punching part 61 in the plane. The individual single plates 20 are aligned and stacked in the stacking direction in the stacking part 62. The stacked core 11 consisting of the individual stacked single plates 20 is fed to the holding part 63 below the stacking part 62. The stacking part 62 and the holding part 63 are fixed to each other by a positioning block 72 such that a center 81 of the stacking part 62 coincides with a center 82 of the holding part 63.

The holding part 63 is provided with a plurality of holding blocks 73. The holding block 73 comes into contact with each of the plurality of side surfaces of the stacked core 11. FIG. 12 illustrates two holding blocks 73 facing each other via the stacked core 11. Metal such as iron, aluminum, copper, or brass is used for the holding block 73. The holding block 73 is also referred to as a metal ring. The holding block 73 is accurately machined in accordance with the contour of the single plate 20, and is accurately positioned by the holding part 63. Pressure due to friction with the holding block 73 is applied to the side surface of the stacked core 11. The holding part 63 holds the stacked core 11 against a punching force of the punch 70, by applying pressure to the stacked core 11 from the side surface by the holding block 73. The holding part 63 prevents the stacked core 11 from falling off to the discharge port 58, with a stable holding force.

The holding part 63 pressurizes the stacked core 11 in the stacking direction by holding the stacked core 11. That is, the holding part 63 compresses the stacked core 11 in the stacking direction. By compressing between the individual single plates 20 in the stacked core 11, a thickness of each first bonding layer 21 in the stacked core 11 can be stabilized.

Every time the number of times of punching by the punch 70 and the die 71 is increased, wear of the punch 70 and the die 71 progresses. Due to the wear of the punch 70 and the die 71, a contour of the single plate 20 obtained by punching after several 100,000 times of punching is larger by about 0.1 μm to 100 μm than a contour obtained by the first punching. A degree of the wear of the punch 70 and the die 71 varies depending on a material of the punch 70 and the die 71.

As the contour of the single plate 20 increases every time the number of times of punching is increased, a frictional force between the stacked core 11 and the holding block 73 increases. Even if the contour of the single plate 20 increases, the stacked core 11 can pass through the holding part 63 as long as a force applied to the holding block 73 is a force within an elastic region of the holding block 73. However, when the contour of the single plate 20 increases to such an extent that the force applied to the holding block 73 exceeds the elastic region, the stacked core 11 jams in the holding part 63. As described above, according to the first comparative example, even if the holding block 73 machined with high accuracy is positioned with high accuracy, the stacked core 11 may jam in the holding part 63. In addition, in a case where the holding block 73 is machined as needed in accordance with a dimension of the contour of the single plate 20 and the holding block 73 is replaced as needed, productivity of the stacked core 11 is significantly deteriorated. In addition, manufacturing cost of the stacked core 11 increases due to an increase in facility cost for manufacturing the stacked core 11.

Depending on a shape of the single plate 20 to be punched out, a load at the time of punching is biased, which may promote wear of a part of the punch 70 and the die 71 every time the number of times of punching is increased. When the wear of a part is promoted, a center 80 of the punching part 61 is deviated. The deviation of the center 80 causes an unnecessary stress to be applied to the stacked core 11 fed from the stacking part 62 to the holding part 63. In this case, destruction of the stacked core 11 due to deterioration or peeling of the first bonding layer 21, deterioration of straightness of the stacked core 11, deterioration of parallelism of the stacked core 11, and the like are caused, leading to deterioration of a yield of the stacked core 11, deterioration of quality of the stacked core 11, and an increase in manufacturing cost of the stacked core 11.

The straightness represents a degree of being straight of an object that should be straight. Deterioration of the straightness of the stacked core 11 refers to an increase in a deviation amount of a central axis of the stacked core 11 from a straight line extending in the stacking direction, which is a geometrically accurate straight line. The central axis of the stacked core 11 is an axis passing through a geometric center of a planar shape of each single plate 20. As illustrated in FIG. 12, when the center 82 of the holding part 63 is deviated from the center 81 of the stacking part 62, an external force biased in a direction in which the central axis of the stacked core 11 is directed toward the center 82 of the holding part 63 is applied to the stacked core 11 when the stacked core 11 is fed from the stacking part 62 to the holding part 63. When the biased external force is applied to the stacked core 11, curing of the adhesive 42 may proceed in a state where the stacked core 11 is deformed such that the bonding surfaces of the individual single plates 20 are deviated from each other. This causes the stacked core 11 to be deformed such that the central axis is deviated with respect to the stacking direction. When the adhesive 42 is cured in a state where the bonding surfaces of the individual single plates 20 are deviated from each other, deterioration of straightness due to inclination of the central axis with respect to the original central axis, deterioration of straightness due to curvature of the central axis, or the like occurs, in the stacked core 11.

The parallelism represents a degree of misalignment from a positional relationship parallel to each other between planes that should be parallel to each other. Deterioration of the parallelism of the stacked core 11 means that, with one end surface of the stacked core 11 in the stacking direction as the reference surface, deviation of another end surface of the stacked core 11 in the stacking direction from a state of being parallel to the reference surface becomes large. As illustrated in FIG. 12, when the biased external force is applied to the stacked core 11 due to the deviation of the center 82 of the holding part 63 from the center 81 of the stacking part 62, a bonding surface of one single plate 20 may be inclined with respect to a bonding surface of another single plate 20 in the single plates 20 bonded to each other. The parallelism of the stacked core 11 is deteriorated by curing of the adhesive 42 in a state where the bonding surface of each single plate 20 is inclined.

Even if the press mold 56 is accurately assembled such that the center 81 of the stacking part 62 and the center 82 of the holding part 63 coincide with the center 80 of the punching part 61 by using the positioning block 72, the effect cannot be exerted against wear caused by an increase of the number of times of punching.

Figure 13:
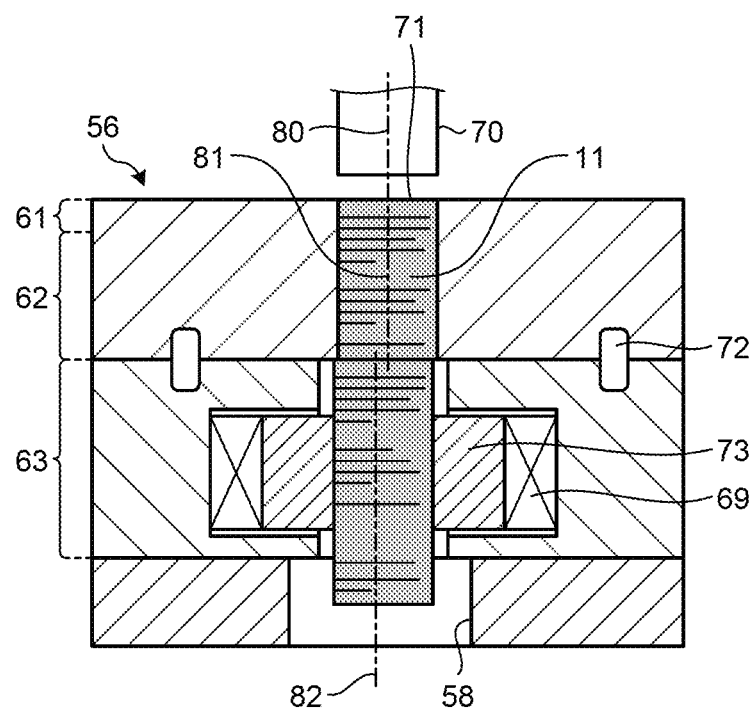
FIG. 13 is a view illustrating a second comparative example of the press mold in the first embodiment.

FIG. 13 is a view illustrating a second comparative example of the press mold 56 according to the first embodiment. In the press mold 56 according to the second comparative example, the holding part 63 is provided with the holding block 73 and a metal elastic body 69. The metal elastic body 69 is, for example, a coil spring, a disc spring, a leaf spring, or the like. By combining the metal elastic body 69 with the holding block 73, an elastic region is enlarged as compared with the case of only the holding block 73. However, even if a material of the metal elastic body 69 is identical, a total length of the individual, a thickness of the individual, and an elastic coefficient vary greatly depending on machining. Therefore, in the case of the second comparative example, aligning the center 82 of the holding part 63 at a certain position is difficult. Furthermore, it is also difficult to maintain balance of pressure from multiple directions and to adjust balance of pressure from multiple directions.

Figure 14:
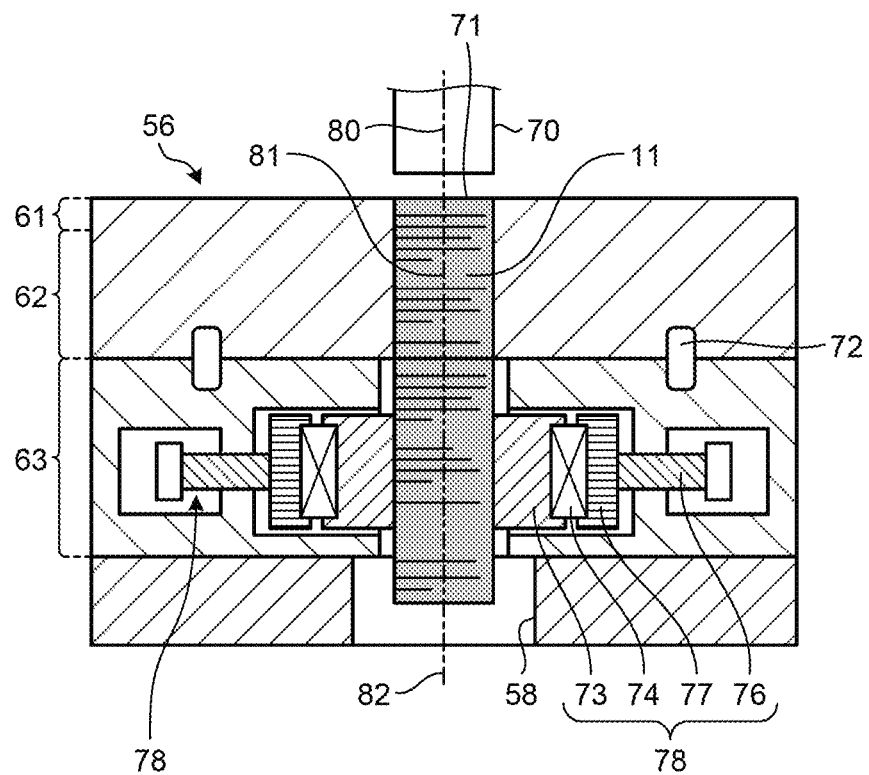
FIG. 14 is a view illustrating a configuration of the press mold included in the manufacturing apparatus according to the first embodiment.

FIG. 14 is a view illustrating a configuration of the press mold 56 included in the manufacturing apparatus 40 according to the first embodiment. The press mold 56 of the first embodiment includes the punching part 61, the stacking part 62, and the holding part 63. Further, the holding part 63 is provided with the holding block 73, a plate-shaped elastic body 74, an adjustment screw 76, and a receiving plate 77. The holding block 73, the plate-shaped elastic body 74, the adjustment screw 76, and the receiving plate 77 constitute a holding mechanism 78. FIG. 14 illustrates a cross section of the press mold 56 and a cross section of the stacked core 11 in the press mold 56. The cross section of the press mold 56 illustrated in FIG. 14 includes lines representing the centers 80, 81, and 82. Further, in the cross section, the two holding blocks 73 face each other in a direction perpendicular to the lines representing the centers 80, 81, and 82. Note that, the center 81 is a line passing through a center of a space where the stacked core 11 is disposed in the stacking part 62. The center 82 is a line passing through a center between the holding blocks 73 provided in the holding part 63.

The plate-shaped elastic body 74 is disposed on a side opposite to the stacked core 11 as viewed from the holding block 73. The plate-shaped elastic body 74 is disposed adjacent to the holding block 73, and comes into contact with the holding block 73. The plate-shaped elastic body 74 adjusts a position of the holding block 73 by elastic deformation. A thickness of the plate-shaped elastic body 74 is accurately managed, and the plate-shaped elastic body 74 is machined. The thickness of the plate-shaped elastic body 74 is a thickness in a direction in which the holding block 73 and the plate-shaped elastic body 74 are adjacent to each other. By providing the plate-shaped elastic body 74, the holding part 63 can apply a force to the side surface of the stacked core 11 from multiple directions.

The receiving plate 77 is disposed on a side opposite to the holding block 73 as viewed from the plate-shaped elastic body 74. The receiving plate 77 is disposed adjacent to the plate-shaped elastic body 74 and comes into contact with the plate-shaped elastic body 74. A distal end of the adjustment screw 76 is in contact with the receiving plate 77. An axis of the adjustment screw 76 is perpendicular to the stacking direction. By rotation of the adjustment screw 76, the receiving plate 77 moves in an axial direction of the adjustment screw 76, that is, in a direction perpendicular to the stacking direction. By moving the receiving plate 77, the adjustment screw 76 moves the holding block 73 and the plate-shaped elastic body 74 in the direction perpendicular to the stacking direction.

The plate-shaped elastic body 74 is, for example, urethane, silicon, synthetic rubber, natural rubber, thermoplastic resin, or the like. The thermoplastic resin is PA, PBT, ABS, PE, or the like. Even if the contour of the single plate 20 becomes larger by, for example, about 0.1 μm to 300 μm than that at the time of the first punching due to wear of the punch 70 and the die 71, the force applied to the plate-shaped elastic body 74 can be kept within the elastic region of the plate-shaped elastic body 74. This allows the holding part 63 to reduce jamming of the stacked core 11 by elastic deformation of the plate-shaped elastic body 74, even if the contour of the single plate 20 becomes large.

Further, by keeping the force applied to the plate-shaped elastic body 74 within the elastic region of the plate-shaped elastic body 74, the press mold 56 can reduce deviation among the center 80 of the punching part 61, the center 81 of the stacking part 62, and the center 82 of the holding part 63. In the press mold 56, when each of the centers 80, 81, and 82 deviates by, for example, about 0.1 μm to 300 μm, such deviation can be absorbed by the plate-shaped elastic body 74. As the plate-shaped elastic body 74 having a wider elastic region than metal and ceramic is selected, the holding part 63 can maintain balance of pressure from multiple directions and adjust balance of pressures from multiple directions, following the increase in the contour of the single plate 20.

Furthermore, in the press mold 56, when wear of a part of the punch 70 and the die 71 is promoted, deviation of the center 80 of the punching part 61 can be absorbed by the plate-shaped elastic body 74. The press mold 56 can prevent unnecessary stress from being applied to the stacked core 11. As a result, the manufacturing apparatus 40 can improve a yield of the stacked core 11 and quality of the stacked core 11. In addition, the manufacturing apparatus 40 can prevent an increase in manufacturing cost of the stacked core 11.

Depending on a type of the adhesive 42, as a layer of the adhesive 42 between the single plates 20 is thicker, time required to complete the curing reaction of the entire first bonding layer 21 becomes longer. When the stacked core 11 reaches the discharge port 58 in a state where the first bonding layer 21 is insufficiently cured, the first bonding layer 21 may be peeled off due to a weight of the stacked core 11 or vibration of the pressing machine.

By providing the plate-shaped elastic body 74, the press mold 56 stabilizes a holding force from the side surface of the stacked core 11. By stabilizing the holding force, the press mold 56 stabilizes a gap between the single plates 20 at, for example, about 1 μm to 30 μm. By the formation of the first bonding layer 21 in such a gap, the press mold 56 can reduce a thickness of the first bonding layer 21 and stabilize the thickness of the first bonding layer 21. As a result, the manufacturing apparatus 40 can reduce variations in time required for curing the adhesive 42 and variations in bonding strength.

As the curing reaction proceeds, the bonding strength approaches the bonding strength exhibited when the adhesive 42 is completely cured. Depending on a type or physical properties of the reaction initiator 41 and the adhesive 42, time required for curing the adhesive 42 is, for example, about 10 seconds to 600 seconds. In order to ensure time necessary and sufficient for curing the adhesive 42 as time during which the stacked core 11 is held in the press mold 56, measures are conceivable such as delaying a machining speed of the pressing machine, intermittently operating the pressing machine, and increasing a size of the press mold 56 in the stacking direction. However, when these measures are taken, the productivity of the stacked core 11 is impaired.

When the stacked core 11 is discharged from the press mold 56, the first bonding layer 21 is required to have bonding strength that can withstand conveyance to a subsequent process or machining in a subsequent process. However, the bonding strength of the first bonding layer 21 does not need to reach the bonding strength exhibited when the adhesive 42 is completely cured, depending on an external force to be applied to the stacked core 11 in the discharge from the press mold 56, the conveyance to the subsequent process, or the machining in the subsequent process. In order to obtain the bonding strength that can withstand the discharge from the press mold 56, the conveyance to the subsequent process, and the machining in the subsequent process, the manufacturing apparatus 40 and the manufacturing method capable of reducing and stabilizing the thickness of the first bonding layer 21 as in the first embodiment are effective. In addition, according to the first embodiment, the manufacturing apparatus 40 can increase a machining speed of the pressing machine and improve the productivity of the stacked core 11.

While the center 80 of the punching part 61 and the center 82 of the holding part 63 are deviated from each other as the number of times of punching is increased, the manufacturing apparatus 40 can reduce the deviation by elastic deformation of the plate-shaped elastic body 74. The manufacturing apparatus 40 can reduce deterioration of the straightness of the stacked core 11 and deterioration of the parallelism of the stacked core 11, and can improve a yield of the stacked core 11.

By being able to improve the straightness of the stacked core 11 and improve variations in the straightness of the stacked core 11, the manufacturing apparatus 40 can reduce an air gap, which is a gap between the rotor 3 and the stator 2. Since the air gap can be reduced, efficiency of the rotary electrical machine 1 can be increased. This enables production of the rotary electrical machine 1 having high efficiency, with high productivity.

When the contour of the single plate 20 increases to such an extent that the force applied to the plate-shaped elastic body 74 exceeds the elastic region of the plate-shaped elastic body 74, the manufacturing apparatus 40 can adjust a position of the holding block 73 by adjusting tightening of the adjustment screw 76. As a result, by being able to adjust the position of the holding block 73 following a degree of wear even if the wear of the punch 70 and the die 71 progresses, the manufacturing apparatus 40 can reduce jamming of the stacked core 11.

Figure 15:
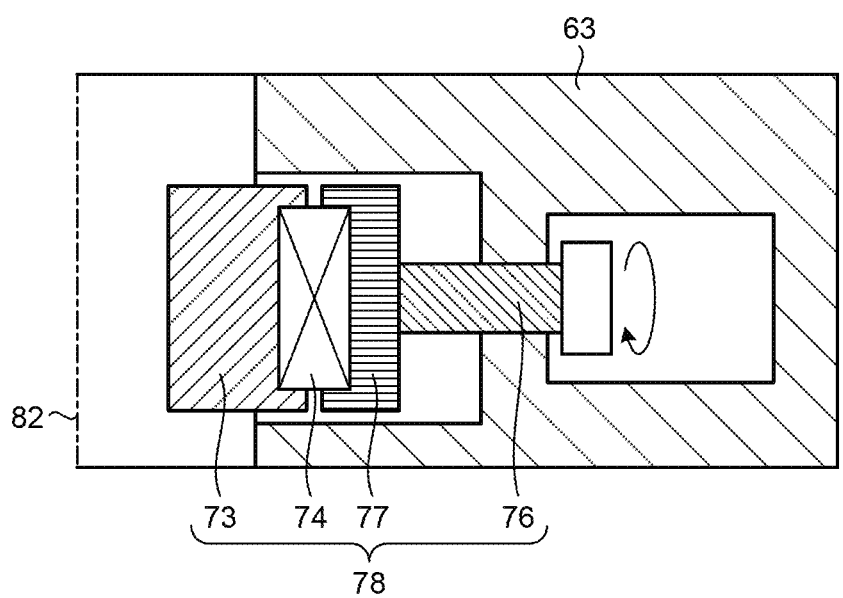
FIG. 15 is a first view for explaining an operation of a holding mechanism included in the manufacturing apparatus according to the first embodiment.
Figure 16:
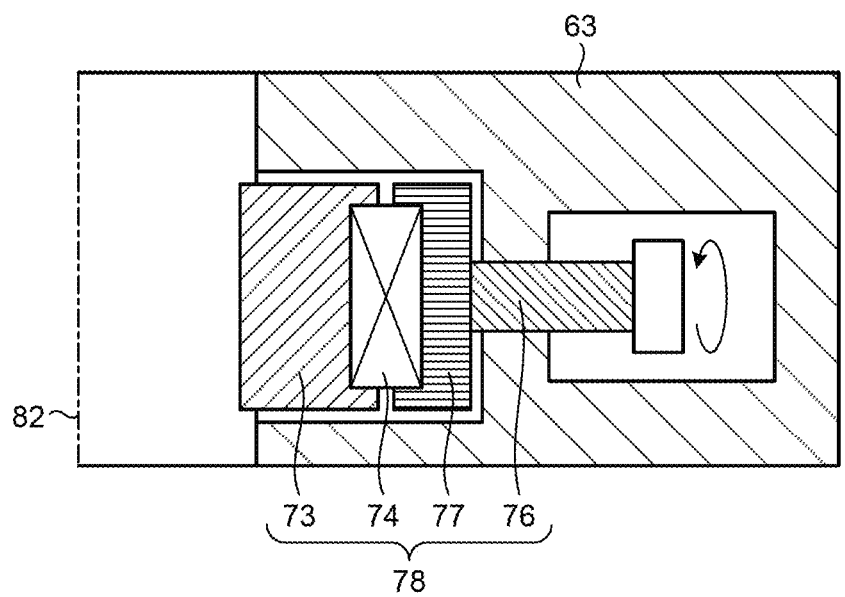
FIG. 16 is a second view for explaining an operation of the holding mechanism included in the manufacturing apparatus according to the first embodiment.

FIG. 15 is a first view for explaining an operation of the holding mechanism 78 included in the manufacturing apparatus 40 according to the first embodiment. FIG. 16 is a second view for explaining an operation of the holding mechanism 78 included in the manufacturing apparatus 40 according to the first embodiment. Each of FIGS. 15 and 16 illustrates a part of the holding part 63 illustrated in FIG. 14, which is a part including one holding mechanism 78. An example of the adjustment screw 76 is a push bolt disposed with a distal end directed toward the center 82 of the holding part 63. A female screw into which a male screw of the adjustment screw 76 is fitted is formed in a hole through which the adjustment screw 76 passes, in the holding part 63. By rotating the adjustment screw 76 in a tightening direction, the adjustment screw 76 advances toward the center 82. When the receiving plate 77 is pushed toward the center 82 by the adjustment screw 76, the holding mechanism 78 advances the plate-shaped elastic body 74 and the holding block 73 toward the center 82 via the receiving plate 77. FIG. 15 illustrates a state in which the adjustment screw 76 is rotated in the tightening direction.

As illustrated in FIG. 15, when the adjustment screw 76 is rotated in a direction in which the adjustment screw 76 is loosened from a state in which the plate-shaped elastic body 74 and the holding block 73 are advanced, the adjustment screw 76 is retracted in a direction away from the center 82. When the receiving plate 77 is released from the force pushed by the adjustment screw 76, the plate-shaped elastic body 74 and the holding block 73 are retracted in the direction away from the center 82 together with the receiving plate 77. FIG. 16 illustrates a state in which the adjustment screw 76 is rotated in a direction in which the adjustment screw 76 is loosened. The manufacturing apparatus 40 may adjust the adjustment screw 76 by using a drive source such as a servo motor. This allows the manufacturing apparatus 40 to control positions of the plate-shaped elastic body 74 and the holding block 73 or a position of the center 82 with high accuracy.

Figure 17:
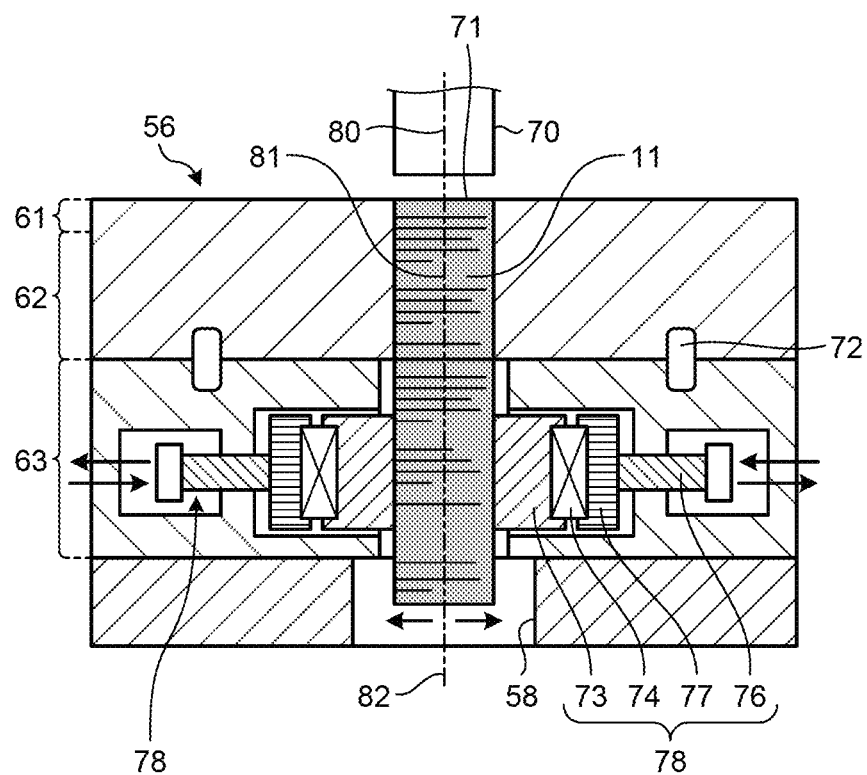
FIG. 17 is a view for explaining an example of adjusting a center of a holding part in the press mold of the manufacturing apparatus according to the first embodiment.

FIG. 17 is a view for explaining an example of adjusting the center 82 of the holding part 63 in the press mold 56 of the manufacturing apparatus 40 according to the first embodiment. The manufacturing apparatus 40 adjusts a position of the center 82 by the above operation of the holding mechanism 78. Here, the holding mechanism 78 on the left of the center 82 in FIG. 17 is referred to as a first holding mechanism among the two holding mechanisms 78 illustrated in FIG. 17, and the holding mechanism 78 on the right of the center 82 in FIG. 17 is referred to as a second holding mechanism among the two holding mechanisms 78.

When the first holding mechanism retracts the holding block 73 in the direction away from the center 82, and the second holding mechanism advances the holding block 73 toward the center 82, the manufacturing apparatus 40 moves the center 82 to the left in FIG. 17. Whereas, when the first holding mechanism advances the holding block 73 toward the center 82, and the second holding mechanism retracts the holding block 73 in the direction away from the center 82, the manufacturing apparatus 40 moves the center 82 rightward illustrated in FIG. 17. In this way, the manufacturing apparatus 40 adjusts the position of the center 82.

In order to achieve downsizing and high efficiency of the rotary electrical machine 1, technological developments such as reduction of the air gap, downsizing of a coil as a heat source, and redesign of an exterior component are in progress. According to the structure of the stacked core 11 in which the single plates 20 are fixed to each other by the first bonding layer 21 and the manufacturing method for the stacked core 11, it is possible to obtain a large effect in downsizing the stacked core 11 and reducing a loss of the stacked core 11. The structure of the stacked core 11 is required to improve bonding strength, stabilize bonding strength, and increase accuracy of straightness. The manufacturing method is required to increase accuracy of a bonding position, expand a bonding area, and increase productivity.

Here, a position where the adhesive 42 is applied on the single plate 20 and a pattern of a region where the adhesive 42 is spread on the single plate 20 will be described. Here, three examples will be described.

Figure 18:
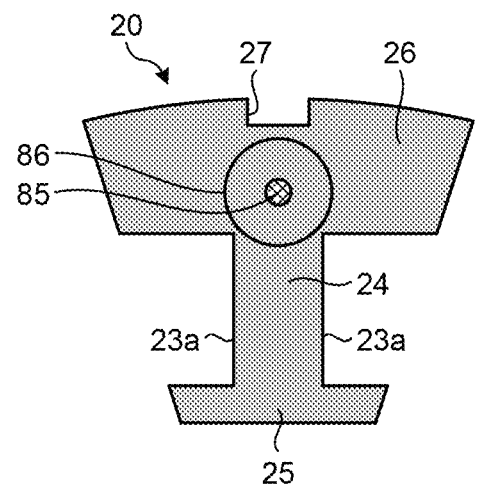
FIG. 18 is a view illustrating a first example of a position where an adhesive is applied and a pattern of a region where the adhesive is spread, by the manufacturing apparatus for the stacked core according to the first embodiment.
Figure 19:
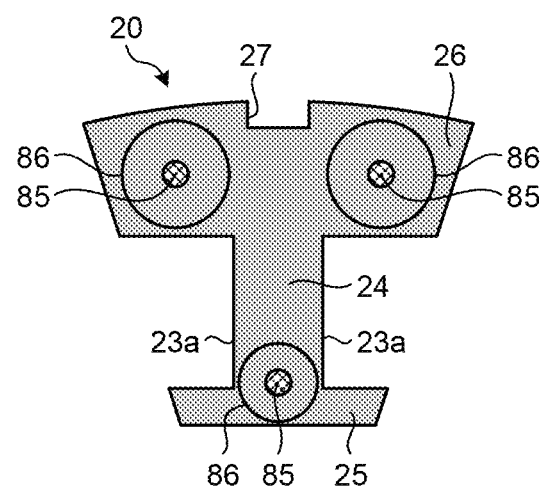
FIG. 19 is a view illustrating a second example of a position where an adhesive is applied and a pattern of a region where the adhesive is spread, by the manufacturing apparatus for the stacked core according to the first embodiment.
Figure 20:
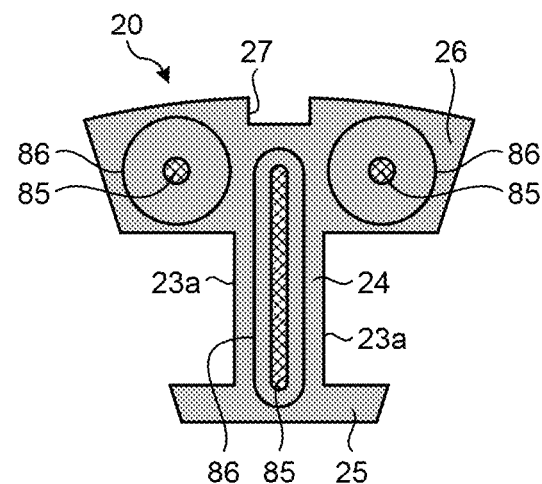
FIG. 20 is a view illustrating a third example of a position where an adhesive is applied and a pattern of a region where the adhesive is spread, by the manufacturing apparatus for the stacked core according to the first embodiment.

FIG. 18 is a view illustrating a first example of a position where the adhesive 42 is applied and a pattern of a region where the adhesive 42 is spread, by the manufacturing apparatus 40 for the stacked core 11 according to the first embodiment. FIG. 19 is a view illustrating a second example of a position where the adhesive 42 is applied and a pattern of a region where the adhesive 42 is spread, by the manufacturing apparatus 40 for the stacked core 11 according to the first embodiment. FIG. 20 is a view illustrating a third example of a position where the adhesive 42 is applied and a pattern of a region where the adhesive 42 is spread, by the manufacturing apparatus 40 for the stacked core 11 according to the first embodiment.

In FIGS. 18, 19, and 20, the adhesive 42 is applied to an application area 85 located in at least one of: a tooth portion consisting of the tooth central portion 24 and the tooth distal end portion 25; and the core back portion 26, in the single plate 20. The adhesive 42 applied to the application area 85 is spread entirely in a spread area 86 centered on the application area 85, by being pressurized in the stacking direction. The spread area 86 is the region where the adhesive 42 is spread between the single plates 20. The adhesive 42 spread in the spread area 86 is cured to form the first bonding layer 21.

In the first example illustrated in FIG. 18, the adhesive 42 is applied to one application area 85 in the core back portion 26. The application area 85 is a dot-shaped area at a position closer to the tooth central portion 24 from a center of the core back portion 26. The spread area 86 is a circular area centered on the application area 85. The spread area 86 is formed in the core back portion 26.

In the second example illustrated in FIG. 19, the adhesive 42 is applied to each of two application areas 85 in the core back portion 26 and one application area 85 in the tooth portion. Each of the three application areas 85 is a dot-shaped area. The two application areas 85 in the core back portion 26 are at positions near end portions of the core back portion 26, and are separated from each other such that the spread areas 86 do not overlap each other. The application area 85 in the tooth portion is at a position near a boundary with the tooth distal end portion 25 in the tooth central portion 24. The spread area 86 is formed over the tooth central portion 24 and the tooth distal end portion 25.

In the third example illustrated in FIG. 20, the adhesive 42 is applied to each of two application areas 85 in the core back portion 26 and one application area 85 in the tooth portion. The two application areas 85 in the core back portion 26 are similar to those in the second example. The application area 85 in the tooth portion is a linear area extending over the entire tooth central portion 24. An end of the application area 85 is at a center of the core back portion 26. The spread area 86 in which the adhesive 42 applied to the application area 85 is spread is a linear area centered on the application area 85, and is a thicker linear area than the application area 85. The spread area 86 is formed over the tooth central portion 24, the tooth distal end portion 25, and the core back portion 26.

As in the first to third examples, the application device does not apply the adhesive 42 to the entire plate surface of the single plate 20, but applies the adhesive 42 to the specific application area 85 of the plate surface. The manufacturing apparatus 40 can form the first bonding layer 21 in the desired spread area 86 by managing the position of the application area 85.

It is assumed that a ring-shaped holding block 73 slightly smaller than the contour of the single plate 20 is used similarly to the cases of Patent Literatures 1 and 2. In such a case, in order to prevent adhesion of the adhesive 42 protruding between the single plates 20 to the holding block 73, the application area 85 and the spread area 86 need to be set such that the adhesive 42 does not protrude. In this case, the adhesive 42 attached to the holding block 73 causes jamming of the stacked core 11. In addition, the adhesive 42 attached to the holding block 73 becomes a foreign substance by curing. The foreign substance may adhere to an inside of the press mold 56 or the stacked core 11. The foreign substance may cause a flaw on the press mold 56 or the stacked core 11. In addition, the foreign substance may cause damage to the press mold 56 or the stacked core 11.

In such a case, when the insulation component 13 is formed by injection molding while the foreign substance adheres to the stacked core 11, the foreign substance is buried in the injected insulating material. In this case, a film thickness of a portion of the insulation component 13 in which the foreign substance is buried is thinner than a film thickness of other portions of the insulation component 13. Since the film thickness is reduced in a part of the insulation component 13, the insulation performance between the coil and the stacked core 11 is deteriorated.

In such a case, when the insulation component 13 is assembled to the stacked core 11 while the foreign substance adheres to the stacked core 11, it is conceivable that the foreign substance scraped from the stacked core 11 adheres to a surface of the insulation component 13. In this case, the foreign substance hinders formation of a small coil by winding a winding wire. In addition, since the foreign substance deteriorates an alignment property of the winding wire, the foreign substance causes deterioration in efficiency of the rotary electrical machine 1. Furthermore, the foreign substance entering the air gap in the rotary electrical machine 1 may cause a situation that greatly affects the performance of the rotary electrical machine 1, such as stop of rotation or breakage of a magnet. If enlarging the air gap is required in order to avoid deterioration in performance of the rotary electrical machine 1 due to presence of the foreign substance, increasing the efficiency and downsizing of the rotary electrical machine 1 becomes difficult.

As described above, in the case similar to Patent Literatures 1 and 2, protrusion of the adhesive 42 needs to be prevented. When an application amount of the adhesive 42 is reduced in order to prevent protrusion of the adhesive 42, the bonding area is reduced. As the bonding area is reduced, securing the bonding strength becomes more difficult. Since a weight of the stacked core 11 increases as the number of the single plates 20 to be stacked increases, securing the bonding strength becomes more difficult as the number of the single plates 20 to be stacked increases. In the case described above, even when the application area 85 is adjusted as illustrated in FIGS. 18, 19, and 20, the application area 85 and the amount of the adhesive 42 are restricted to prevent protrusion of the adhesive 42.

Next, formation of the second bonding layer 22 by the manufacturing apparatus 40 for the stacked core 11 according to the first embodiment will be described. In the first embodiment, the manufacturing apparatus 40 forms the second bonding layer 22 by intentionally causing the adhesive 42 to protrude from a specific position of the single plate 20. The manufacturing apparatus 40 can set the application area 85 and an amount of the adhesive 42 without providing the restriction as in the case described above. The manufacturing apparatus 40 can prevent the adhesive 42 from becoming a foreign substance, by forming the second bonding layer 22 with the adhesive 42 caused to protrude.

Figure 21:
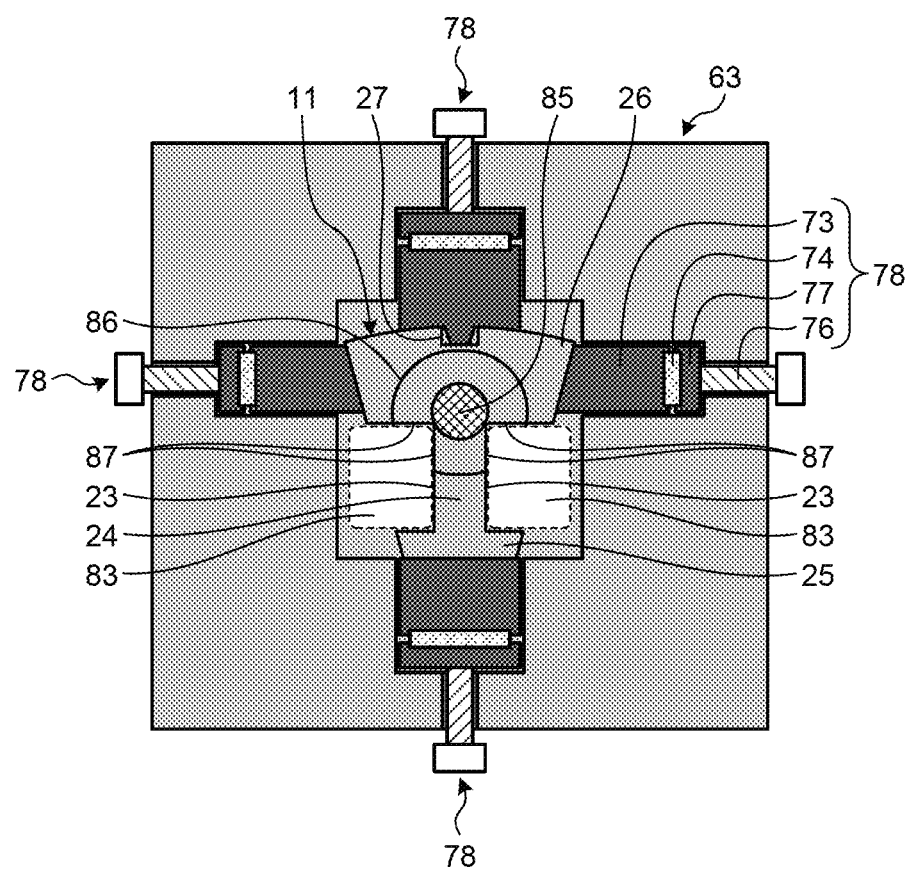
FIG. 21 is a plan view illustrating the holding part of the press mold illustrated in FIG. 14.

FIG. 21 is a plan view illustrating the holding part 63 of the press mold 56 illustrated in FIG. 14. FIG. 21 illustrates a state in which the holding part 63 holding the stacked core 11 is viewed from above. The holding part 63 is provided with four holding mechanisms 78. Here, each of the four holding mechanisms 78 illustrated in FIG. 21 is referred to as a first holding mechanism, a second holding mechanism, a third holding mechanism, and a fourth holding mechanism.

The first holding mechanism and the second holding mechanism face each other in a first direction via the stacked core 11. The first direction is a direction in which the core back portion 26, the tooth central portion 24, and the tooth distal end portion 25 are arranged in the single plate 20. The holding block 73 of the first holding mechanism comes into contact with a side surface constituted by the core back portion 26, in the stacked core 11. The side surface is a side surface including the groove 27. The holding block 73 of the second holding mechanism comes into contact with a side surface constituted by the tooth distal end portion 25, in the stacked core 11. The holding block 73 of the first holding mechanism is formed with a protrusion that enters the groove 27. Since the protrusion is formed on the holding block 73, the holding part 63 can accurately adjust the center 82 of the holding part 63 and apply a holding force to the stacked core 11.

The third holding mechanism and the fourth holding mechanism face each other in a second direction. The second direction is a direction perpendicular to the first direction on a plane illustrated in FIG. 21. The holding block 73 of the third holding mechanism and the holding block 73 of the fourth holding mechanism come into contact with the side surface constituted by the core back portion 26, in the stacked core 11. The side surface to be in contact with the holding block 73 of the third holding mechanism is a side surface of the core back portion 26 located at a left end in FIG. 21. The side surface to be in contact with the holding block 73 of the fourth holding mechanism is a side surface of the core back portion 26 located at a right end in FIG. 21.

Around the stacked core 11 in the holding part 63, a blank part 83 is provided in which the holding block 73 is not disposed. The holding part 63 illustrated in FIG. 21 is provided with two blank parts 83. Each blank part 83 is a space surrounded on three sides by three side surfaces of the stacked core 11. The three side surfaces are a side surface constituted by the core back portion 26, the side surface 23 constituted by the tooth central portion 24, and a side surface constituted by the tooth distal end portion 25. The spread area 86 is adjacent to the blank part 83. While the adhesive 42 does not protrude at a position where the holding block 73 is disposed in the holding part 63, the adhesive 42 is intentionally caused to protrude in the blank part 83.

By intentionally causing the adhesive 42 to protrude in the blank part 83, the manufacturing apparatus 40 can increase an amount of the adhesive 42 to be applied, as compared with a case where the application area 85 and an amount of the adhesive 42 are set such that the adhesive 42 does not protrude over the entire periphery of the single plate 20. The manufacturing apparatus 40 can widen the bonding area by increasing the amount of the adhesive 42. The bonding area can be increased to about 1.1 times to 50 times as compared with a case where the application area 85 and the amount of the adhesive 42 are set such that the adhesive 42 does not protrude over the entire periphery of the single plate 20. By increasing the bonding area, the manufacturing apparatus 40 can improve the bonding strength by the first bonding layer 21.

When the stacked core 11 is pressurized in the stacking direction, the adhesive 42 applied to the application area 85 illustrated in FIG. 21 spreads in the spread area 86. A part of the adhesive 42 spreading around the application area 85 flows out of the contour of the single plate 20 in the blank part 83. That is, in a protrusion part 87 outside the contour of the single plate 20 in a range where the adhesive 42 spreads around the application area 85, the adhesive 42 protrudes from a gap between the single plates 20. The adhesive 42 protruding from the gap between the single plates 20 spreads on the side surface of the stacked core 11. In FIG. 21, the protrusion part 87 is formed on a part of the side surface constituted by the core back portion 26 and a part of the side surface 23 constituted by the tooth central portion 24. The second bonding layer 22 illustrated in FIG. 5 is formed by the adhesive 42 spreading on the side surface 23.

The adhesive 42 protruding in the protrusion part 87 spreads to the side surface of the stacked core 11 without reaching the holding block 73. This allows the manufacturing apparatus 40 to improve the bonding strength by the first bonding layer 21, without the stacked core 11 being bonded to the holding block 73 or the press mold 56. In addition, the manufacturing apparatus 40 can also prevent the adhesive 42 from entering the stacking part 62 formed to be slightly larger than the punching part 61. The blank part 83 may be provided in the stacking part 62 similarly to the holding part 63. The blank part 83 can be secured in the stacking part 62 within a range in which alignment of the individual single plates 20 is not hindered.

Providing the blank part 83 in the press mold 56 makes it possible to prevent generation of a foreign substance due to scraping off of the protruding adhesive 42 by the holding block 73. This allows the manufacturing apparatus 40 and the rotary electrical machine 1 to avoid the above-described problems due to generation of a foreign substance.

The adhesive 42 is an adhesive consisting of a low-viscosity material, for example, an acrylic adhesive containing methacrylic acid as a main component. Depending on a function of a product or use conditions of the product, for example, an adhesive consisting of an epoxy resin, a urethane resin, or a silicone resin can be used as the adhesive 42. By selecting a low-viscosity material as the adhesive 42, the manufacturing apparatus 40 can easily cause the adhesive 42 to wet and spread on the shear surface 31, the fracture surface 32, the shear droop 33, and the burr 34 illustrated in FIG. 8. In addition, since the adhesive 42 easily wets and spreads, a thickness of the second bonding layer 22 formed on the side surface of the stacked core 11 can be reduced. The thickness of the second bonding layer 22 is, for example, 0.1 μm to 200 μm. The thickness of the second bonding layer 22 is extremely small and smooth as compared with a diameter of a foreign substance. Therefore, even if the second bonding layer 22 is sealed with an insulating material in a step of forming the insulation component 13, the insulation performance is not deteriorated. In addition, when the insulation component 13 is assembled to the stacked core 11, the second bonding layer 22 is not scraped off. This allows the manufacturing apparatus 40 and the rotary electrical machine 1 to avoid the above-described problems due to generation of a foreign substance.

In addition, since the second bonding layer 22 is formed by curing of the adhesive 42 that has permeated the shear surface 31, the fracture surface 32, the shear droop 33, and the burr 34, the second bonding layer 22 exerts an anchor effect. The stacked core 11 can obtain high bonding strength due to the anchor effect of the second bonding layer 22, as compared with a case where the adhesive 42 is applied to a smooth application surface.

Note that a position, a number, and a shape of the blank part 83 provided in the holding part 63 are not limited to those illustrated in FIG. 21. Each of the position, the number, and the shape of the blank part 83 can be freely set. The position, the number, and the shape of the blank part 83 can be appropriately set according to a shape of the single plate 20.

Figure 22:
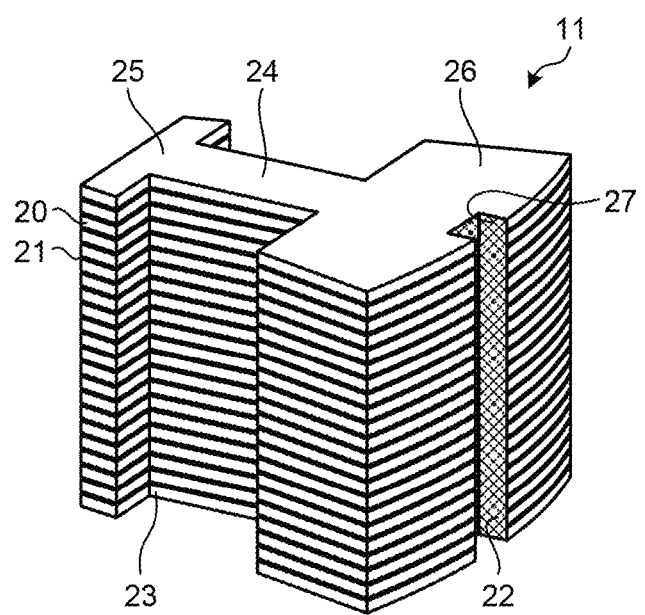
FIG. 22 is a view illustrating a stacked core according to a first modification of the first embodiment.
Figure 23:
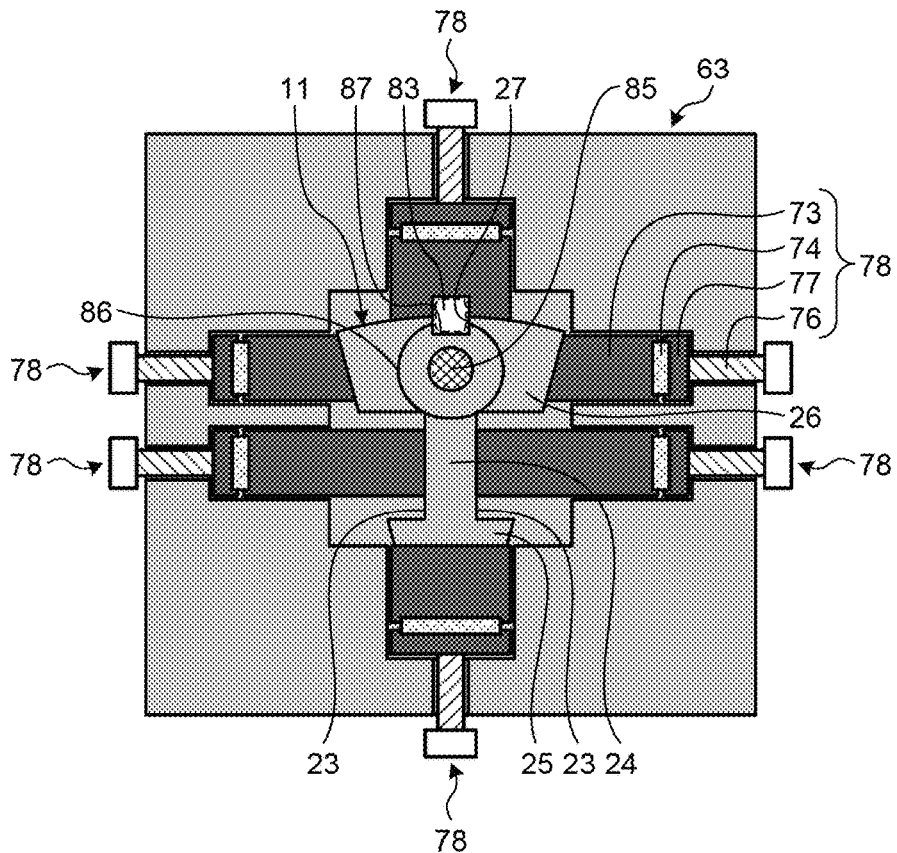
FIG. 23 is a view illustrating a first modification of the holding part in the first embodiment.

Hereinafter, a modification of the stacked core 11 according to the first embodiment and a modification of the press mold 56 will be described. FIG. 22 is the view illustrating the stacked core 11 according to a first modification of the first embodiment. FIG. 23 is a view illustrating a first modification of the holding part 63 in the first embodiment. The holding part 63 illustrated in FIG. 23 is included in the press mold 56 to be used for manufacturing the stacked core 11 illustrated in FIG. 22. In the stacked core 11 illustrated in FIG. 22, the second bonding layer 22 is formed in the groove 27.

The holding part 63 illustrated in FIG. 23 is provided with six holding mechanisms 78. Four of the six holding mechanisms 78 are identical to the four holding mechanisms 78 illustrated in FIG. 21. The holding blocks 73 of other two holding mechanisms 78 among the six holding mechanisms 78 are individually disposed at positions of the blank parts 83 in FIG. 21. The blank part 83 is formed at a position of the groove 27. The blank part 83 is a space surrounded on four sides by the side surfaces of the stacked core 11 and the holding block 73. The application area 85 is a center of the core back portion 26. The protrusion part 87 is formed on each side surface constituted by the groove 27, in the stacked core 11. The second bonding layer 22 illustrated in FIG. 22 is formed by the adhesive 42 protruding in the protrusion part 87. In a case of the stator 2 in which the adhesive 42 cannot protrude from both side surfaces 23 of the tooth central portion 24, the second bonding layer 22 can be disposed in the groove 27 in the stacked core 11.

A position of the application area 85 and an amount of the adhesive 42 to be applied are controlled such that a part of the adhesive 42 spreading around the application area 85 spreads to the side surface of the stacked core 11 in the protrusion part 87. This allows the manufacturing apparatus 40 to form the second bonding layer 22 illustrated in FIG. 22. The blank part 83 may be provided at a position away from the holding block 73 as illustrated in FIG. 21, or may be provided integrally with the holding block 73 as illustrated in FIG. 23.

Figure 24:
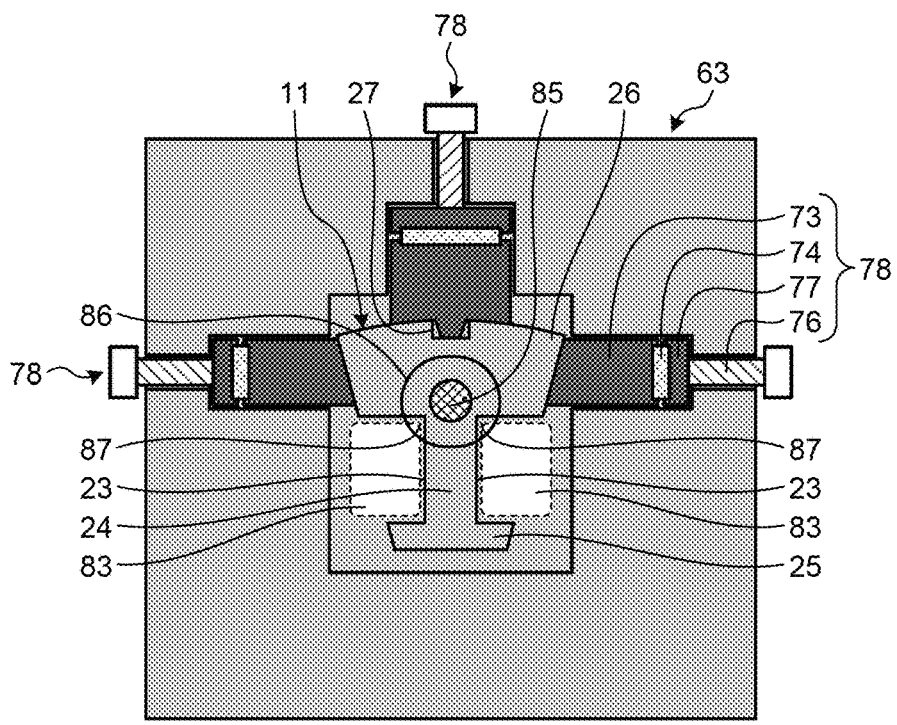
FIG. 24 is a view illustrating a second modification of the holding part in the first embodiment.

FIG. 24 is a view illustrating a second modification of the holding part 63 in the first embodiment. The holding part 63 illustrated in FIG. 24 is provided with three holding mechanisms 78. The three holding mechanisms 78 are identical to the first, third, and fourth holding mechanisms among the four holding mechanisms 78 illustrated in FIG. 21. The holding part 63 illustrated in FIG. 24 applies pressure to the stacked core 11 from three directions. The blank part 83 and the protrusion part 87 are identical to the blank part 83 and the protrusion part 87 illustrated in FIG. 21. In the stacked core 11 illustrated in FIG. 24, the adhesive 42 is applied to one application area 85 in each single plate 20. A center of the application area 85 illustrated in FIG. 24 is identical to a center of the application area 85 illustrated in FIG. 21. The second modification illustrated in FIG. 24 is an example in which the number of holding mechanisms 78 included in the holding part 63 is reduced as compared with the case illustrated in FIG. 21, by appropriately designing a component force to be applied to the stacked core 11 on the basis of a load and a direction in which the pressure is applied by each holding mechanism 78. In the manufacturing apparatus 40, the configuration of the holding part 63 can be simplified by reducing the number of the holding mechanisms 78 included in the holding part 63. As long as a force capable of holding the stacked core 11 can be applied to the stacked core 11, the number of holding mechanisms 78 included in the holding part 63 may be smaller than three.

Figure 25:
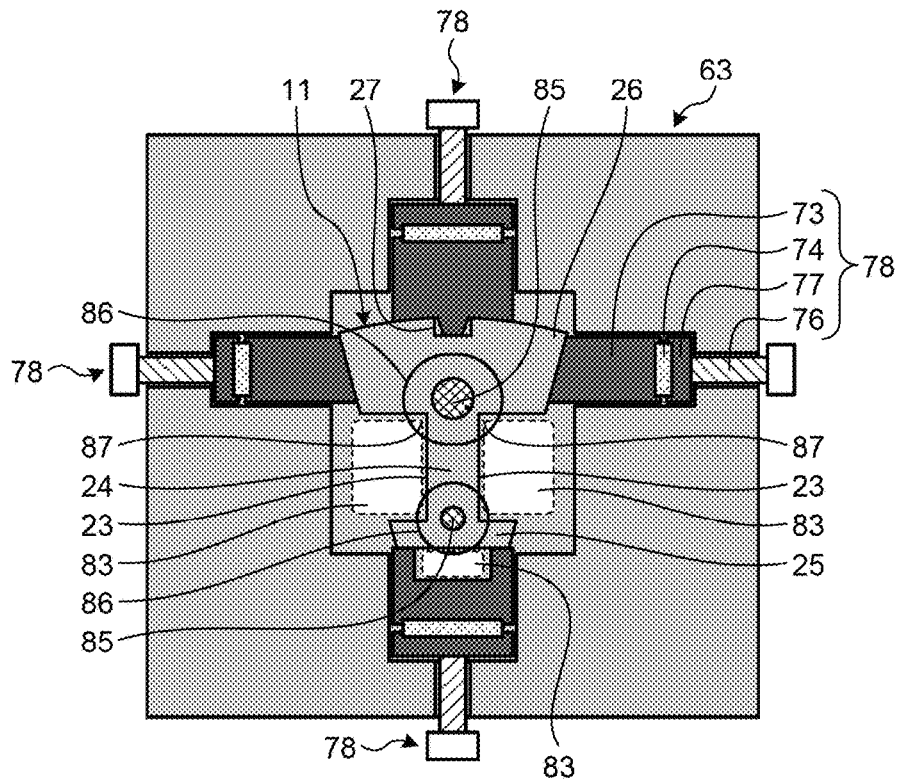
FIG. 25 is a view illustrating a third modification of the holding part in the first embodiment.

FIG. 25 is a view illustrating a third modification of the holding part 63 in the first embodiment. The holding part 63 illustrated in FIG. 25 is provided with four holding mechanisms 78 similarly to the case illustrated in FIG. 21. Further, the holding part 63 is provided with three blank parts 83. Two of the three blank parts 83 are identical to the blank parts 83 illustrated in FIG. 21. Another one of the three blank parts 83 is surrounded on four sides by the tooth distal end portion 25 and the holding block 73. In this manner, one blank part 83 is provided integrally with the holding block 73 to be in contact with the tooth distal end portion 25. The third modification illustrated in FIG. 25 is an example in which the blank part 83 is provided integrally with the holding block 73 in order to locally dispose the blank part 83 at a desired position. In the third modification, the manufacturing apparatus 40 can form the second bonding layer 22 at a limited position, which is a desired position.

In the stacked core 11 illustrated in FIG. 25, the adhesive 42 is applied to the two application areas 85 of each single plate 20. One of the two application areas 85 is identical to the application area 85 illustrated in FIG. 24. Another one of the two application areas 85 extends over the tooth distal end portion 25 and the tooth central portion 24. A position of each application area 85 and an amount of the adhesive 42 to be applied are controlled such that a part of the adhesive 42 spreading around the application area 85 spreads in the protrusion part 87.

Figure 26:
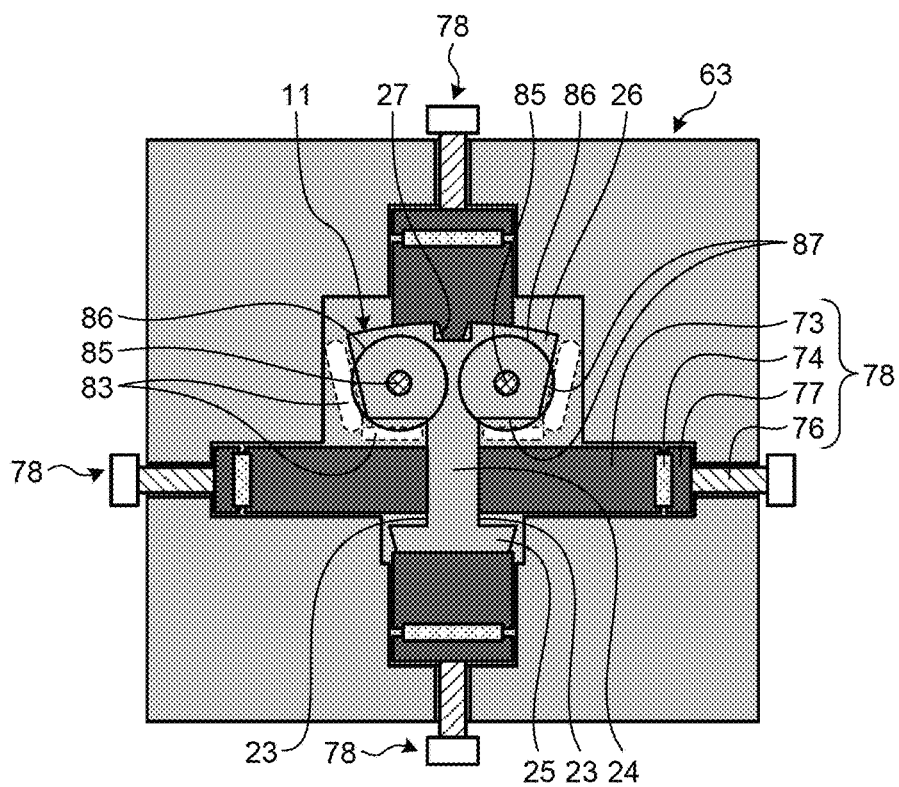
FIG. 26 is a view illustrating a fourth modification of the holding part in the first embodiment.

FIG. 26 is a view illustrating a fourth modification of the holding part 63 in the first embodiment. The fourth modification is an example of a case where the adhesive 42 cannot protrude on both the side surface 23 of the tooth central portion 24 and the groove 27. The holding part 63 illustrated in FIG. 26 is provided with four holding mechanisms 78. Two of the four holding mechanisms 78 are identical to the first holding mechanism and the second holding mechanism among the four holding mechanisms 78 illustrated in FIG. 21. Other two holding blocks 73 of the four holding mechanisms come into contact with the side surface 23.

In the stacked core 11 illustrated in FIG. 26, the adhesive 42 is applied to the two application areas 85 of each single plate 20. The two application areas 85 are in the core back portion 26. The blank part 83 is provided along left and right side surfaces of the core back portion 26 in FIG. 26 and a side surface of the core back portion 26 on the tooth central portion 24 side. The protrusion parts 87 are formed along the left and right side surfaces of the core back portion 26 in FIG. 26 and the side surface of the core back portion 26 on the tooth central portion 24 side.

A side surface of the core back portion 26 adjacent to the groove 27 is a side surface constituting an outer edge of an annular ring when the plurality of stacked cores 11 are assembled into an annular shape. In the example illustrated in FIG. 26, the blank part 83 along the side surface is not provided, and the second bonding layer 22 is not formed on the side surface. However, in a case where performance of the rotary electrical machine 1 is not affected, the blank part 83 may be provided along the side surface, and the second bonding layer 22 may be formed on the side surface. In this case, by causing the curing reaction of the adhesive 42 to be completed after the plurality of stacked cores 11 are assembled into the annular shape, an effect of fixing the annular stator core 10 by the second bonding layer 22 can be obtained.

In the manufacturing apparatus 40 according to the first embodiment, the blank part 83 is provided such that the adhesive 42 applied in the two-dimensional direction in the hoop material 50 protrudes from a gap between the single plates 20 on a side surface at a desired position in the stacked core 11. The adhesive 42 protruding from the side surface of the stacked core 11 spreads in the stacking direction on the side surface of the stacked core 11. This allows the manufacturing apparatus 40 to form the three-dimensional second bonding layer 22 on the side surface of the stacked core 11. The manufacturing apparatus 40 can manufacture the stacked core 11 in which the single plates 20 are firmly fixed to each other, by forming the second bonding layer 22 integrated with each of the first bonding layers 21. The manufacturing apparatus 40 can manufacture the stacked core 11 in which the single plates 20 are firmly fixed with each other, with high productivity. Furthermore, the manufacturing apparatus 40 can manufacture the stacked core 11 with high dimensional accuracy, by stabilizing a thickness of each first bonding layer 21. The manufacturing apparatus 40 can manufacture the stacked core 11 capable of achieving high efficiency of the rotary electrical machine 1.

Figure 27:
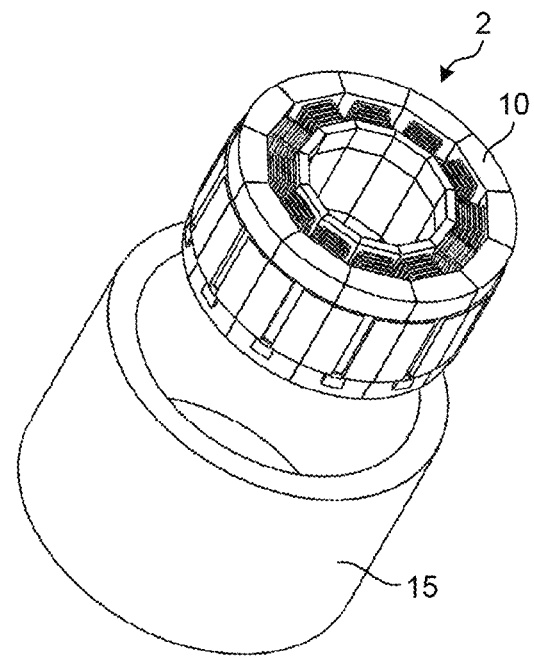
FIG. 27 is a view illustrating a modification of the stator including the stacked core according to the first embodiment.

The stator 2 is not limited to one in which the plurality of stator cores 10 are sealed by the resin 12. FIG. 27 is a view illustrating a modification of the stator 2 including the stacked core 11 according to the first embodiment. The stator 2 illustrated in FIG. 27 includes a plurality of stator core 10 assembled in an annular shape and a frame 15. The stator 2 is manufactured by combining the frame 15 with the plurality of stator cores 10 by shrink fitting.

The stator 2 may be obtained by combining the frame 15 with the plurality of stator core 10 by gap fitting. In this case, the frame 15 is fixed to the plurality of stator cores 10 with an adhesive. The stator 2 may be assembled in a state where the second bonding layer 22 is not cured, in a range that does not affect productivity of the stator 2 and performance of the stator 2. The plurality of stator cores 10 and the frame 15 may be bonded by an uncured second bonding layer 22. By bonding the plurality of stator cores 10 and the frame 15 with the second bonding layer 22, it is possible to omit application of an adhesive separately from the adhesive 42 for forming the second bonding layer 22. This enables reduction of manufacturing cost of the rotary electrical machine 1.

An example has been described above in which the stacked core 11 provided in each of the plurality of stator cores 10 is individually manufactured. Next, a description is given to an example of manufacturing a stacked core obtained by connecting a plurality of unit structures, an example of manufacturing an annular stacked core, and an example of manufacturing a stacked core obtained by combining a plurality of divided cores.

Figure 28:
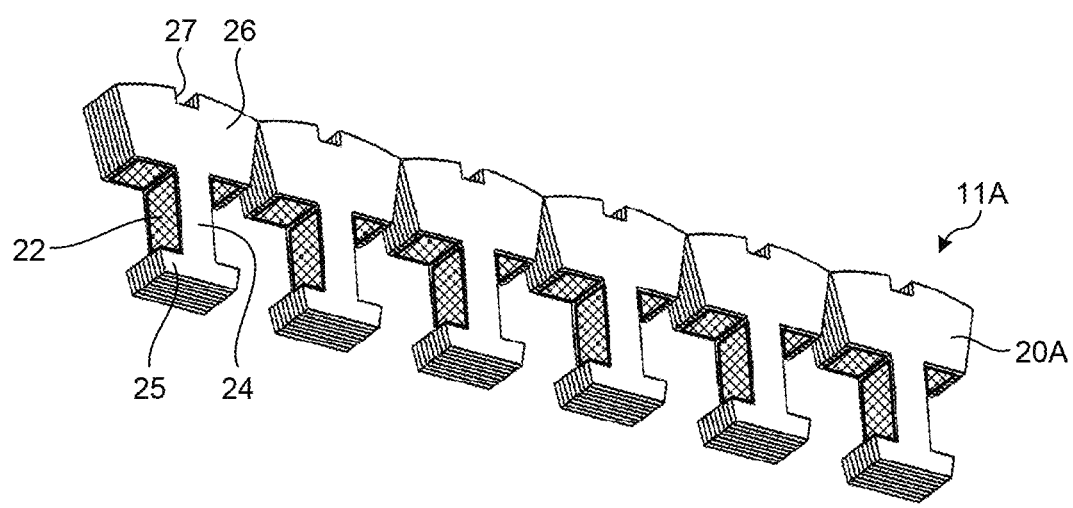
FIG. 28 is a view illustrating a stacked core according to a second modification of the first embodiment.
Figure 29:
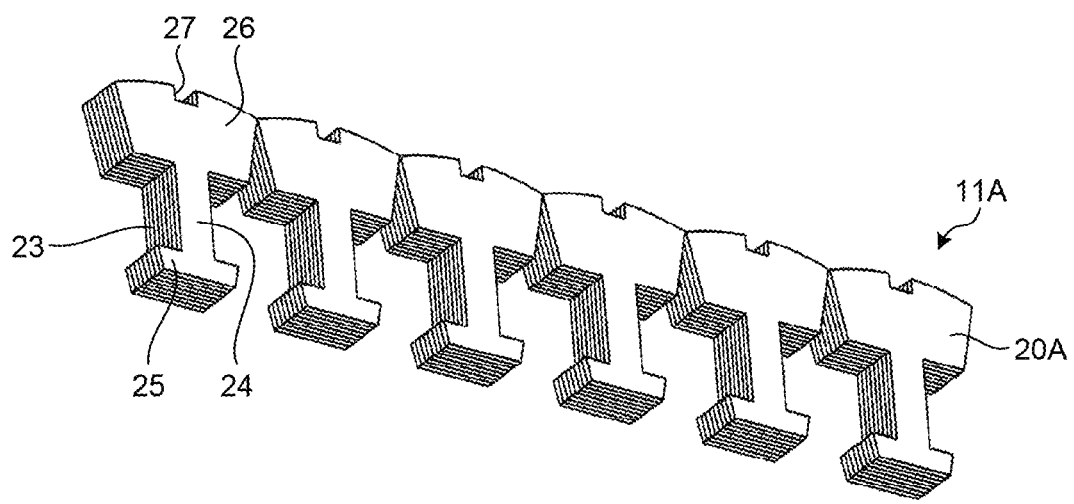
FIG. 29 is a view illustrating a configuration in which the second bonding layer is removed from the stacked core illustrated in FIG. 28.
Figure 30:
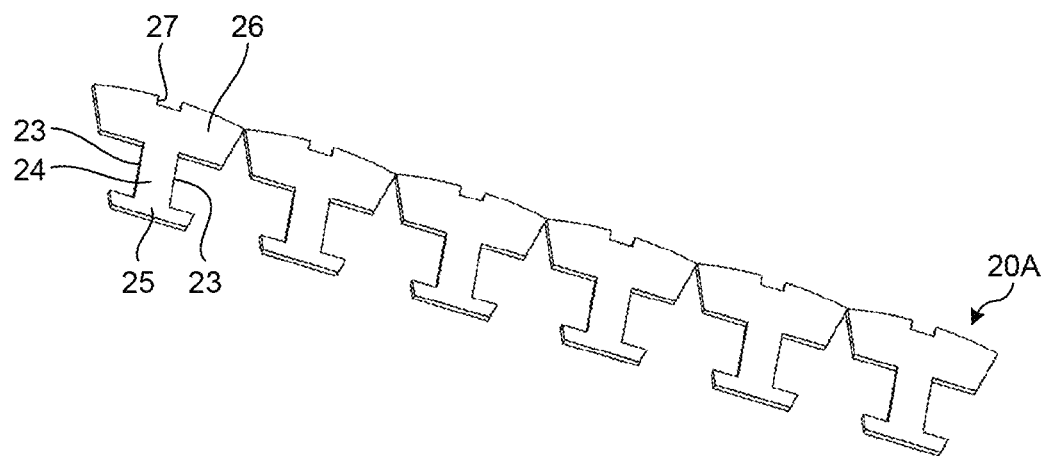
FIG. 30 is a view illustrating a single plate constituting the stacked core illustrated in FIG. 28.

FIG. 28 is a view illustrating a stacked core 11A according to a second modification of the first embodiment. FIG. 29 is a view illustrating a configuration in which the second bonding layer 22 is removed from the stacked core 11A illustrated in FIG. 28. FIG. 30 is a view illustrating a single plate 20A constituting the stacked core 11A illustrated in FIG. 28. The stacked core 11A is a stacked core in which a plurality of unit structures are linearly connected. On the side surface 23 of each unit structure, the second bonding layer 22 is formed. The stacked core 11A is a stacked body of the single plates 20A. The single plate 20A is obtained by connecting a plurality of steel plates. Each steel plate is a steel plate similar to the single plate 20 illustrated in FIG. 7. In the stacked core 11A, the single plates 20A can be firmly fixed to each other by the first bonding layer 21 and the second bonding layer 22. Further, the stacked core 11A can be manufactured with high productivity.

Figure 31:
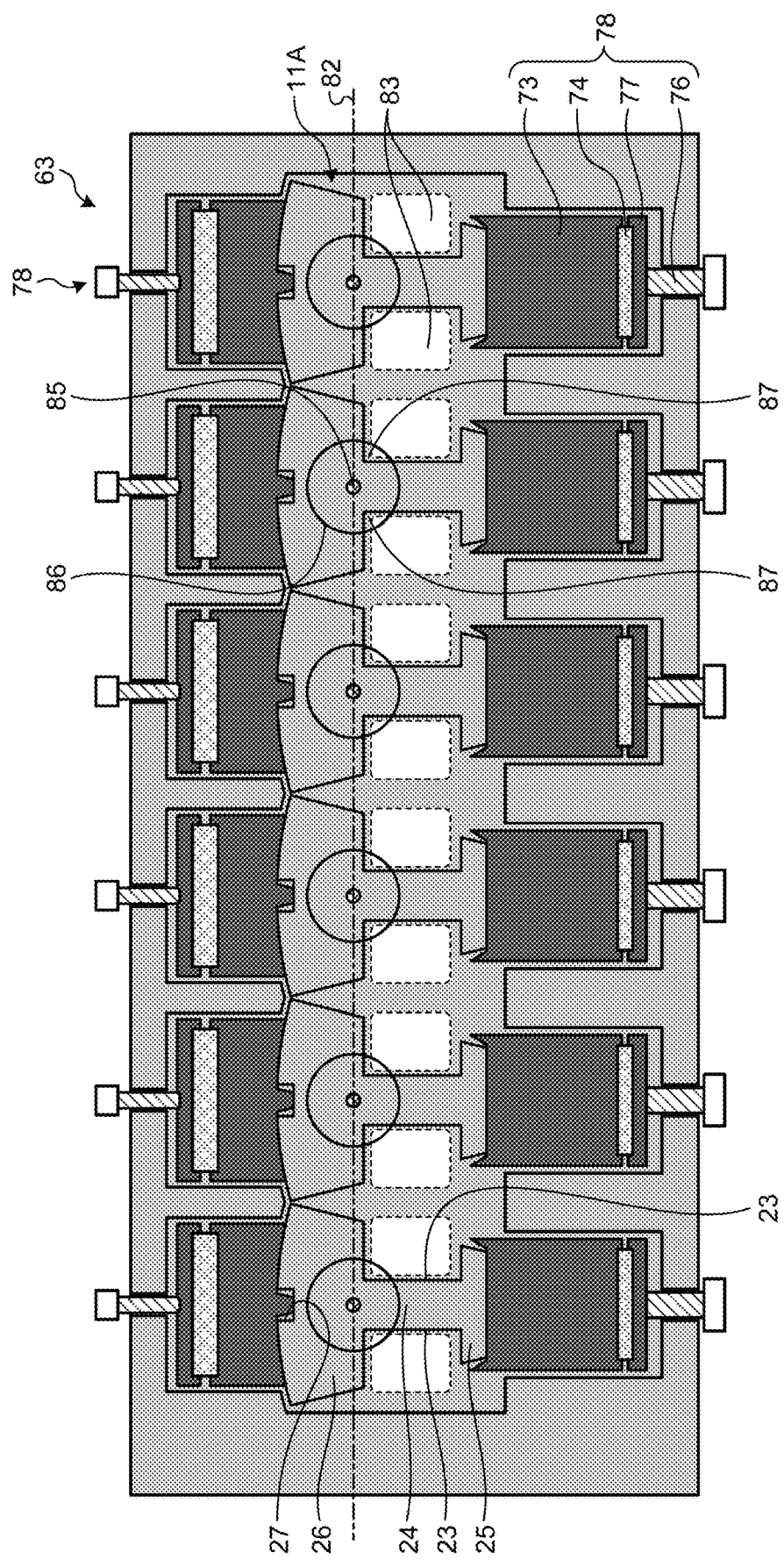
FIG. 31 is a view illustrating a fifth modification of the holding part in the first embodiment.

FIG. 31 is a view illustrating a fifth modification of the holding part 63 in the first embodiment. The holding part 63 illustrated in FIG. 31 is included in the press mold 56 to be used for manufacturing the stacked core 11A illustrated in FIG. 28. The holding part 63 is provided with two holding mechanisms 78 per unit structure. Here, each of the two holding mechanisms 78 is referred to as a first holding mechanism and a second holding mechanism.

The holding block 73 of the first holding mechanism comes into contact with a side surface constituted by the core back portion 26 in the unit structure. The side surface is a side surface including the groove 27. The holding block 73 is formed with a protrusion that enters the groove 27. The holding block 73 of the second holding mechanism comes into contact with a side surface constituted by the tooth distal end portion 25 in the unit structure.

The blank part 83 is provided at a position of the side surface 23 in each unit structure. The protrusion part 87 is formed on the side surface 23. By causing the adhesive 42 to protrude in the protrusion part 87, the adhesive 42 wets and spreads on the side surface 23. This allows the manufacturing apparatus 40 to manufacture the stacked core 11A in which the single plates 20A are firmly fixed to each other, with high productivity.

Since the adjustment screw 76 to adjust a center of the unit structure in a horizontal direction in FIG. 31 cannot be installed in the holding part 63, the unit structure in the horizontal direction in FIG. 31 is positioned by means other than the adjustment screw 76. In the holding part 63, a protrusion that enters the groove 27 is formed on the holding block 73 of the first holding mechanism. In addition, the holding block 73 of the second holding mechanism is formed with a recess conforming to a shape of the tooth distal end portion 25. This allows the holding part 63 to position each unit structure in the horizontal direction in FIG. 31.

Figure 32:
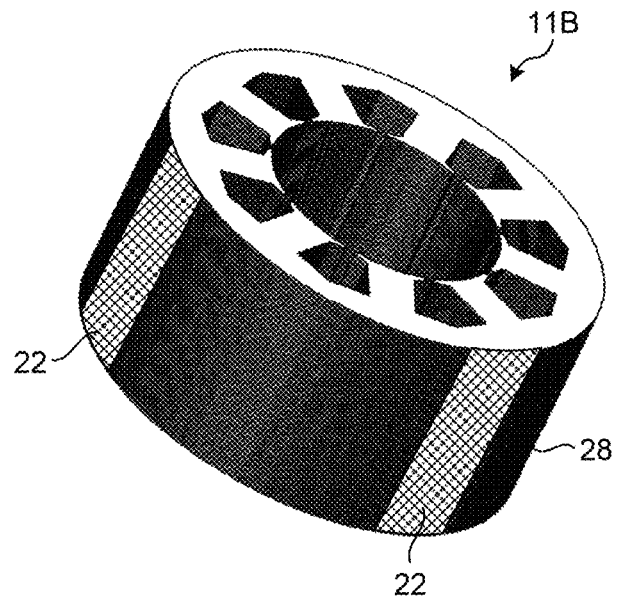
FIG. 32 is a view illustrating a stacked core according to a third modification of the first embodiment.
Figure 33:
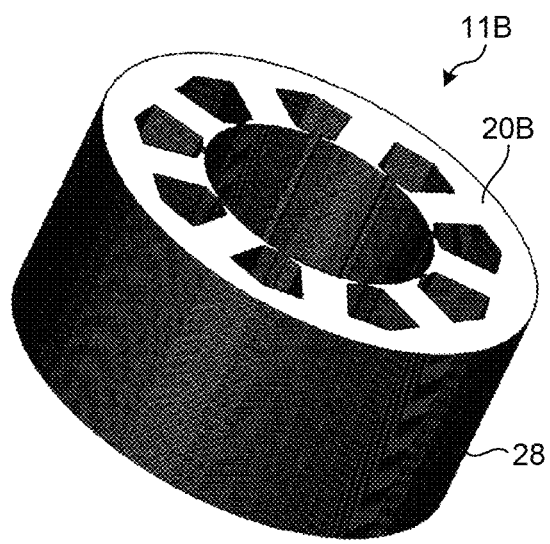
FIG. 33 is a view illustrating a configuration in which the second bonding layer is removed from the stacked core illustrated in FIG. 32.
Figure 34:
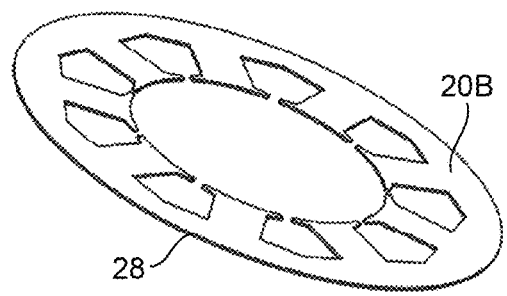
FIG. 34 is a view illustrating a single plate constituting the stacked core illustrated in FIG. 32.

FIG. 32 is a view illustrating a stacked core 11B according to a third modification of the first embodiment. FIG. 33 is a view illustrating a configuration in which the second bonding layer 22 is removed from the stacked core 11B illustrated in FIG. 32. FIG. 34 is a view illustrating a single plate 20B constituting the stacked core 11B illustrated in FIG. 32. The stacked core 11B is an annular stacked core. The single plate 20B is an annular steel plate.

The stacked core 11B includes three second bonding layers 22. Each of the second bonding layers 22 is provided on an outer surface 28 of the stacked core 11B. The outer surface 28 is a cylindrical surface. Each of the second bonding layers 22 is formed in a belt shape in the stacking direction. FIG. 32 illustrates two of the three second bonding layers 22. Another one of the three second bonding layers 22 is provided at a position invisible in FIG. 32. In the stacked core 11B, the single plates 20B can be firmly fixed to each other by the first bonding layer 21 and the second bonding layer 22. In addition, the stacked core 11B can be manufactured with high productivity.

Figure 35:
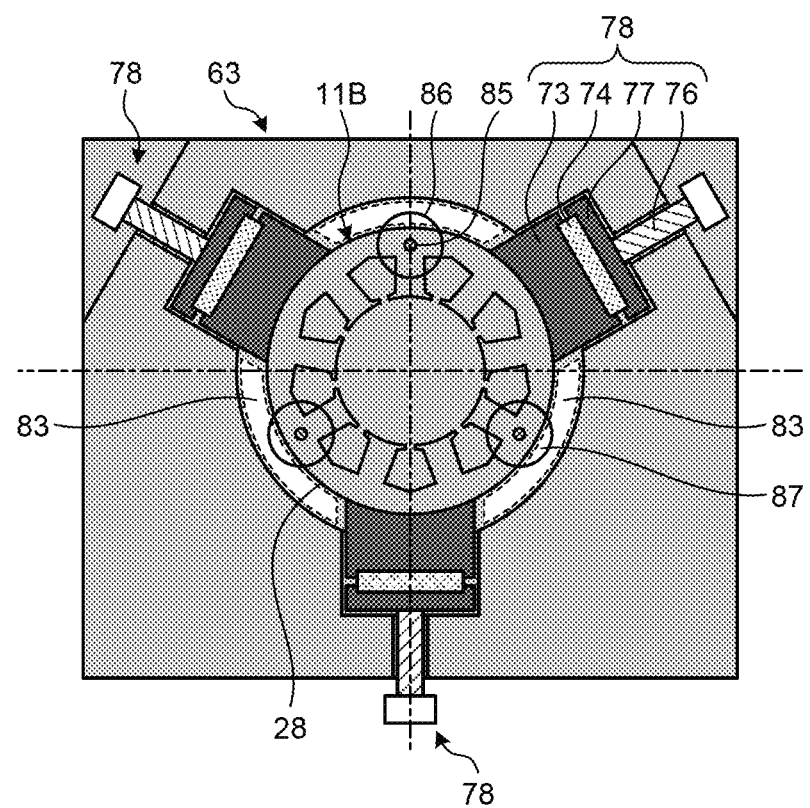
FIG. 35 is a view illustrating a sixth modification of the holding part in the first embodiment.

FIG. 35 is a view illustrating a sixth modification of the holding part 63 in the first embodiment. The holding part 63 illustrated in FIG. 35 is included in the press mold 56 to be used for manufacturing the stacked core 11B illustrated in FIG. 32. The holding part 63 is provided with three holding mechanisms 78. The individual holding blocks 73 of the three holding mechanisms 78 are arranged at equal intervals on the outer surface 28. In the stacked core 11B illustrated in FIG. 35, the adhesive 42 is applied to the three application areas 85 in each of the single plates 20B. The individual application areas 85 are arranged at equal intervals. The individual application areas 85 are desirably arranged at equal intervals, but this is not the case when there is a circumstance that arranging the individual application areas 85 at equal interval is difficult. As long as allowable bonding strength balance can be achieved, arrangement of the individual application areas 85 is not necessarily at equal intervals.

The holding part 63 is provided with three blank parts 83. The individual blank parts 83 are provided at equal intervals at a position of the outer surface 28. The spread area 86 is adjacent to the blank part 83. Three protrusion parts 87 are formed at equal intervals at a position of the outer surface 28. By causing the adhesive 42 to protrude in each of the protrusion parts 87, the adhesive 42 wets and spreads from each of the protrusion parts 87 on the outer surface 28. This allows the manufacturing apparatus 40 to manufacture the stacked core 11B in which the single plates 20B are firmly fixed to each other, with high productivity.

Figure 36:
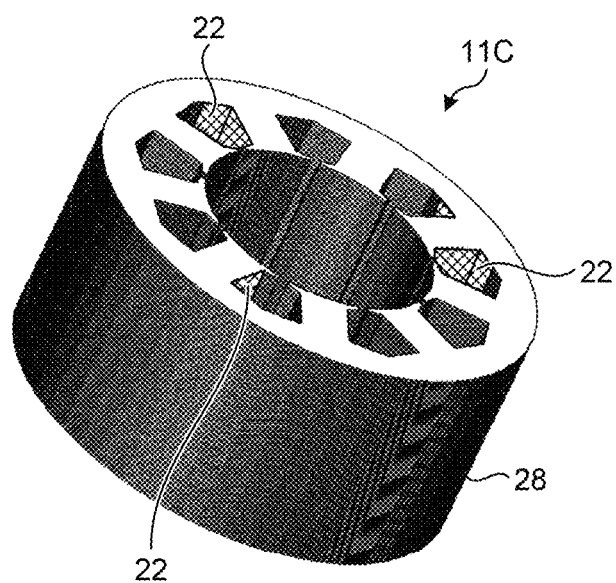
FIG. 36 is a view illustrating a stacked core according to a fourth modification of the first embodiment.
Figure 37:
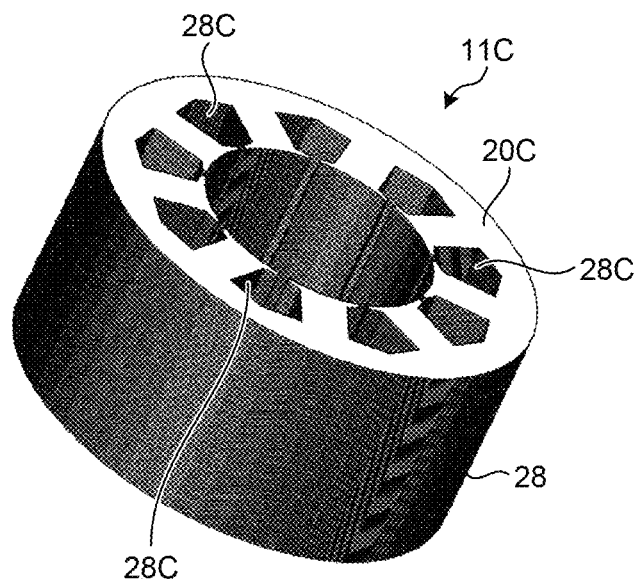
FIG. 37 is a view illustrating a configuration in which the second bonding layer is removed from the stacked core illustrated in FIG. 36.
Figure 38:
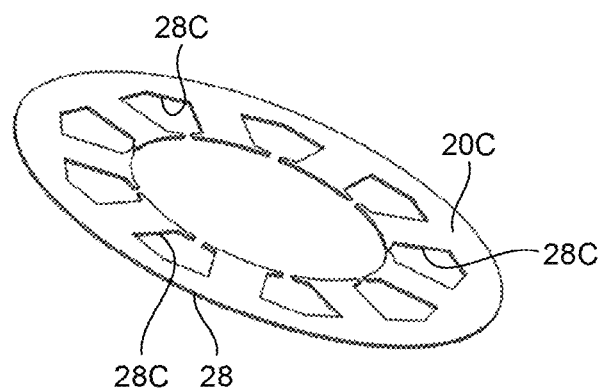
FIG. 38 is a view illustrating a single plate constituting the stacked core illustrated in FIG. 36.

FIG. 36 is a view illustrating a stacked core 11C according to a fourth modification of the first embodiment. FIG. 37 is a view illustrating a configuration in which the second bonding layer 22 is removed from the stacked core 11C illustrated in FIG. 36. FIG. 38 is a view illustrating a single plate 20C constituting the stacked core 11C illustrated in FIG. 36. The stacked core 11C is an annular stacked core. The single plate 20 C is an annular steel plate.

The stacked core 11C includes a plurality of second bonding layers 22. Each of the second bonding layers 22 is provided on an inner surface 28C on which a coil is disposed, in the stacked core 11C. Each of the second bonding layers 22 is formed in a belt shape in the stacking direction. In the stacked core 11C, the single plates 20C can be firmly fixed to each other by the first bonding layer 21 and the second bonding layer 22. Further, the stacked core 11C can be manufactured with high productivity.

Figure 39:
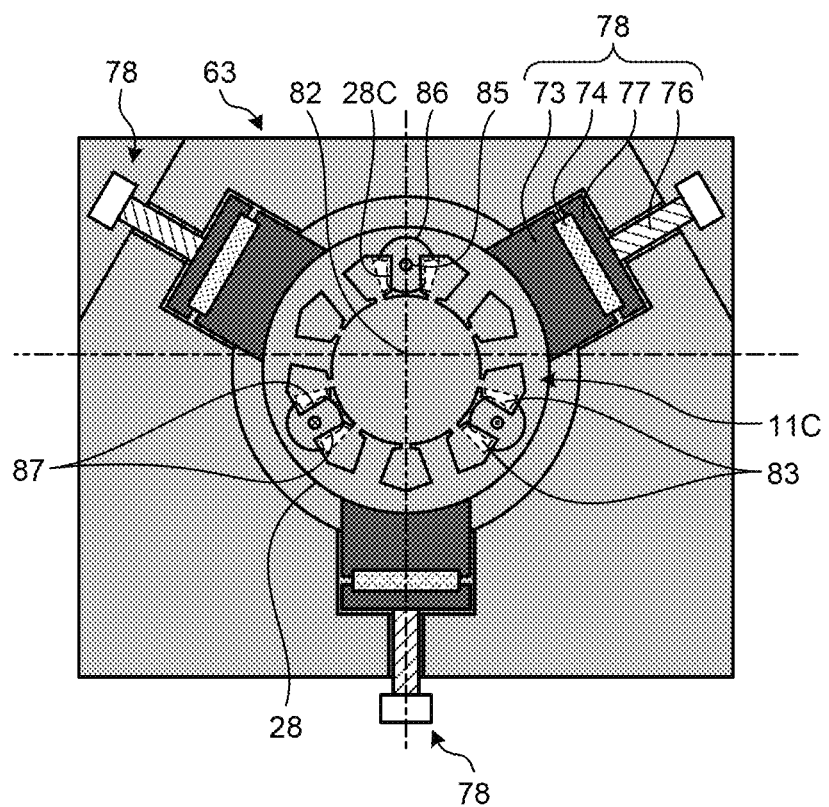
FIG. 39 is a view illustrating a seventh modification of the holding part in the first embodiment.

FIG. 39 is a view illustrating a seventh modification of the holding part 63 in the first embodiment. The holding part 63 illustrated in FIG. 39 is included in the press mold 56 to be used for manufacturing the stacked core 11C illustrated in FIG. 36. The holding part 63 is provided with three holding mechanisms 78 similarly to the holding part 63 illustrated in FIG. 35. In the stacked core 11C illustrated in FIG. 39, the adhesive 42 is applied to the three application areas 85 in each of the single plates 20C. The individual application areas 85 are arranged at equal intervals.

When two blank parts 83 for one application area 85 are used as one set of the blank parts 83, three sets of the blank parts 83 are provided in the holding part 63. The sets of the blank parts 83 each are provided at equal intervals at a position of the inner surface 28C. The three sets of the protrusion parts 87 are formed at equal intervals at a position of the inner surface 28C. By causing the adhesive 42 to protrude in each of the protrusion parts 87, the adhesive 42 wets and spreads from each of the protrusion parts 87 on the inner surface 28C. The second bonding layer 22 illustrated in FIG. 36 is formed on the inner surface 28C located in each protrusion part 87. This allows the manufacturing apparatus 40 to manufacture the stacked core 11C in which the single plates 20C are firmly fixed to each other, with high productivity.

Figure 40:
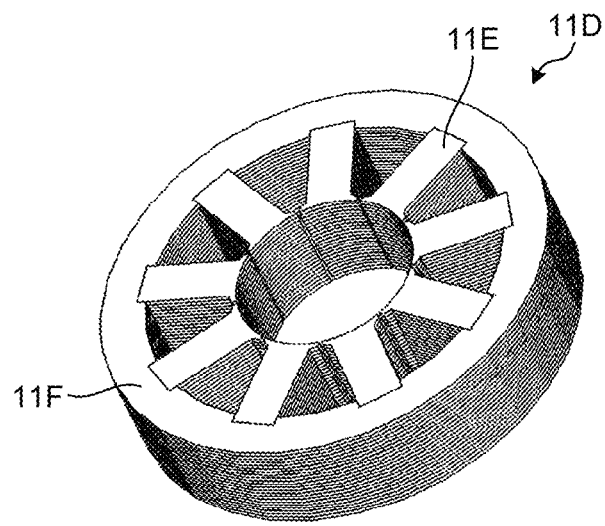
FIG. 40 is a view illustrating a stacked core according to a fifth modification of the first embodiment.
Figure 41:
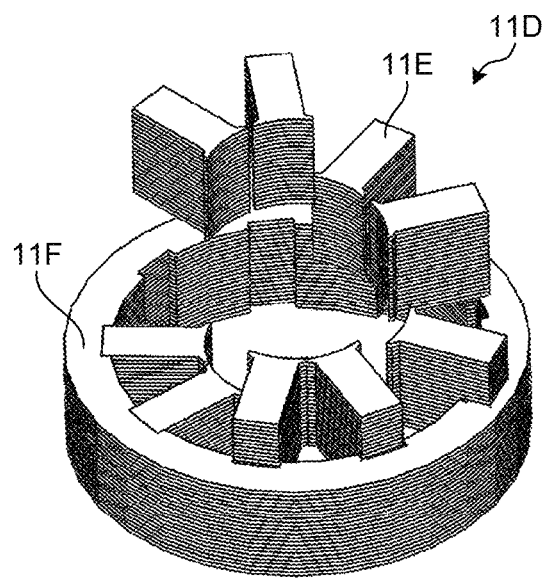
FIG. 41 is a view illustrating a state in which the stacked core illustrated in FIG. 40 is disassembled.

FIG. 40 is a view illustrating a stacked core 11D according to a fifth modification of the first embodiment. FIG. 41 is a view illustrating a state in which the stacked core 11D illustrated in FIG. 40 is disassembled. The stacked core 11D is an annular stacked core, and is a stacked core obtained by combining a plurality of divided cores. The stacked core 11D includes nine divided cores 11E and one divided core 11F. Each divided core 11E constitutes a tooth portion of the stacked core 11D. The divided core 11F constitutes a core back portion of the stacked core 11D.

Figure 42:
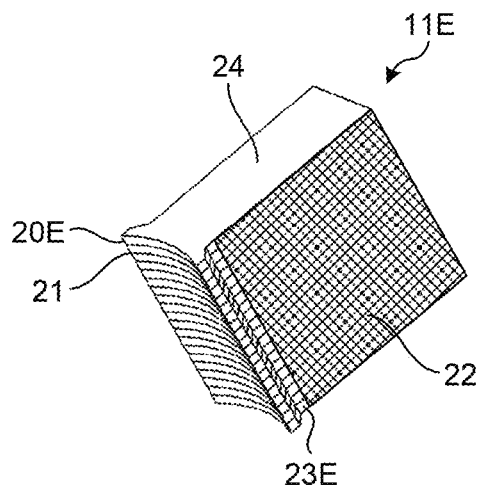
FIG. 42 is a view illustrating a divided core constituting the stacked core illustrated in FIG. 40.
Figure 43:
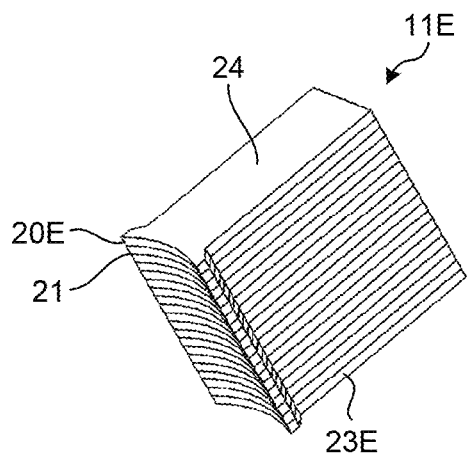
FIG. 43 is a view illustrating a configuration in which the second bonding layer is removed from the divided core illustrated in FIG. 42.
Figure 44:
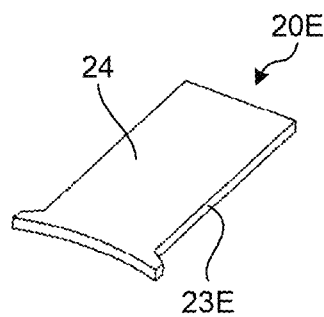
FIG. 44 is a view illustrating a single plate constituting the divided core illustrated in FIG. 42.

FIG. 42 is a view illustrating the divided core 11E constituting the stacked core 11D illustrated in FIG. 40. FIG. 43 is a view illustrating a configuration in which the second bonding layer 22 is removed from the divided core 11E illustrated in FIG. 42. FIG. 44 is a view illustrating a single plate 20E constituting the divided core 11E illustrated in FIG. 42. The second bonding layer 22 is provided on each of a plurality of side surfaces 23E. Each of the side surfaces 23E is a side surface constituted by the tooth central portion 24 in the divided core 11E. The divided core 11E is a stacked body of the single plates 20E. Each single plate 20E is a steel plate. In the divided core 11E, the single plates 20E can be firmly fixed to each other by the first bonding layer 21 and the second bonding layer 22. Further, the divided core 11E can be manufactured with high productivity.

Figure 45:
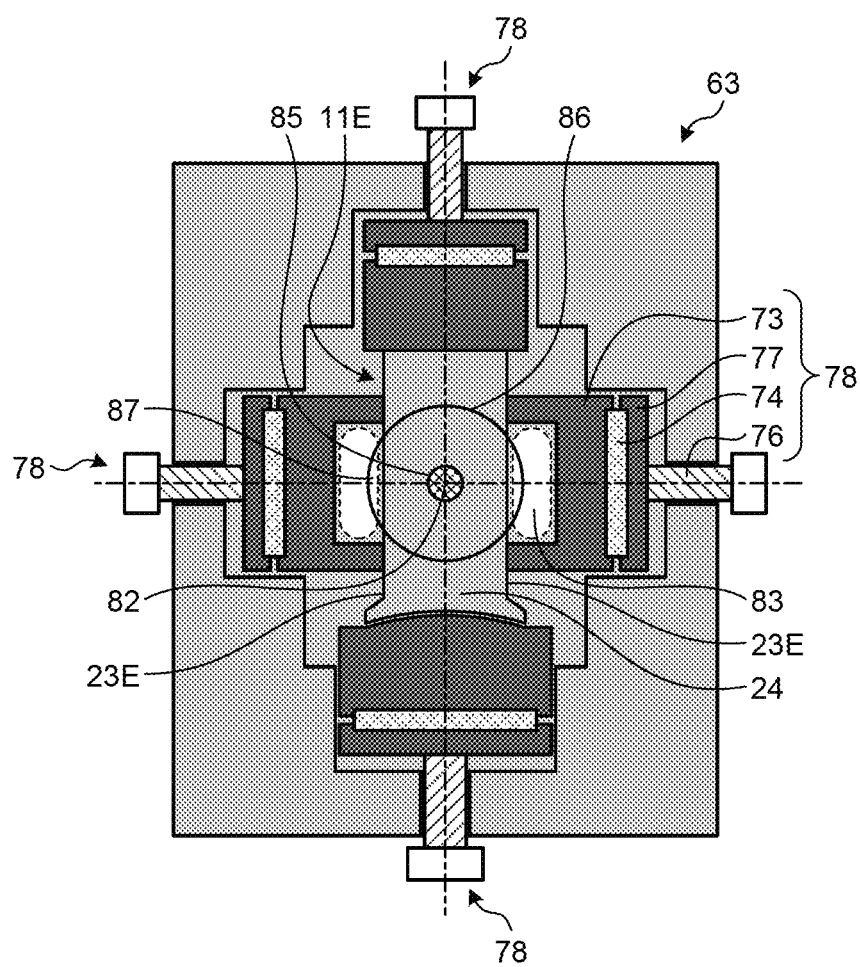
FIG. 45 is a view illustrating an eighth modification of the holding part in the first embodiment.

FIG. 45 is a view illustrating an eighth modification of the holding part 63 in the first embodiment. The holding part 63 illustrated in FIG. 45 is included in the press mold 56 to be used for manufacturing the divided core 11E illustrated in FIG. 42. The holding part 63 is provided with four holding mechanisms 78. Here, each of the four holding mechanisms 78 is referred to as a first holding mechanism, a second holding mechanism, a third holding mechanism, and a fourth holding mechanism.

The holding block 73 of the first holding mechanism and the holding block 73 of the second holding mechanism face each other in a first direction via the divided core 11E. The first direction is a longitudinal direction of the single plate 20E. The holding block 73 of the third holding mechanism and the holding block 73 of the fourth holding mechanism face each other in a second direction via the divided core 11E. The second direction is a direction perpendicular to the first direction on a plane illustrated in FIG. 45.

In the divided core 11E illustrated in FIG. 45, the adhesive 42 is applied to one application area 85 in each single plate 20E. The blank part 83 is provided at each position of the two side surfaces 23E. The protrusion part 87 is formed at a position of each side surface 23E. By causing the adhesive 42 to protrude in the protrusion part 87, the adhesive 42 wets and spreads on the side surface 23E. This allows the manufacturing apparatus 40 to manufacture the divided core 11E in which the single plates 20E are firmly fixed to each other, with high productivity.

Figure 46:
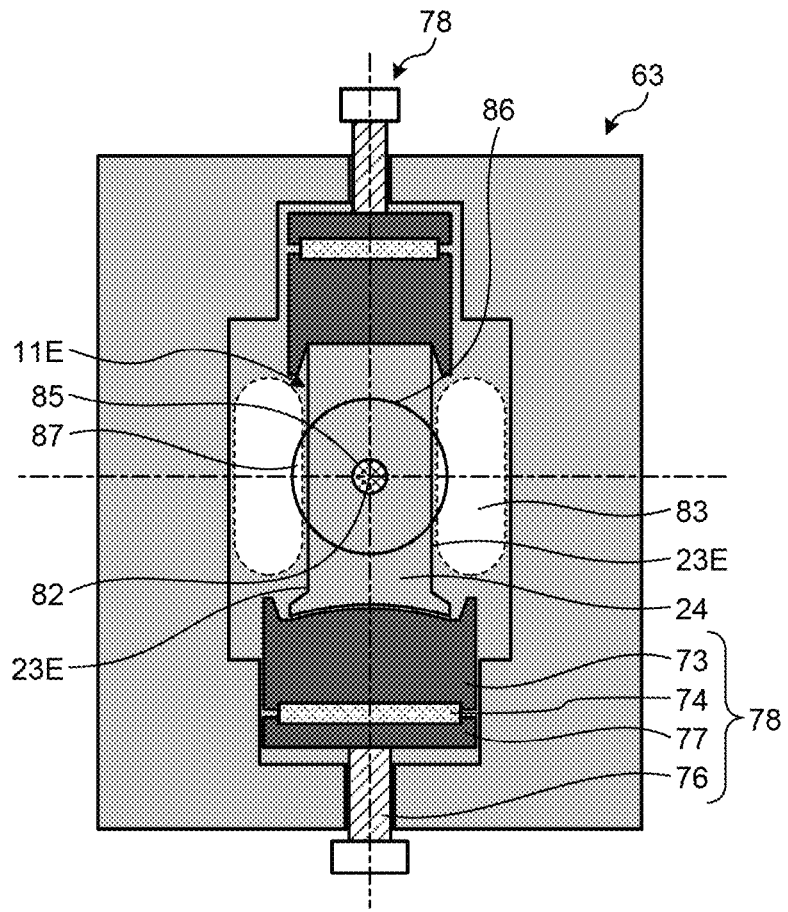
FIG. 46 is a view illustrating a ninth modification of the holding part in the first embodiment.

FIG. 46 is a view illustrating a ninth modification of the holding part 63 in the first embodiment. The holding part 63 illustrated in FIG. 46 is included in the press mold 56 to be used for manufacturing the divided core 11E illustrated in FIG. 42. The holding part 63 is provided with two holding mechanisms 78. Here, each of the two holding mechanisms 78 is referred to as a first holding mechanism and a second holding mechanism. The holding block 73 of the first holding mechanism and the holding block 73 of the second holding mechanism face each other in a first direction via the divided core 11E.

In the holding part 63, the adjustment screw 76 to adjust a center of the divided core 11E in a horizontal direction of FIG. 46 is not installed. In the holding part 63, the holding block 73 of the first holding mechanism is formed with a recess conforming to a shape of one end portion of the divided core 11E in the first direction. Further, the holding block 73 of the second holding mechanism is formed with a recess conforming to a shape of another end of the divided core 11E in the first direction. This allows the holding part 63 to position each unit structure in the horizontal direction in FIG. 46.

In the divided core 11E illustrated in FIG. 46, the adhesive 42 is applied to one application area 85 in each single plate 20E. The blank part 83 is provided at each position of the two side surfaces 23E. The protrusion part 87 is formed at a position of each side surface 23E. By causing the adhesive 42 to protrude in the protrusion part 87, the adhesive 42 wets and spreads on the side surface 23E. This allows the manufacturing apparatus 40 to manufacture the divided core 11E in which the single plates 20E are firmly fixed to each other, with high productivity.

Figure 47:
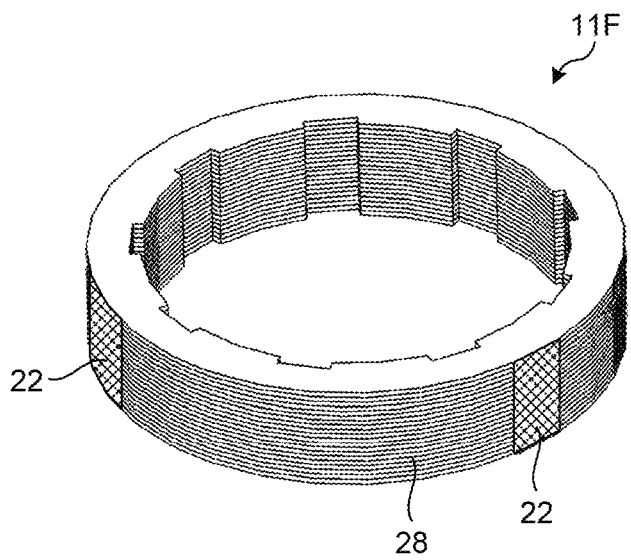
FIG. 47 is a view illustrating a first example of the divided core constituting the stacked core illustrated in FIG. 40.
Figure 48:
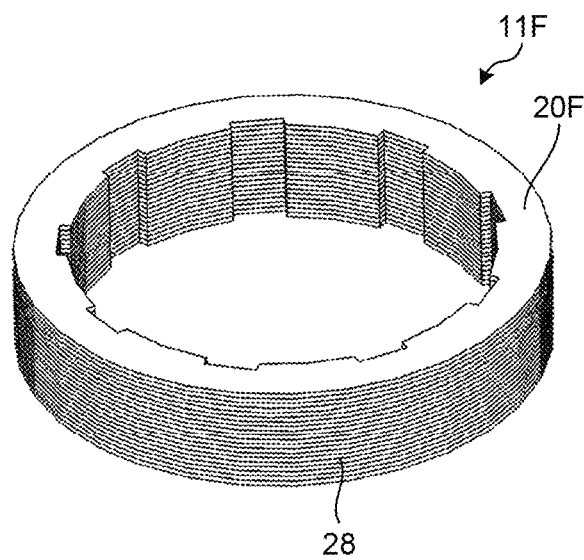
FIG. 48 is a view illustrating a configuration in which the second bonding layer is removed from the divided core illustrated in FIG. 47.
Figure 49:
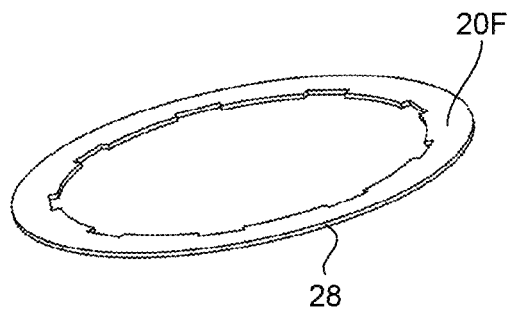
FIG. 49 is a view illustrating a single plate constituting the divided core illustrated in FIG. 47.

FIG. 47 is a view illustrating a first example of the divided core 11F constituting the stacked core 11D illustrated in FIG. 40. FIG. 48 is a view illustrating a configuration in which the second bonding layer 22 is removed from the divided core 11F illustrated in FIG. 47. FIG. 49 is a view illustrating a single plate 20F constituting the divided core 11F illustrated in FIG. 47. The single plate 20F is an annular steel plate.

The divided core 11F includes three second bonding layers 22. Each of the second bonding layers 22 is provided on the outer surface 28 of the divided core 11F. The outer surface 28 is a cylindrical surface. Each of the second bonding layers 22 is formed in a belt shape in the stacking direction. FIG. 47 illustrates two of the three second bonding layers 22. Another one of the three second bonding layers 22 is provided at a position invisible in FIG. 47. In the divided core 11F, the single plates 20F can be firmly fixed to each other by the first bonding layer 21 and the second bonding layer 22. Further, the divided core 11F can be manufactured with high productivity.

Figure 50:
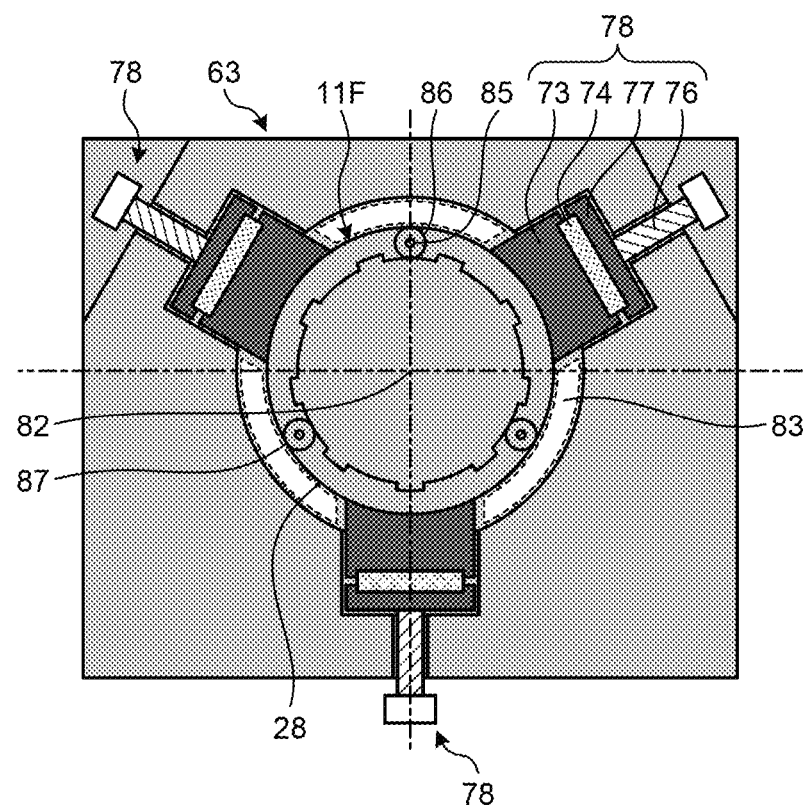
FIG. 50 is a view illustrating a tenth modification of the holding part in the first embodiment.

FIG. 50 is a view illustrating a tenth modification of the holding part 63 in the first embodiment. The holding part 63 illustrated in FIG. 50 is included in the press mold 56 to be used for manufacturing the divided core 11F illustrated in FIG. 47. The holding part 63 is provided with three holding mechanisms 78. The individual holding blocks 73 of the three holding mechanisms 78 are arranged at equal intervals on the outer surface 28. In the divided core 11F illustrated in FIG. 50, the adhesive 42 is applied to the three application areas 85 in each single plate 20F. The individual application areas 85 are arranged at equal intervals. The individual application areas 85 are desirably arranged at equal intervals, but this is not the case when there is a circumstance that arranging the individual application areas 85 at equal interval is difficult. As long as allowable bonding strength balance can be achieved, arrangement of the individual application areas 85 is not necessarily at equal intervals.

The holding part 63 is provided with three blank parts 83. The individual blank parts 83 are provided at equal intervals at a position of the outer surface 28. Three protrusion parts 87 are formed at equal intervals at a position of the outer surface 28. By causing the adhesive 42 to protrude in each of the protrusion parts 87, the adhesive 42 wets and spreads from each of the protrusion parts 87 on the outer surface 28. This allows the manufacturing apparatus 40 to manufacture the divided core 11F in which the single plates 20F are firmly fixed to each other, with high productivity.

Figure 51:
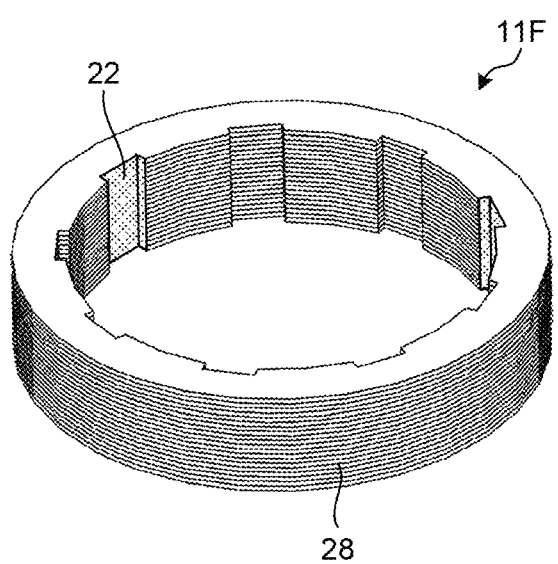
FIG. 51 is a view illustrating a second example of the divided core constituting the stacked core illustrated in FIG. 40.
Figure 52:
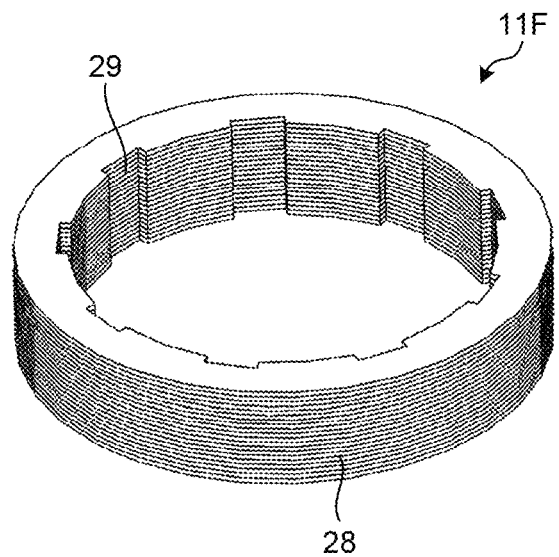
FIG. 52 is a view illustrating a configuration in which the second bonding layer is removed from the divided core illustrated in FIG. 51.
Figure 53:
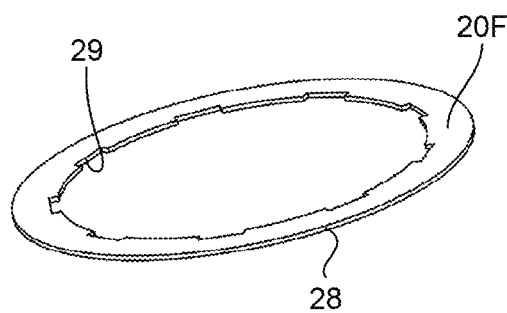
FIG. 53 is a view illustrating a single plate constituting the divided core illustrated in FIG. 51.

FIG. 51 is a view illustrating a second example of the divided core 11F constituting the stacked core 11D illustrated in FIG. 40. FIG. 52 is a view illustrating a configuration in which the second bonding layer 22 is removed from the divided core 11F illustrated in FIG. 51. FIG. 53 is a view illustrating the single plate 20F constituting the divided core 11F illustrated in FIG. 51.

The divided core 11F includes three second bonding layers 22. Each of the second bonding layers 22 is provided on an inner surface 29 of the divided core 11F into which the divided core 11E is fitted. Each of the second bonding layers 22 is formed in a belt shape in the stacking direction. In the divided core 11F, the single plates 20F can be firmly fixed to each other by the first bonding layer 21 and the second bonding layer 22. Further, the divided core 11F can be manufactured with high productivity.

Figure 54:
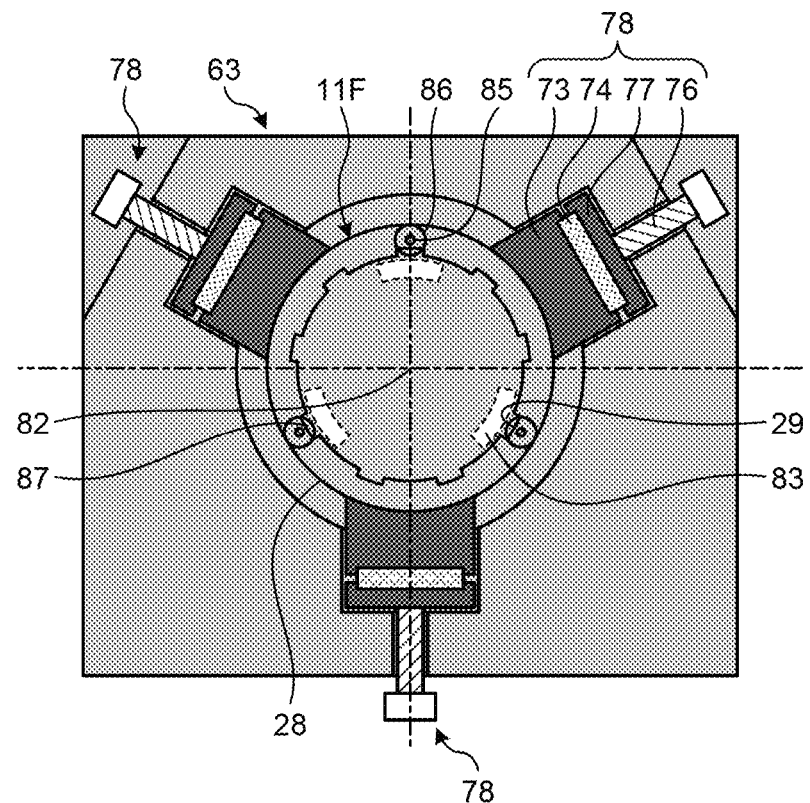
FIG. 54 is a view illustrating an eleventh modification of the holding part in the first embodiment.

FIG. 54 is a view illustrating an eleventh modification of the holding part 63 in the first embodiment. The holding part 63 illustrated in FIG. 54 is included in the press mold 56 to be used for manufacturing the divided core 11F illustrated in FIG. 51. The holding part 63 is provided with three holding mechanisms 78. The individual holding blocks 73 of the three holding mechanisms 78 are arranged at equal intervals on the outer surface 28. In the divided core 11F illustrated in FIG. 54, the adhesive 42 is applied to the three application areas 85 in each single plate 20F. The individual application areas 85 are arranged at equal intervals. The individual application areas 85 are desirably arranged at equal intervals, but this is not the case when there is a circumstance that arranging the individual application areas 85 at equal interval is difficult. As long as allowable bonding strength balance can be achieved, arrangement of the individual application areas 85 is not necessarily at equal intervals.

The holding part 63 is provided with three blank parts 83. The individual blank parts 83 are provided at equal intervals at a position of the inner surface 29. The three protrusion parts 87 are formed at equal intervals at a position of the inner surface 29. By causing the adhesive 42 to protrude in each of the protrusion parts 87, the adhesive 42 wets and spreads from each of the protrusion parts 87 on the inner surface 29. This allows the manufacturing apparatus 40 to manufacture the divided core 11F in which the single plates 20F are firmly fixed to each other, with high productivity.

In assembly of the stacked core 11D, each divided core 11E may be fitted into the divided core 11F before completion of curing reaction of the adhesive 42 applied to the inner surface 29. When the curing reaction of the adhesive 42 is completed after each divided core 11E is fitted into the divided core 11F, the manufacturing apparatus 40 can fix each divided core 11E to the divided core 11F with the second bonding layer 22. In this case, it is possible to omit application of an adhesive for fixing each divided core 11E to the divided core 11F separately from the second bonding layer 22. This enables reduction of manufacturing cost of the rotary electrical machine 1.

Figure 55:
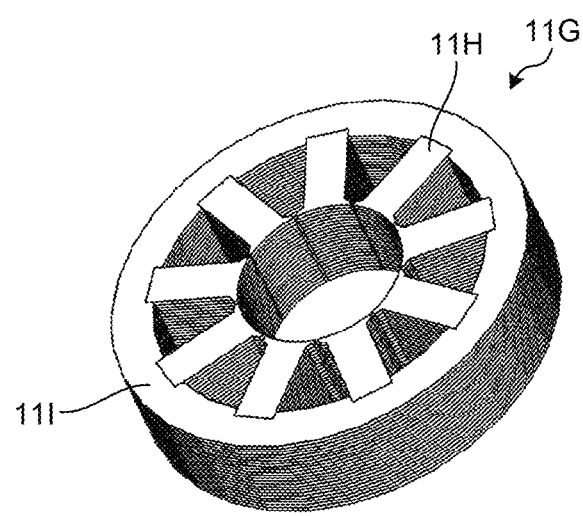
FIG. 55 is a view illustrating a stacked core according to a sixth modification of the first embodiment.
Figure 56:
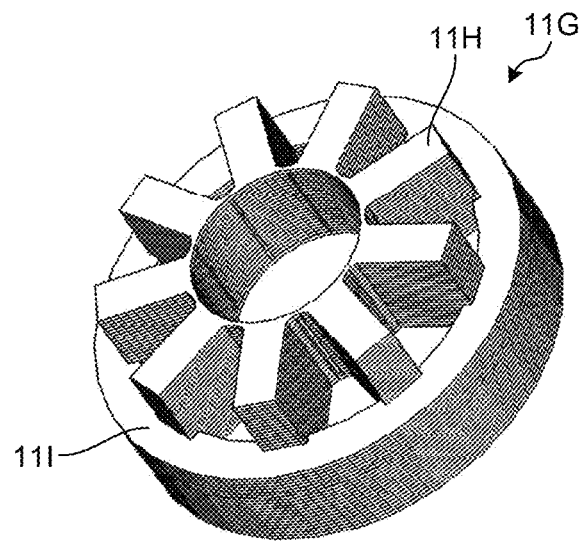
FIG. 56 is a view illustrating a state in which the stacked core illustrated in FIG. 55 is disassembled.
Figure 57:
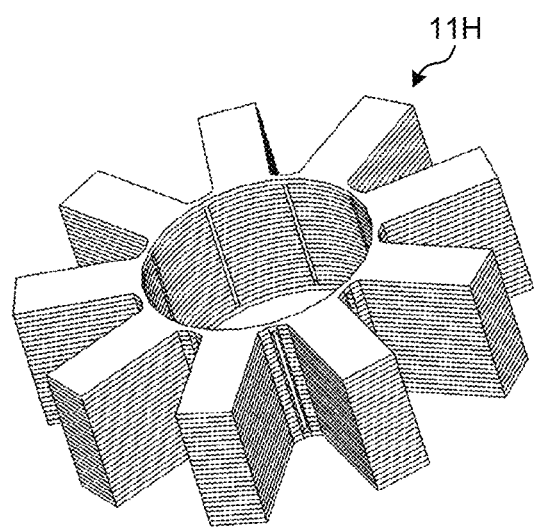
FIG. 57 is a view illustrating a divided core constituting the stacked core illustrated in FIG. 55.

FIG. 55 is a view illustrating a stacked core 11G according to a sixth modification of the first embodiment. FIG. 56 is a view illustrating a state in which the stacked core 11G illustrated in FIG. 55 is disassembled. FIG. 57 is a view illustrating a divided core 11H constituting the stacked core 11G illustrated in FIG. 55. The stacked core 11G is an annular stacked core, and is a stacked core obtained by combining a plurality of divided cores. The stacked core 11G includes one divided core 11H and one divided core 11I. The divided core 11H is a combination of the nine divided cores 11E illustrated in FIG. 41. The divided core 11I is identical to the divided core 11F illustrated in FIG. 41.

Figure 58:
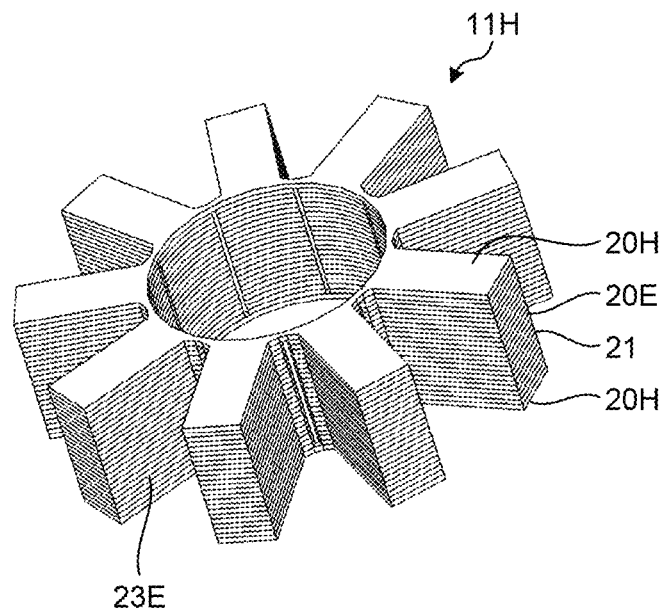
FIG. 58 is a first view for explaining a configuration of the divided core illustrated in FIG. 57.
Figure 59:
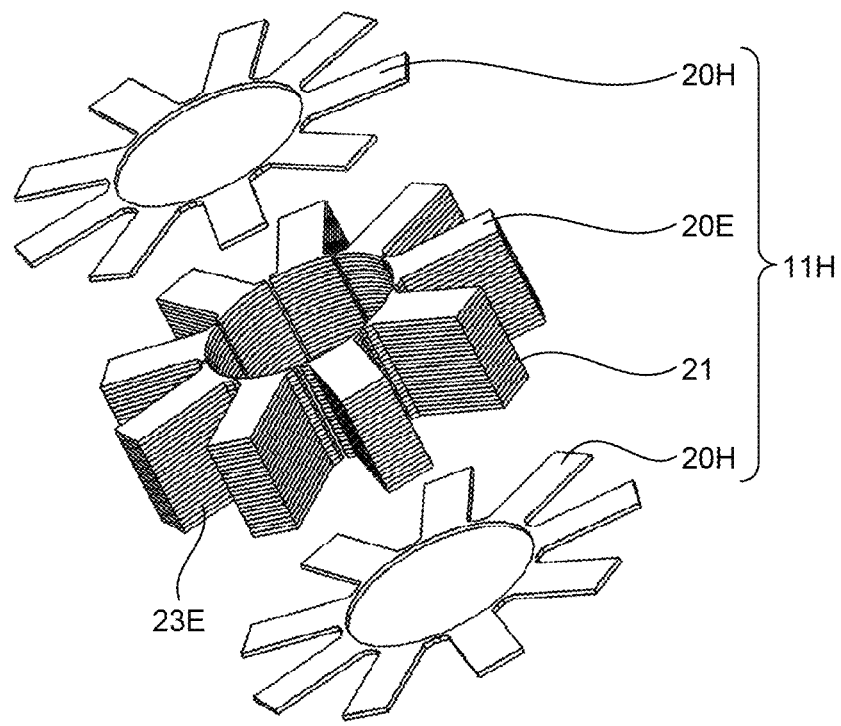
FIG. 59 is a second view for explaining the configuration of the divided core illustrated in FIG. 57.

FIG. 58 is a first view for explaining a configuration of the divided core 11H illustrated in FIG. 57. FIG. 59 is a second view for explaining a configuration of the divided core 11H illustrated in FIG. 57. The divided core 11H consists of the nine divided cores 11E and two single plates 20H.

One of the two single plates 20H is joined to the single plate 20E at one end of each divided core 11E in the stacking direction. Another one of the two single plates 20H is joined to the single plate 20E at another end of each divided core 11E in the stacking direction. Before the divided core 11H is combined with the divided core 11I, the nine divided cores 11E are integrated with the two single plates 20H. The two single plates 20H are removed after the divided core 11H is combined with the divided core 11I.

According to the sixth modification, it is possible to manufacture the stacked core 11G having a configuration similar to the stacked core 11D illustrated in FIG. 40. Since the nine divided cores 11E are integrated until the divided core 11H is combined with the divided core 11I, the nine divided cores 11E can be easily transported. In addition, positional accuracy of the nine divided cores 11E can be enhanced. Note that, instead of removing the two single plates 20H, the nine divided cores 11E may be divided from each other by cutting a connection portion of each divided core 11E in each single plate 20H.

In the divided core 11H, similarly to the stacked core 11D illustrated in FIG. 40, the second bonding layer 22 is provided on each of the plurality of side surfaces 23E. In FIGS. 55 to 59, the second bonding layer 22 is not illustrated. The divided core 11H can have the single plates 20E firmly fixed to each other and can be manufactured with high productivity.

Figure 60:
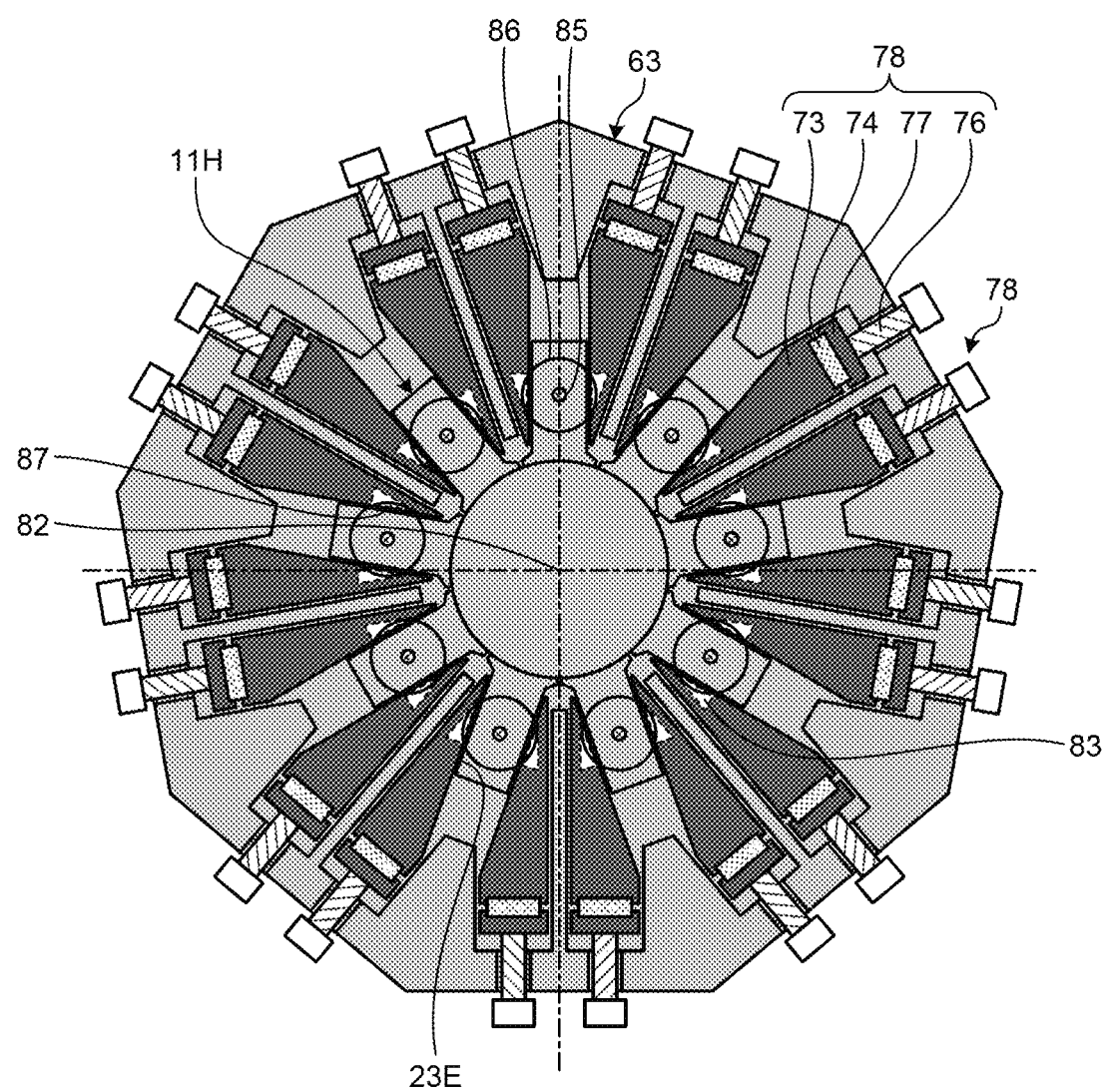
FIG. 60 is a view illustrating a twelfth modification of the holding part in the first embodiment.

FIG. 60 is a view illustrating a twelfth modification of the holding part 63 in the first embodiment. The holding part 63 illustrated in FIG. 60 is included in the press mold 56 to be used for manufacturing the divided core 11H illustrated in FIG. 58. The holding part 63 is provided with two holding mechanisms 78 per divided core 11E. That is, the holding part 63 is provided with 18 pieces of the holding mechanism 78.

In the divided core 11H illustrated in FIG. 60, the adhesive 42 is applied to one application area 85 in each single plate 20E. The blank part 83 is provided at a position of each side surface 23E. The protrusion part 87 is formed at a position of each side surface 23E. By causing the adhesive 42 to protrude in the protrusion part 87, the adhesive 42 wets and spreads on the side surface 23E. This allows the manufacturing apparatus 40 to manufacture the divided core 11H in which the single plates 20E are firmly fixed to each other, with high productivity.

Note that, the manufacturing apparatus 40 and the manufacturing method according to the first embodiment may be applied to a rotary electrical machine other than the rotary electrical machine 1 exemplified in the first embodiment. The manufacturing apparatus 40 and the manufacturing method according to the first embodiment may be applied to, for example, the rotary electrical machine 1 having an axial gap structure. The manufacturing apparatus 40 and the manufacturing method according to the first embodiment can be widely applied to the rotary electrical machine 1 including a stacked core, such as a servomotor, a linear motor, an air conditioning fan motor, an in-vehicle motor, a hoisting machine motor, a transformer, and a resolver. According to the first embodiment, the rotary electrical machine 1 can improve dimensional accuracy and bonding strength of a stacked core which is a stacked body of steel plates bonded to one another. Further, according to the first embodiment, the rotary electrical machine 1 with high efficiency can be produced with high productivity.

Second Embodiment

Figure 61:
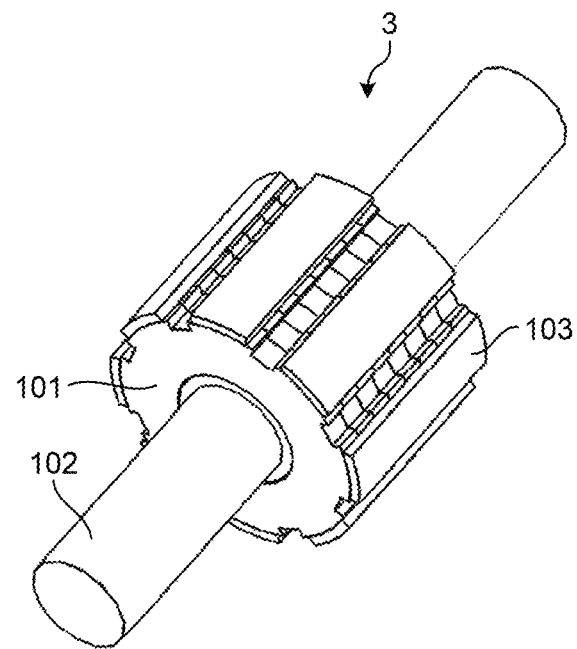
FIG. 61 is a view illustrating a rotor including a stacked core according to a second embodiment.
Figure 62:
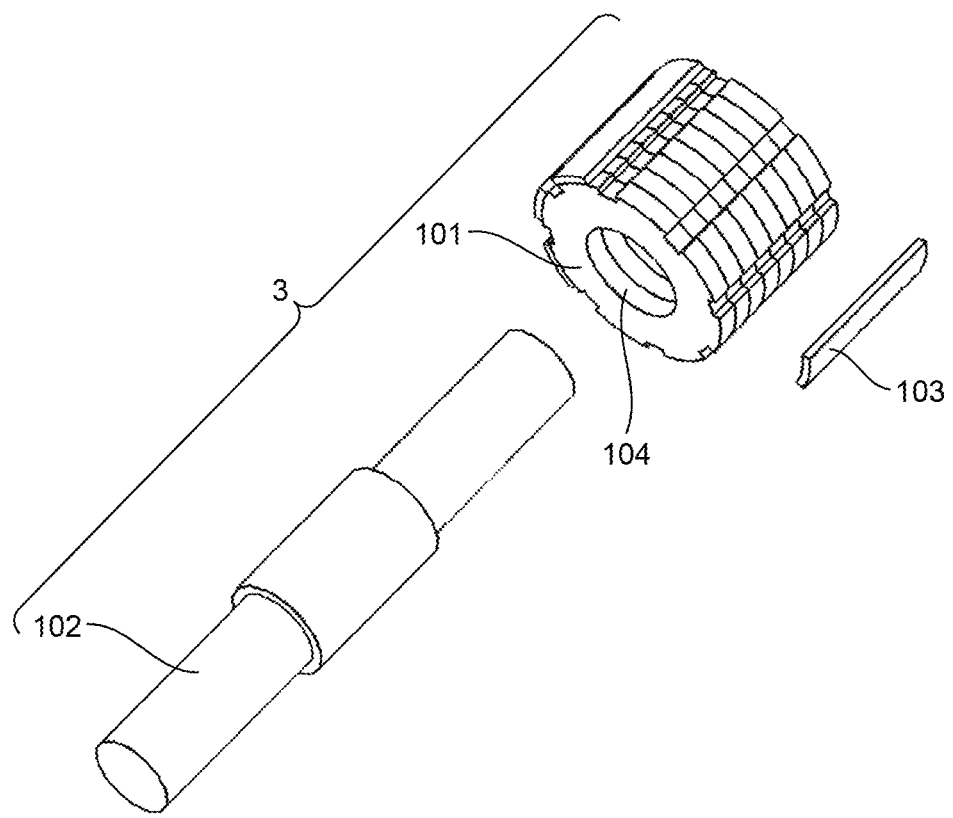
FIG. 62 is an exploded view of the rotor illustrated in FIG. 61.

In the second embodiment, a stacked core to be applied to the rotor 3, a manufacturing method for the stacked core, and a manufacturing apparatus for the stacked core will be described. FIG. 61 is a view illustrating the rotor 3 including a stacked core according to the second embodiment. FIG. 62 is an exploded view of the rotor 3 illustrated in FIG. 61. The rotor 3 can be applied to the rotary electrical machine 1 illustrated in FIG. 1. In the second embodiment, components identical to those in the first embodiment are denoted by identical reference numerals, and configurations different from those in the first embodiment will be mainly described.

The rotor 3 includes a stacked core 101, a shaft 102, and a plurality of permanent magnets 103. At a center of the stacked core 101, a hole 104 is formed. The shaft 102 passes through the hole 104 and is fixed to the stacked core 101. The shaft 102 transmits a rotational force of the rotor 3 to an outside of the rotary electrical machine 1. Each permanent magnet 103 is fixed to an outer surface of the stacked core 101.

The rotor 3 illustrated in FIG. 61 is a surface permanent magnetic (SPM) rotor in which the permanent magnet 103 is provided on an outer surface of the rotor 3. Note that, the rotor 3 may be an interior permanent magnet (IPM) rotor in which the permanent magnet 103 is embedded in the rotor 3. A manufacturing method for the stacked core 101 and a manufacturing apparatus for the stacked core 101 according to the second embodiment can be applied to both the SPM rotor and the IPM rotor.

Figure 63:
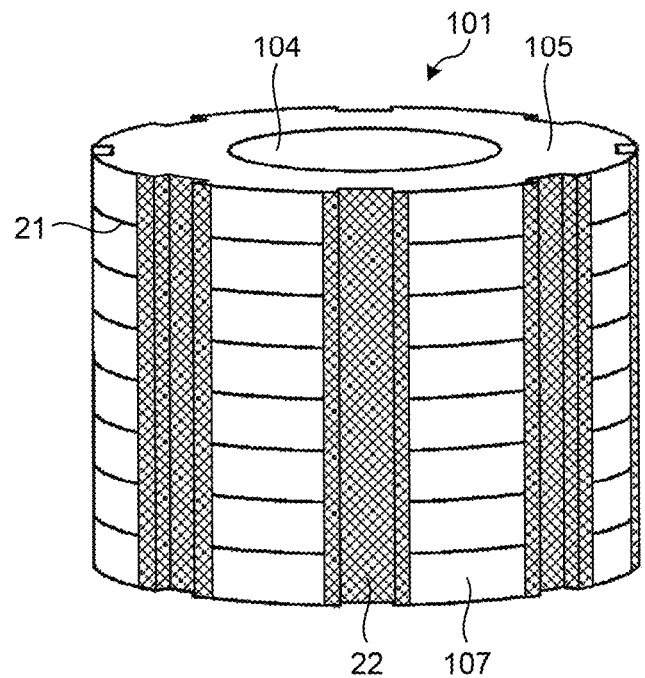
FIG. 63 is a view illustrating the stacked core according to the second embodiment.
Figure 64:
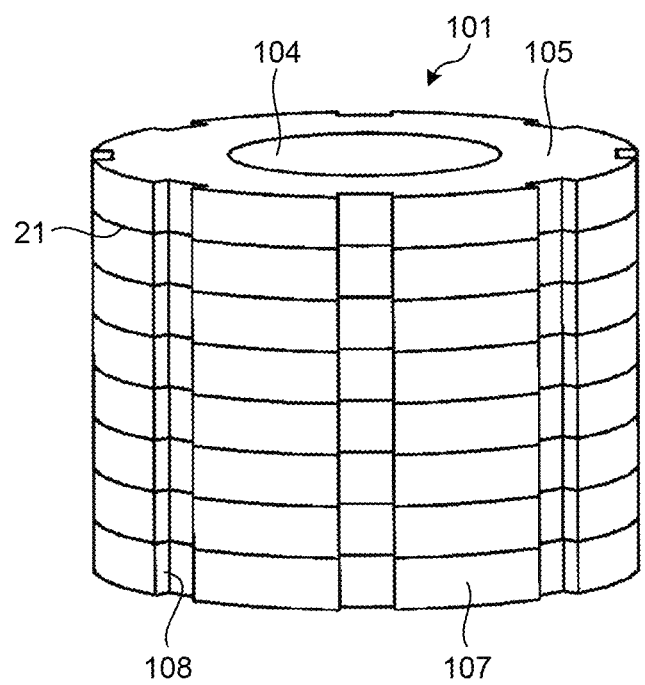
FIG. 64 is a view illustrating a configuration in which the second bonding layer is removed from the stacked core illustrated in FIG. 63.
Figure 65:
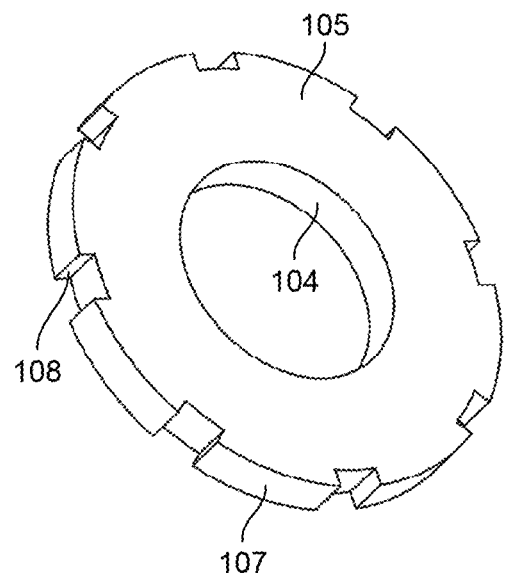
FIG. 65 is a view illustrating a single plate which is a steel plate constituting the stacked core illustrated in FIG. 63.

FIG. 63 is a view illustrating the stacked core 101 according to the second embodiment. FIG. 64 is a view illustrating a configuration in which the second bonding layer 22 is removed from the stacked core 101 illustrated in FIG. 63. FIG. 65 is a view illustrating a single plate 105 which is a steel plate constituting the stacked core 101 illustrated in FIG. 63.

The stacked core 101 illustrated in FIG. 63 includes: a plurality of single plates 105 stacked on one another; the first bonding layer 21 that is sandwiched between the single plates 105 in a stacked body consisting of the plurality of single plates 105 and fixes the single plates 105 to each other; and the second bonding layer 22 provided on an outer surface 107 of the stacked body. The outer surface 107 is a surface obtained by integrating the outer surface 107 of each of the plurality of single plates 105. On the outer surface 107, a plurality of recesses 108 are formed. The second bonding layer 22 is provided in each recess 108 of the outer surface 107.

Each of the plurality of single plates 105 has an identical shape. The single plate 105 illustrated in FIG. 65 is manufactured by punching a desired shape from the hoop material 50 by press working. The single plate 105 is an electromagnetic steel plate or a silicon steel plate. In the following description, the single plate 105 is an electromagnetic steel plate. The electromagnetic steel plate is a non-oriented electromagnetic steel plate or an oriented electromagnetic steel plate.

In the stacked core 101 according to the second embodiment, the single plates 105 are fixed with each other by the first bonding layer 21, and the plurality of single plates 105 are fixed with each other by the second bonding layer 22. The second bonding layer 22 is formed by intentionally causing the adhesive 42 applied between the single plates 105 to protrude up to the outer surface 107, and causing the adhesive 42 to wet and spread in the stacking direction.

Similarly to the stacked core 11 according to the first embodiment illustrated in FIG. 8, the shear surface 31, the fracture surface 32, the shear droop 33, and the burr 34 are distributed on the outer surface 107. The adhesive 42 leaking to the outer surface 107 enters each of the shear surface 31, the fracture surface 32, the shear droop 33, and the burr 34, and is cured. As a result, the second bonding layer 22 having an anchor structure is formed on the outer surface 107. By the formation of the second bonding layer 22 having the anchor structure, a bonding force between the second bonding layer 22 and the side surface is increased by an anchor effect. In addition, by the formation of the second bonding layer 22 having the anchor structure, an area of a portion where the second bonding layer 22 and each single plate 105 are in contact with each other is increased. Thus, in the stacked core 101, each of the plurality of single plates 105 can be firmly fixed by the second bonding layer 22. Similarly to the stacked core 11 according to the first embodiment, the stacked core 101 is suitable for downsizing the rotary electrical machine 1 and is effective for increasing efficiency of the rotary electrical machine 1.

Next, a manufacturing method and a manufacturing apparatus for the stacked core 101 according to the second embodiment will be described. To manufacturing of the stacked core 101, the manufacturing apparatus 40 similar to that of the first embodiment can be applied.

Figure 66:
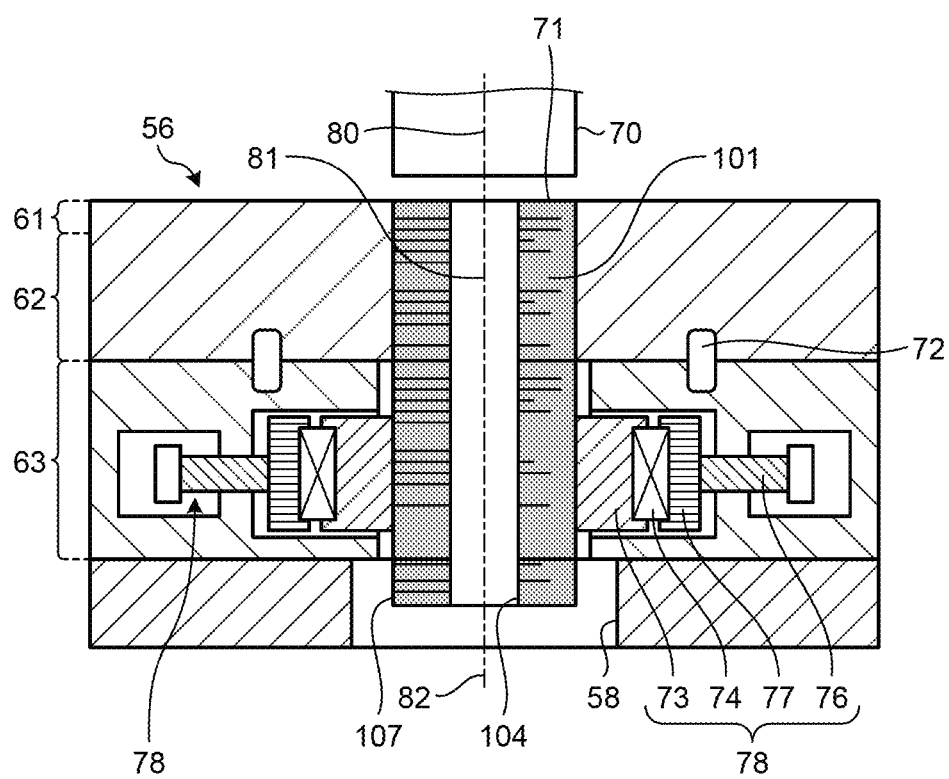
FIG. 66 is a view illustrating a configuration of a press mold included in a manufacturing apparatus according to the second embodiment.

FIG. 66 is a view illustrating a configuration of the press mold 56 included in the manufacturing apparatus 40 according to the second embodiment. FIG. 66 illustrates a cross section of the press mold 56 and a cross section of the stacked core 101 in the press mold 56. The press mold 56 in the second embodiment is similar to the press mold 56 in the first embodiment illustrated in FIG. 14. Similarly to the case of the first embodiment, the manufacturing apparatus 40 can improve a yield of the stacked core 101 and quality of the stacked core 101. In addition, the manufacturing apparatus 40 can prevent an increase in manufacturing cost of the stacked core 101.

Similarly to the case of the first embodiment, the press mold 56 can reduce a thickness of the first bonding layer 21 and stabilize the thickness of the first bonding layer 21. As a result, the manufacturing apparatus 40 can reduce variations in time required for curing the adhesive 42 and variations in bonding strength. In addition, the manufacturing apparatus 40 can increase a machining speed of the pressing machine and improve the productivity of the stacked core 101. The manufacturing apparatus 40 can reduce deterioration of the straightness of the stacked core 101 and deterioration of the parallelism of the stacked core 101, and can improve a yield of the stacked core 101.

By being able to improve the straightness of the stacked core 101 and improve variations in the straightness of the stacked core 101, the manufacturing apparatus 40 can reduce the air gap of the rotary electrical machine 1. Since the air gap can be reduced, efficiency of the rotary electrical machine 1 can be increased. The manufacturing apparatus 40 can produce the rotary electrical machine 1 having high efficiency, with high productivity. This enables production of the rotary electrical machine 1 having high efficiency, with high productivity.

Similarly to the first embodiment, when a contour of the single plate 105 increases to such an extent that a force applied to the plate-shaped elastic body 74 exceeds an elastic region of the plate-shaped elastic body 74, the manufacturing apparatus 40 can adjust a position of the holding block 73 by adjusting tightening of the adjustment screw 76. By being able to adjust the position of the holding block 73 following a degree of wear even if the wear of the punch 70 and the die 71 progresses, the manufacturing apparatus 40 can reduce jamming of the stacked core 101. In addition, the manufacturing apparatus 40 may adjust the adjustment screw 76 by using a drive source such as a servo motor. This allows the manufacturing apparatus 40 to control positions of the plate-shaped elastic body 74 and the holding block 73 or a position of the center 82 with high accuracy.

Figure 67:
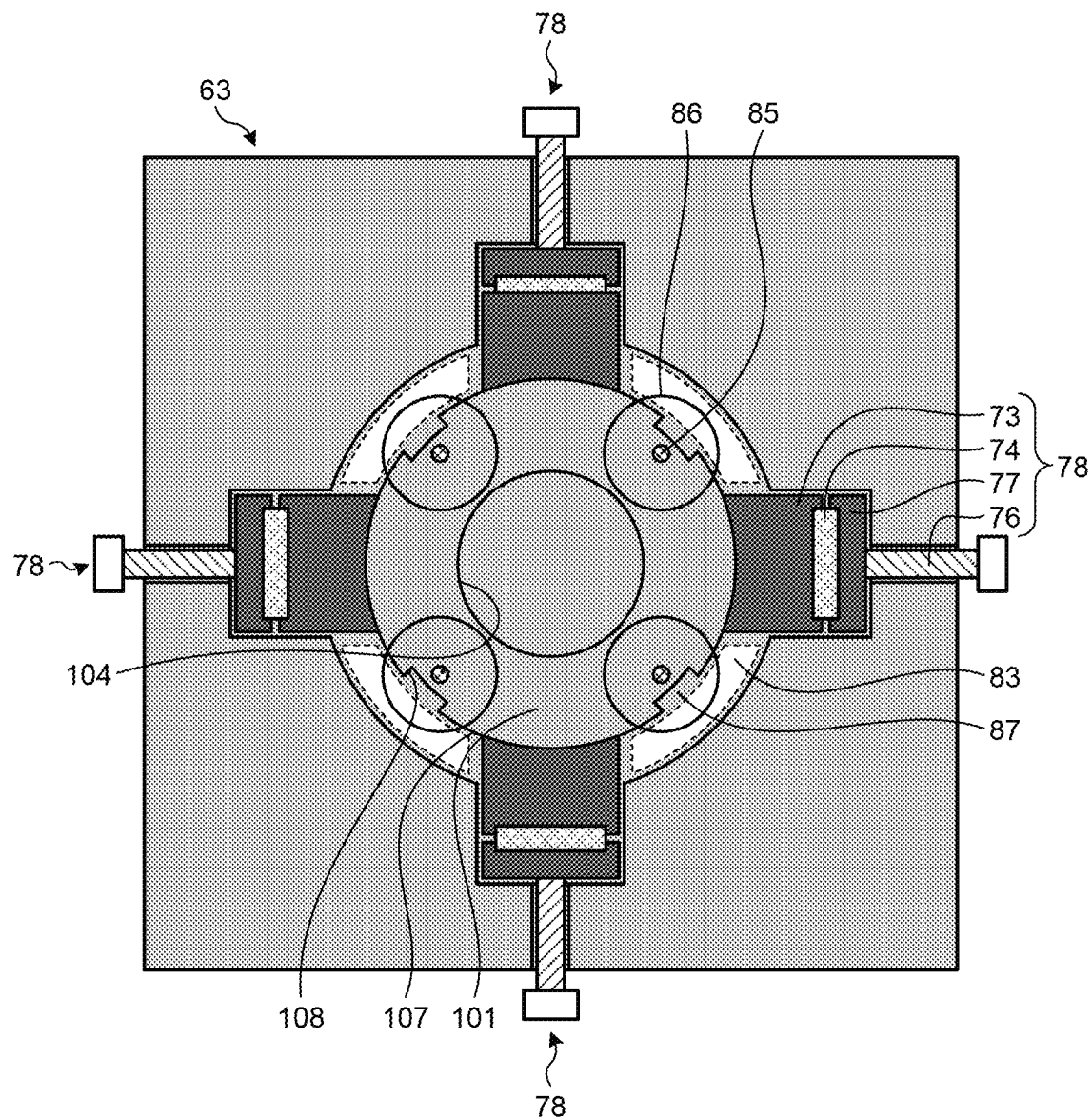
FIG. 67 is a plan view illustrating a holding part of the press mold illustrated in FIG. 66.

Next, formation of the second bonding layer 22 by the manufacturing apparatus 40 for the stacked core 101 according to the second embodiment will be described. FIG. 67 is a plan view illustrating the holding part 63 of the press mold 56 illustrated in FIG. 66. FIG. 67 illustrates a state in which the holding part 63 holding the stacked core 101 is viewed from above. FIG. 67 illustrates the holding part 63 including four holding mechanisms 78. The individual holding blocks 73 of the four holding mechanisms 78 are arranged at equal intervals on the outer surface 107. In the stacked core 101 illustrated in FIG. 67, the adhesive 42 is applied to four application areas 85. The individual application areas 85 are arranged at equal intervals.

In the second embodiment, the manufacturing apparatus 40 forms the second bonding layer 22 by intentionally causing the adhesive 42 to protrude from a specific position of the single plate 105. The manufacturing apparatus 40 can set the application area 85 and an amount of the adhesive 42 without providing restrictions as in a case where the adhesive 42 does not protrude. The manufacturing apparatus 40 can prevent the adhesive 42 from becoming a foreign substance, by forming the second bonding layer 22 with the adhesive 42 caused to protrude.

The holding part 63 is provided with four blank parts 83. The individual blank parts 83 are provided at equal intervals at a position of the outer surface 107. The spread area 86 is adjacent to the blank part 83. The four protrusion parts 87 are formed at equal intervals at a position of the outer surface 107. By causing the adhesive 42 to protrude in each of the protrusion parts 87, the adhesive 42 wets and spreads from each of the protrusion parts 87 on the outer surface 107. This allows the manufacturing apparatus 40 to manufacture the stacked core 101 in which the single plates 105 are firmly fixed to each other, with high productivity.

By intentionally causing the adhesive 42 to protrude in the blank part 83, the manufacturing apparatus 40 can increase an amount of the adhesive 42 to be applied, as compared with a case where the application area 85 and an amount of the adhesive 42 are set such that the adhesive 42 does not protrude over the entire periphery of the single plate 105. This allows the manufacturing apparatus 40 to increase the bonding area and improve the bonding strength by the first bonding layer 21.

In the protrusion part 87 outside the contour of the single plate 105 in a range where the adhesive 42 spreads around the application area 85, the adhesive 42 protrudes from a gap between the single plates 105 to the outer surface 107. The second bonding layer 22 illustrated in FIG. 63 is formed by the adhesive 42 spreading on the outer surface 107.

The adhesive 42 protruding in the protrusion part 87 spreads to the side surface of the stacked core 101 without reaching the holding block 73. This allows the manufacturing apparatus 40 to improve the bonding strength by the first bonding layer 21 without causing a situation in which the stacked core 101 is bonded to the holding block 73 or the press mold 56. Providing the blank part 83 in the press mold 56 makes it possible to prevent generation of a foreign substance due to scraping off of the protruding adhesive 42 by the holding block 73. This allows the manufacturing apparatus 40 and the rotary electrical machine 1 to avoid the above-described problems due to generation of a foreign substance.

Since the second bonding layer 22 is formed by curing of the adhesive 42 that has permeated the shear surface 31, the fracture surface 32, the shear droop 33, and the burr 34, the second bonding layer 22 exerts an anchor effect. The stacked core 101 can obtain high bonding strength due to the anchor effect of the second bonding layer 22, as compared with a case where the adhesive 42 is applied to a smooth application surface.

Note that the number of the holding mechanisms 78 is not limited to four, and may be any number. A position of the holding mechanism 78 is not limited to the position illustrated in FIG. 67, and can be changed as appropriate. A position, a number, and a shape of the blank part 83 provided in the holding part 63 are not limited to those illustrated in FIG. 67. Each of the position, the number, and the shape of the blank part 83 can be freely set. The position, the number, and the shape of the blank part 83 can be appropriately set according to a shape of the single plate 105.

Note that the manufacturing apparatus 40 and the manufacturing method according to the second embodiment may be applied to, for example, the rotary electrical machine 1 having an axial gap structure. The manufacturing apparatus 40 and the manufacturing method according to the second embodiment can be widely applied to the rotary electrical machine 1 including a stacked core, such as a servomotor, a linear motor, an air conditioning fan motor, an in-vehicle motor, a hoisting machine motor, a transformer, and a resolver. According to the second embodiment, in the rotary electrical machine 1, it is possible to improve dimensional accuracy and bonding strength of a stacked core which is a stacked body of steel plates bonded to one another. Further, according to the second embodiment, the rotary electrical machine 1 with high efficiency can be produced with high productivity.

The configuration described in each of the above embodiments illustrates an example of the contents of the present disclosure. The configuration of each embodiment can be combined with another known technique. The configurations of the individual embodiments may be appropriately combined. A part of the configuration of each embodiment can be omitted or changed without departing from the gist of the present disclosure.

REFERENCE SIGNS LIST 1 rotary electrical machine; 2 stator; 3 rotor; 10 stator core; 11, 11A, 11B, 11C, 11D, 11G, 101 stacked core; 11E, 11F, 11H, 11I divided core; 12 resin; 13 insulation component; 15 frame; 20, 20A, 20B, 20C, 20E, 20F, 20H, 105 single plate; 21 first bonding layer; 22 second bonding layer; 23, 23E side surface; 23a end surface; 24 tooth central portion; 25 tooth distal end portion; 26 core back portion; 27 groove; 28, 107 outer surface; 28C, 29 inner surface; 31 shear surface; 32 fracture surface; 33 shear droop; 34 burr; 40 manufacturing apparatus; 41 reaction initiator; 42 adhesive; 43, 104 hole; 44 pusher; 48 first pipe; 49 second pipe; 50 hoop material; 52 first nozzle; 53 first tank; 54 second nozzle; 55 second tank; 56 press mold; 57 cutter; 58 discharge port; 59 leveler; 60 feeding device; 61 punching part; 62 stacking part; 63 holding part; 69 metal elastic body; 70 punch; 71 die; 72 positioning block; 73 holding block; 74 plate-shaped elastic body; 75 guide pin; 76 adjustment screw; 77 receiving plate; 78 holding mechanism; 80, 81, 82 center; 83 blank part; 85 application area; 86 spread area; 87 protrusion part; 90 heater; 91 mold heating device; 102 shaft; 103 permanent magnet; 108 recess.

The invention claimed is:

1. A stacked core manufacturing method comprising:
   punching a steel plate from a material to which an adhesive has been applied;
   sequentially stacking a plurality of the steel plates that have been punched out, and forming a first bonding layer to fix the steel plates adjacent to each other in a stacking direction of the plurality of the steel plates, by the adhesive sandwiched between the steel plates; and
   forming a second bonding layer to fix the plurality of the steel plates to one another, on a side surface that is a surface formed by each end surface of the plurality of the steel plates in a stacked body in which the plurality of the steel plates are stacked, by applying a force in the stacking direction to the stacked body to cause the adhesive to protrude from between the steel plates, and causing the adhesive to spread in the stacking direction on the side surface, wherein
   in forming the first bonding layer, the adhesive is spread in a part of an area of a plate surface on which the first bonding layer is formed in the steel plates, and
   in forming the second bonding layer, the adhesive is caused to protrude from a portion in the area in a contour of the steel plate,
   in a holder to hold the stacked body in forming the first bonding layer and forming the second bonding layer, there is provided a holding block to hold the stacked body by coming into contact with the stacked body from a direction perpendicular to the stacking direction, and
   in forming the second bonding layer, the second bonding layer is formed by causing the adhesive to protrude in a blank part adjacent to the area, the blank part being a space where the holding block is not provided in a periphery of the stacked body.

2. The stacked core manufacturing method according to claim 1, wherein, in forming the second bonding layer, the second bonding layer having an anchor structure is formed by curing the adhesive that has entered irregularities on the end surface.

3. The stacked core manufacturing method according to claim 2, wherein
   in a holder to hold the stacked body in forming the first bonding layer and forming the second bonding layer, there is provided a holding block to hold the stacked body by coming into contact with the stacked body from a direction perpendicular to the stacking direction, and
   in forming the second bonding layer, the second bonding layer is formed by causing the adhesive to protrude in a blank part adjacent to the area, the blank part being a space where the holding block is not provided in a periphery of the stacked body.

4. A stacked core manufacturing apparatus comprising:
   a puncher to punch a steel plate from a material to which an adhesive has been applied; and
   a holder to hold a stacked body formed by stacking a plurality of the steel plates that have been punched out, wherein
   the holder forms a second bonding layer to fix each of the plurality of the steel plates to one another in a rotary electrical machine, on a side surface including each end surface of the plurality of the steel plates in the stacked body, by applying a force in a stacking direction to the stacked body to cause the adhesive to protrude from between the steel plates adjacent to each other in the stacking direction, and causing the adhesive to spread in the stacking direction on the side surface,
   the holder causes the adhesive to spread in a part of an area of a plate surface on which a first bonding layer is formed in the steel plates, by the adhesive sandwiched between the steel plates, and the holder causes the adhesive to protrude from a portion in the area of a contour of the steel plate, and
   the holder includes a holding block to hold the stacked body by coming into contact with the stacked body from a direction perpendicular to the stacking direction, and the holder forms the second bonding layer by causing the adhesive to protrude in a blank part adjacent to the area, the blank part being a space where the holding block is not provided in a periphery of the stacked body.

5. The stacked core manufacturing apparatus according to claim 4, wherein the holder includes a plate-shaped elastic body to adjust a position of the holding block by elastic deformation, the plate-shaped elastic body being in contact with the holding block.

6. The stacked core manufacturing apparatus according to claim 5, wherein the holder includes an adjustment screw to move the holding block and the plate-shaped elastic body in a direction perpendicular to the stacking direction.

* * * * *